(12) United States Patent
Kawamura et al.

(10) Patent No.: US 9,420,189 B2
(45) Date of Patent: Aug. 16, 2016

(54) MANAGEMENT DEVICE, IMAGING DEVICE, IMAGING SYSTEM, AND DETERMINATION METHOD

(71) Applicant: Panasonic Intellectual Property Management Co., Ltd., Osaka (JP)

(72) Inventors: Yuzo Kawamura, Osaka (JP); Ryohei Wakai, Osaka (JP); Akihiro Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/734,010

(22) Filed: Jun. 9, 2015

(65) Prior Publication Data

US 2015/0365602 A1  Dec. 17, 2015

(30) Foreign Application Priority Data

Jun. 16, 2014  (JP) ................................ 2014-123499

(51) Int. Cl.
*H04N 5/232* (2006.01)
*H04N 7/18* (2006.01)

(52) U.S. Cl.
CPC ....... *H04N 5/23296* (2013.01); *H04N 5/23212* (2013.01); *H04N 5/23293* (2013.01); *H04N 7/18* (2013.01)

(58) Field of Classification Search
CPC .......... H04N 5/23296; H04N 5/23212; H04N 5/23293; H04N 5/2628; H04N 5/23222; H04N 5/23225; H04N 5/23229; H04N 5/262; H04N 7/18; G08B 13/196; G02B 15/14; G03B 5/00; G06K 9/00771; G06K 9/00785; G06K 9/00778; G06K 9/00791; G06K 9/00805; G06K 9/00812; G06K 9/00818; G06K 9/00825; G06K 9/00832; G06K 9/008; G06K 9/38; G06K 9/00845
USPC ..................................................... 348/333.12
See application file for complete search history.

(56) References Cited

U.S. PATENT DOCUMENTS 8,959,033 B1 * 2/2015 Oakes, III .......... G06K 9/00161
235/379
9,311,750 B2 * 4/2016 Moore ................... G01C 21/00

(Continued)

FOREIGN PATENT DOCUMENTS

JP    2003-280929    10/2003
JP    2013-172434    9/2013

OTHER PUBLICATIONS

AXIS Corp. "Product catalog of P33 Network Camera Series" (Downloaded on Feb. 10, 2014 from "https://www.allied-telesis.co.jp/products/list/axis/pdf/ds_p33-v_51445_ja_1304_10.pdf").

(Continued)

*Primary Examiner* — Pritham Prabhakher
(74) *Attorney, Agent, or Firm* — Greenblum & Bernstein, P.L.C.

(57) ABSTRACT

A management device performs a first determination to determine whether an imaging device can include an imaging area needed by any one of one or more existing applications, and an imaging area needed by a newly operated application in an imaging range determined by a zoom magnification, and if result of the first determination is affirmative, generate information indicating that the newly operated application can be installed in the imaging device.

11 Claims, 37 Drawing Sheets

(56) References Cited

U.S. PATENT DOCUMENTS

| | | | | |
|---|---|---|---|---|
| 2006/0195876 A1* | 8/2006 | Calisa | ............. | G08B 13/19565 725/105 |
| 2010/0188150 A1* | 7/2010 | Zhu | ........................ | H03F 3/217 330/251 |
| 2013/0268559 A1* | 10/2013 | Reeves | ................. | G06F 3/1423 707/770 |
| 2014/0092262 A1* | 4/2014 | Otsuka | ............... | H04N 5/23206 348/207.1 |
| 2014/0132767 A1* | 5/2014 | Sonnabend | ............ | G08G 1/144 348/148 |
| 2014/0207403 A1* | 7/2014 | Messinger | ............... | H04Q 9/00 702/123 |

OTHER PUBLICATIONS

Panasonic Corp. "Product catalog of WV-SFV631L/SFV611L Network Camera" (Downloaded on Feb. 6, 2014 from "http://ssbu-t.psn-web.net/Products/IP_camera/WV-SFV631L_611L/Specsheet/English/WV-SFV631L-611L__2A-113DL1.pdf").

* cited by examiner

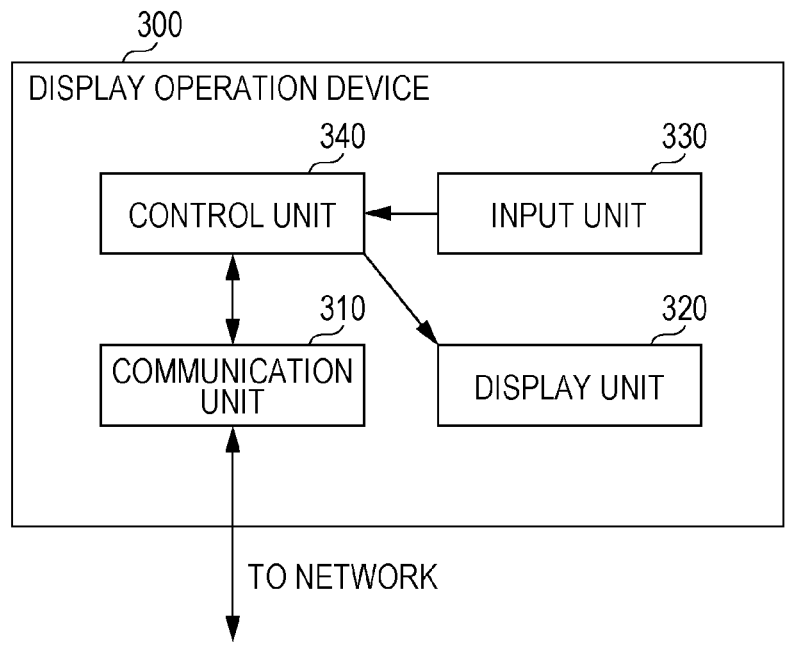
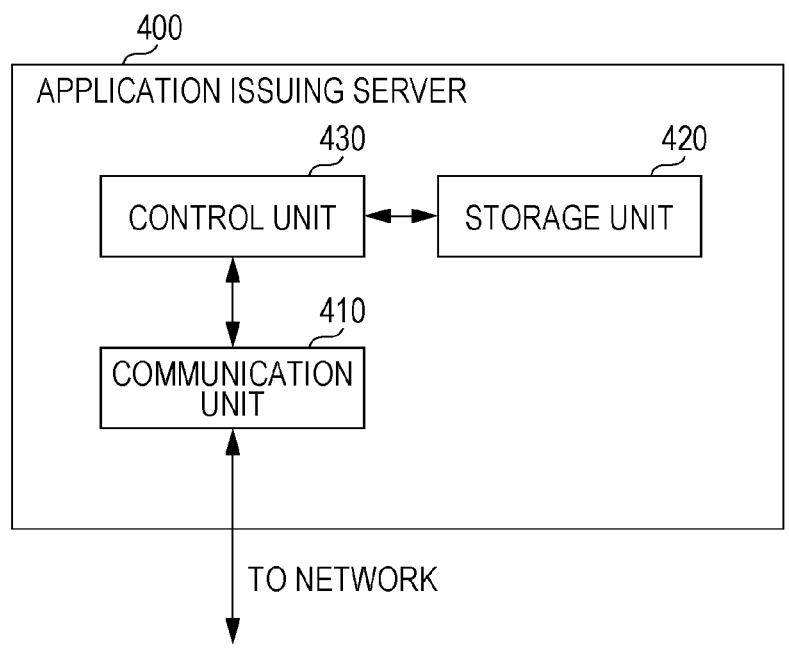

FIG. 6

| APPLICATION NUMBER | IMAGING TIME | ZOOM VALUE | IMAGING AREA | | | |
|---|---|---|---|---|---|---|
| | | | X_min | Y_min | X_max | Y_max |
| 1 | 20 | 1 TIME | 900 | 1000 | 1220 | 1240 |
| 2 | 10 | 4 TIMES | 1340 | 1210 | 1380 | 1240 |
| 3 | 10 | 16 TIMES | 1380 | 1600 | 1620 | 1780 |

FIG. 12

| GROUP NUMBER | APPLICATION NUMBER | | | ZOOM MAGNIFICATION | IMAGING AREA OF EXISTING APPLICATION | | | | | |
| --- | --- | --- | --- | --- | --- | --- | --- | --- | --- | --- |
| | 1 | 2 | 3 | | X_min | Y_min | X_max | Y_max | W | H |
| G1 | O | – | – | 1 TIME | 900 | 1000 | 1220 | 1240 | 320 | 240 |
| G2 | – | O | – | 4 TIMES | 1340 | 1210 | 1380 | 1240 | 40 | 30 |
| G3 | – | – | O | 16 TIMES | 1380 | 1600 | 1620 | 1780 | 240 | 180 |
| G4 | O | O | – | 4 TIMES | 900 | 1000 | 1380 | 1240 | 480 | 240 |
| G5 | – | O | O | 16 TIMES | 1340 | 1210 | 1620 | 1780 | 480 | 570 |
| G6 | O | – | O | 16 TIMES | 900 | 1000 | 1620 | 1780 | 720 | 780 |
| G7 | O | O | O | 16 TIMES | 900 | 1000 | 1620 | 1780 | 720 | 780 |

FIG. 15

| GROUP NUMBER | APPLICATION NUMBER ||| CONTINUOUS IMAGING TIME | ZOOM MAGNIFICATION | CRITICAL IMAGING AREA ||||
|---|---|---|---|---|---|---|---|---|---|
| | 1 | 2 | 3 | | | X_min | Y_min | X_max | Y_max |
| G1 | O | — | — | 20 | 1 TIME | 0 | 280 | 2180 | 1960 |
| G2 | — | O | — | 10 | 4 TIMES | 740 | 760 | 1980 | 1690 |
| G3 | — | — | O | 10 | 16 TIMES | 1300 | 1440 | 1700 | 1740 |
| G4 | O | O | — | 20 | 4 TIMES | 740 | 760 | 1540 | 1480 |
| IMAGING TIME | 20 | 10 | 10 | | | | | | |

FIG. 17A

GROUP COMBINATION

| GROUP NUMBER | | | | | | | | | | | | | | |
|---|---|---|---|---|---|---|---|---|---|---|---|---|---|---|
| G1 | ○ | ○ | ○ | ○ | ○ | ○ | ○ | – | – | – | – | ○ | – | – |
| G2 | ○ | ○ | ○ | – | ○ | ○ | – | ○ | ○ | ○ | – | – | ○ | – |
| G3 | ○ | ○ | – | ○ | – | ○ | ○ | – | – | ○ | ○ | – | – | – |
| G4 | ○ | – | ○ | ○ | ○ | – | ○ | ○ | ○ | – | ○ | – | – | ○ |

FIG. 17B

| GROUP NUMBER | MAXIMUM IMAGING TIME | GROUP COMBINATION NUMBER | | | | |
|---|---|---|---|---|---|---|
| | | 1 | 2 | 3 | 4 | 5 |
| G1 | 20 | ○ | ○ | ○ | – | – |
| G2 | 10 | ○ | ○ | – | ○ | – |
| G3 | 10 | ○ | ○ | ○ | ○ | ○ |
| G4 | 20 | ○ | – | ○ | ○ | ○ |

FIG. 18

SCHEDULE POPULATION

| GROUP NUMBER | | | | | | | | | | | | | | | | | | | | | |
|---|---|---|---|---|---|---|---|---|---|---|---|---|---|---|---|---|---|---|---|---|---|
| G1 | 5 | 5 | 5 | 5 | 5 | 5 | 5 | 5 | 5 | 5 | 5 | 5 | 5 | 5 | 5 | 5 | 10 | 5 | 10 | 10 | 10 |
| G2 | 5 | 5 | 5 | 5 | 5 | 5 | 5 | 5 | 5 | 5 | 5 | 5 | 5 | 10 | 5 | 5 | 5 | 5 | 5 | 5 | 5 |
| G3 | 5 | 5 | 5 | 5 | 5 | 5 | 10 | 5 | 5 | 10 | 5 | 10 | 5 | 5 | 5 | 5 | 5 | 5 | 5 | 10 | 10 |
| G4 | 5 | 5 | 10 | 15 | 20 | 15 | 5 | 10 | 15 | 10 | 20 | 10 | 15 | 10 | 15 | 20 | 10 | 20 | 5 | 5 | 10 |
| TOTAL IMAGING TIME | 20 | 20 | 25 | 30 | 35 | 30 | 25 | 25 | 30 | 30 | 35 | 30 | 30 | 30 | 30 | 35 | 30 | 35 | 25 | 30 | 35 |

SCHEDULE POPULATION

SCHEDULE POPULATION

FIG. 21

| GROUP NUMBER | ZOOM MAGNIFICATION | SCHEDULE NUMBER | | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | ... |
| G1 | 1 TIME | 45 | 45 | 40 | 50 | 45 | 40 | 50 | 55 | 50 | 45 | 40 | 55 | 50 | 45 | 40 | 55 | 50 | 45 | |
| G2 | 4 TIMES | 40 | 30 | 20 | 40 | 35 | 30 | 40 | 40 | 35 | 30 | 25 | 40 | 35 | 30 | 25 | 35 | 30 | 25 | |
| G3 | 16 TIMES | 35 | 30 | 25 | 35 | 30 | 25 | 30 | 35 | 30 | 25 | 20 | 30 | 25 | 20 | 15 | 30 | 25 | 20 | |
| G_REMAINDER | 20 TIMES | 25 | 20 | 15 | 25 | 20 | 15 | 20 | 25 | 20 | 15 | 10 | 20 | 15 | 10 | 5 | 20 | 15 | 10 | ... |
| TOTAL IMAGING TIME | — | 35 | 40 | 45 | 35 | 40 | 45 | 40 | 35 | 40 | 45 | 50 | 40 | 45 | 50 | 55 | 40 | 45 | 50 | |

| SCHEDULE NUMBER | | | | | | | | | | | | | | | | | | | | | |
|---|---|---|---|---|---|---|---|---|---|---|---|---|---|---|---|---|---|---|---|---|---|
| ... | 19 | 20 | 21 | 22 | 23 | 24 | 25 | 26 | 27 | 28 | 29 | 30 | 31 | 32 | 33 | 34 | 35 | 36 | 37 | 38 | 39 |
| | 40 | 55 | 50 | 45 | 40 | 60 | 45 | 40 | 50 | 45 | 40 | 55 | 50 | 45 | 40 | 50 | 45 | 40 | — | — | — |
| | 20 | 35 | 30 | 25 | 20 | 40 | — | 35 | 40 | 35 | 30 | 40 | 35 | 30 | 25 | 30 | 25 | 20 | 40 | 40 | — |
| | 15 | 25 | 20 | 15 | 10 | 30 | 40 | 25 | 30 | 25 | 20 | 30 | 25 | 20 | 15 | 20 | 15 | 10 | 35 | 30 | 40 |
| ... | 5 | 15 | 10 | 5 | 0 | 20 | 30 | 35 | 30 | 35 | 40 | 30 | 35 | 40 | 45 | 60 | 40 | 50 | 35 | 40 | 30 |
| | 55 | 45 | 50 | 55 | 60 | 40 | 30 | 35 | 30 | 35 | 40 | 30 | 35 | 40 | 45 | 60 | 40 | 50 | 35 | 40 | 30 |

FIG. 26

| GROUP NUMBER | 1 | 2 | 3 | 4 | 5 | 6 | 7 | 8 | 9 | 10 | 11 | 12 | 13 | 14 | 15 | 16 | 17 | 18 | ... |
|---|---|---|---|---|---|---|---|---|---|---|---|---|---|---|---|---|---|---|---|
| G_REMAINDER | 25 | 20 | 15 | 25 | 20 | 15 | 20 | 25 | 20 | 15 | 10 | 20 | 15 | 10 | 5 | 20 | 15 | 10 | ... |
| TOTAL IMAGING TIME | 35 | 40 | 45 | 35 | 40 | 45 | 40 | 35 | 40 | 45 | 50 | 40 | 45 | 50 | 55 | 40 | 45 | 50 | |

SCHEDULE NUMBER

| GROUP NUMBER | ... | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|
| G_REMAINDER | ... | 5 | 15 | 10 | 5 | 0 | 20 | 30 | 25 | 30 | 25 | 20 | 30 | 25 | 20 | 15 | 0 | 20 | 10 | 25 | 20 | 30 |
| TOTAL IMAGING TIME | | 55 | 45 | 50 | 55 | 60 | 40 | 30 | 35 | 30 | 35 | 40 | 30 | 35 | 40 | 45 | 60 | 40 | 50 | 35 | 40 | 30 |

SCHEDULE NUMBER

FIG. 29

| ZOOM MAGNIFICATION | CONTINUOUS IMAGING TIME | SELECTABLE IMAGING AREA | | | |
|---|---|---|---|---|---|
| | | X_min | Y_min | X_max | Y_max |
| 1 TIME | 60 sec | 1300 | 1440 | 1700 | 1690 |
| 4 TIMES | 40 sec | 1300 | 1440 | 1700 | 1690 |
| 16 TIMES | 40 sec | 1300 | 1440 | 1700 | 1740 |
| 20 TIMES | 30 sec | 0 | 0 | 5000 | 3000 |

FIG. 34A

| GROUP NUMBER | APPLICATION NUMBER 1 | ZOOM MAGNIFICATION | IMAGING AREA OF EXISTING APPLICATION | | | |
|---|---|---|---|---|---|---|
| | | | X_min | Y_min | X_max | Y_max | W | H |
| G1 | ○ | 4 TIMES | | | | | | |
| G2 | ○ | 8 TIMES | | | | | | |
| G3 | ○ | 12 TIMES | | | | | | |
| G4 | ○ | 16 TIMES | | | | | | |
| G5 | ○ | 20 TIMES | | | | | | |

FIG. 34B

| GROUP NUMBER | APPLICATION NUMBER 1 | ZOOM MAGNIFICATION | IMAGING AREA OF EXISTING APPLICATION | | | | | |
|---|---|---|---|---|---|---|---|---|
| | | | X_min | Y_min | X_max | Y_max | W | H |
| G1 | ○ | 4 TIMES | 1000 | 1000 | 1320 | 1240 | 320 | 240 |
| G2 | ○ | 8 TIMES | 1000 | 1000 | 1320 | 1240 | 320 | 240 |
| G3 | ○ | 12 TIMES | 1000 | 1000 | 1320 | 1240 | 320 | 240 |
| G4 | ○ | 16 TIMES | 1000 | 1000 | 1320 | 1240 | 320 | 240 |

FIG. 35

| GROUP NUMBER | APPLICATION NUMBER 1 | CONTINUOUS IMAGING TIME | ZOOM VALUE | CRITICAL IMAGING AREA | | | |
|---|---|---|---|---|---|---|---|
| | | | | X_min | Y_min | X_max | Y_max |
| G1 | ○ | 10 | 4 TIMES | 680 | 760 | 1640 | 1480 |
| G2 | ○ | 10 | 8 TIMES | 868 | 901 | 1452 | 1339 |
| G3 | ○ | 10 | 12 TIMES | 951 | 963 | 1369 | 1227 |
| G4 | ○ | 10 | 16 TIMES | 1000 | 1000 | 1320 | 1240 |
| IMAGING TIME | 10 | | | | | | |

FIG. 38

| GROUP NUMBER | ZOOM MAGNIFICATION | SCHEDULE NUMBER | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| G1 | 1 TIME | 5 | 5 | 5 | 10 | 10 | 10 | 10 | 15 | 15 | 15 | 15 | 15 | 15 | 15 | 15 | 20 | 20 | 20 |
| G2 | 4 TIMES | 5 | 10 | 10 | 5 | 5 | 5 | 10 | 5 | 5 | 5 | 5 | 10 | 10 | 10 | 10 | 5 | 5 | 5 |
| G3 | 16 TIMES | 10 | 10 | 10 | 10 | 10 | 10 | 10 | 10 | 10 | 15 | 10 | 10 | 10 | 10 | 10 | 10 | 10 | 10 |
| G_REMAINDER | 20 TIMES | 25 | 20 | 15 | 25 | 20 | 15 | 20 | 25 | 20 | 15 | 10 | 20 | 15 | 10 | 5 | 20 | 15 | 10 |
| TOTAL IMAGING TIME | – | 35 | 40 | 45 | 35 | 40 | 45 | 40 | 35 | 40 | 45 | 50 | 40 | 45 | 50 | 55 | 40 | 45 | 50 |

| ... | SCHEDULE NUMBER | | | | | | | | | | | | | | | | | | | | ... |
|---|---|---|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 | 37 | 38 | 39 |
| | 20 | 20 | 20 | 20 | 20 | 20 | 5 | 5 | 10 | 10 | 10 | 15 | 15 | 15 | 15 | 20 | 20 | 20 | – | – | – |
| | 5 | 10 | 10 | 10 | 10 | 10 | – | – | – | – | – | – | – | – | – | – | – | – | – | – | – |
| | 10 | 10 | 10 | 10 | 10 | 10 | 30 | 25 | 20 | 15 | 10 | 5 | 10 | 15 | 20 | 10 | 10 | 10 | 5 | 10 | 10 |
| | 5 | 15 | 10 | 5 | 0 | 20 | 30 | 35 | 30 | 25 | 20 | 30 | 25 | 20 | 15 | 0 | 20 | 10 | 10 | 10 | 10 |
| | 55 | 45 | 50 | 55 | 60 | 40 | 30 | 35 | 30 | 35 | 40 | 30 | 35 | 40 | 45 | 60 | 40 | 50 | 35 | 40 | 30 |

MANAGEMENT DEVICE, IMAGING DEVICE, IMAGING SYSTEM, AND DETERMINATION METHOD

BACKGROUND

1. Technical Field

The present disclosure relates to a technology of imaging by using an imaging device.

2. Description of the Related Art

In recent years, there is a monitoring camera capable of performing such processing as imaging and image recognition by running an application which is additionally installed on a product after shipment thereof (for example, product catalog of P33 Network Camera Series produced by AXIS Corp. and product catalog of WV-SFV631L/SFV631L Network Camera produced by Panasonic Corp.).

SUMMARY

In one general aspect, the techniques disclosed here feature a management device capable of communicating with an imaging device for capturing an imaging range determined based on a zoom magnification, the imaging system including: a receptor that receives designation of an imaging area needed by an application to be newly operated on the imaging device, an acquisitioner that acquires, for each of one or more existing applications already installed in the imaging device, information including an imaging area needed by the existing application, an imaging time indicating a time length when the imaging device captures the imaging area, and a zoom magnification of the imaging device when capturing the imaging area, a generator that generates information indicating whether the newly operated application can be installed on the imaging device, based on an imaging area needed by the newly operated application of which the designation is received by the receptor, the imaging area, the imaging time, and the zoom magnification corresponding to each of the one or more existing applications which is acquired by the acquisitioner, and an outputter that outputs information indicating whether the newly operated application can be installed on the imaging device, in which the generator performs a first determination to determine whether the imaging device can include the imaging area needed by any one of the one or more existing applications, and the imaging area needed by the newly operated application in an imaging range determined by the zoom magnification, and if result of the first determination is affirmative, generates information indicating that the newly operated application can be installed on the imaging device.

It should be noted that general or specific embodiments may be implemented as a system, a method, an integrated circuit, a computer program, a storage medium, or any selective combination thereof.

With such a configuration described above, the user can easily recognize whether a new application can be installed on an imaging device, for example, just by designating an imaging area for the new application prior to installation thereof on the imaging device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a functional block diagram of a display operation device according to the first embodiment;

FIG. 5 is a functional block diagram of an application issuing server according to the first embodiment;

FIG. 6 is a data schematic chart of existing application information according to the first embodiment;

FIG. 12 shows an example of a group population according to the first embodiment;

FIG. 15 shows an example of group information according to the first embodiment;

FIG. 17A illustrates a group combination according to the first embodiment;

FIG. 17B illustrates a group combination according to the first embodiment;

FIG. 18 shows a schedule population according to the first embodiment;

FIG. 21 illustrates a securable resource calculation table according to the first embodiment;

FIG. 26 shows an example of a securable resource calculation table relative to an input example 2 according to the first embodiment;

FIG. 29 shows an example of a securable resource calculation table according to a second embodiment;

FIG. 34A shows a group population according to a variant of the first embodiment;

FIG. 34B shows a group population according to a variant of the first embodiment;

FIG. 35 shows an example of group information according to a variant of the first embodiment;

FIG. 38 illustrates a default securable resource calculation table according to the first embodiment.

DETAILED DESCRIPTION

<Finding of Inventors>

In recent years, monitoring cameras are provided at many places in urban cities. The inventors thought that the monitoring camera could be used for marketing as a way of its effective use.

The marketing herein referred to is, for example, to make a research of the passerby on a sidewalk located within the imaging range of the monitoring camera, such as the number of persons passing by on the time zone basis in order to estimate the number of customers for a new store to be opened in a vicinity of the sidewalk.

Then, the inventors thought that there could be a service form, in which a business operator intending to make a marketing research would perform image recognition processing of data corresponding to an image of a required portion included in an image taken for a predetermined time period by a monitoring camera capable of imaging a range needed for the research, and get an application capable of transferring data of recognition result installed on the monitoring camera, and thereby, a holder of the monitoring camera could receive a rebate from the business operator.

In such a case, as a matter of course, the holder of the monitoring camera wishes to get much more rebate by installing much more applications on the monitoring camera.

On the other hand, although the holder of the monitoring camera wishes to install much more applications, considering that one or more applications might have been installed, it is not so easy to determine whether an application can be newly installed. This is particularly the case if many applications have been installed on the monitoring camera.

On the other hand, some monitoring cameras including a PTZ (Pan-Tilt-Zoom) mechanism can increase an imageable range by panning or tilting although a range which can be captured at one time is limited. Japanese Unexamined Patent Application Publication No. 2003-280929 discloses a technique that guarantees operation so as to complete processing of all applications within a predetermined time period even when an application is added to a camera, but the technique does not guarantee to fully meet user's demands. Because according to Japanese Unexamined Patent Application Publication No. 2003-280929, determination is made only on the time. The inventors further has focused on the field angle and zoom magnification for imaging, and thought that much more applications could be installed by making some devise.

Then, the inventors have invented a management device that determines, by taking into account the imaging position, field angle, and zoom magnification, whether a new application can be installed on a camera, and if determined that the application can be installed, provides information of the time available for imaging per unit time with a desired zoom magnification.

Hereinafter, details of the management device are described.

First Embodiment

Configuration

Figure 1:
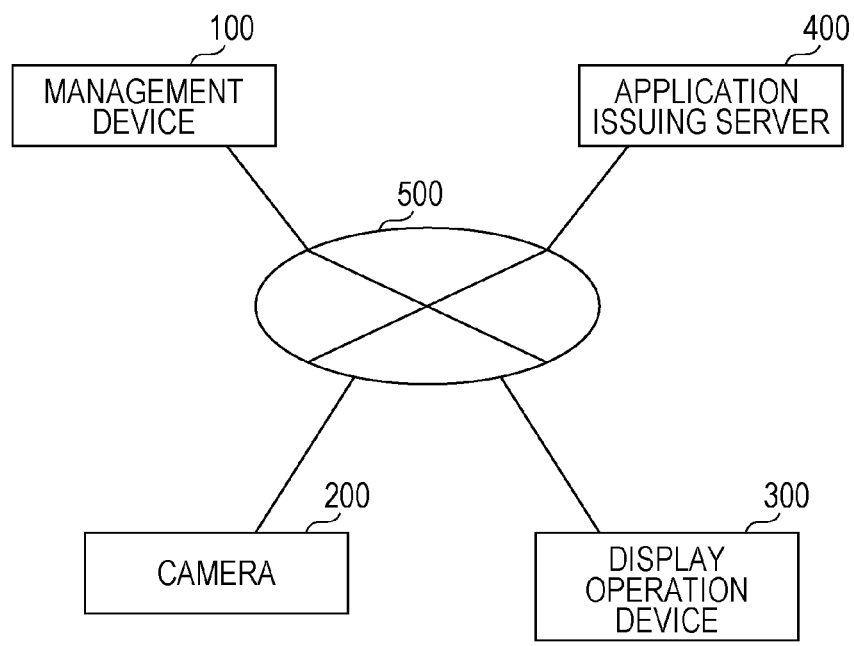
FIG. 1 is a system diagram showing a configuration example of an imaging system according to a first embodiment.

FIG. 1 shows a system configuration of an imaging system.

As illustrated in FIG. 1, the imaging system includes a management device 100, a camera 200 compatible with an imaging device, and a display operation device 300, each of which is connected mutually via a network 500. Also, an application issuing server 400 is connected to the network 500.

In the imaging system, a user holding the camera 200 inquires the management device 100 by using the display operation device 300 whether an application newly issued by an application issuing server 400 can be installed on the camera 200. Then, the management device 100 determines whether the application issued by the application issuing server 400 can be installed on the camera 200, and, if result of the determination is affirmative, transmits information indicating how imaging is scheduled, and the display operation device 300 displays the received information. Upon viewing the presented information, the user determines whether to install the application on the camera 200, and if determined to install, operates the display operation device 300 to install the application.

The camera 200 includes a PTZ mechanism described later. The PTZ (Pan-Tilt-Zoom) mechanism is a function for imaging with the camera 200 such as panning for moving a lens of the camera in a horizontal direction, tilting for moving the lens in a vertical direction, and zooming for performing a telescopic or wide angle zooming. This function is performed based on a movement amount of the lens in a horizontal direction, a movement amount of the lens in a vertical direction, and a setup value of zoom magnification information (PTZ setting), as described later.

With one PTZ setting, the camera 200 performs imaging of a predetermined imaging range with a predetermined zoom magnification.

Hereinafter, details of component devices forming the imaging system are described.

Figure 2:
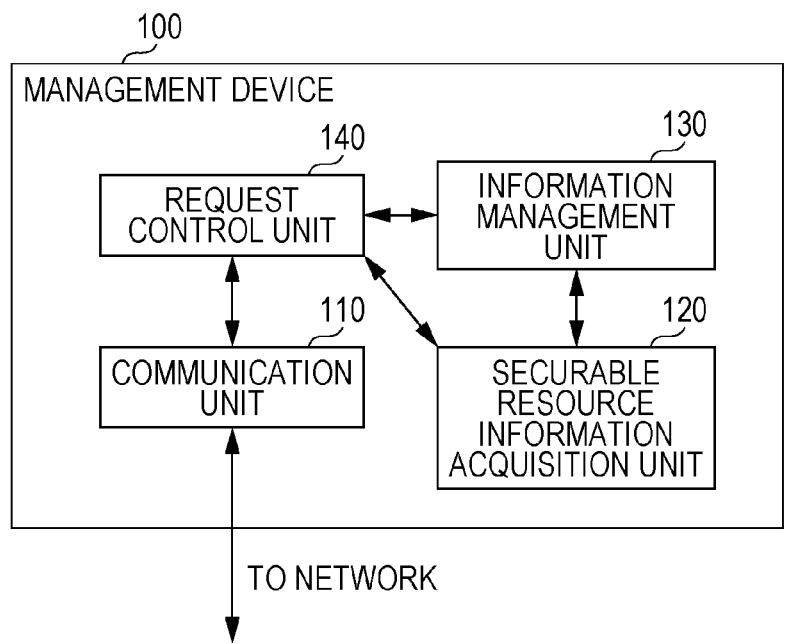
FIG. 2 is a functional block diagram of a management device according to the first embodiment.

FIG. 2 is a block diagram showing a function configuration of the management device 100.

As shown in FIG. 2, the management device 100 comprises a communication unit 110, a securable resource information acquisition unit 120, an information management unit 130, and a request control unit 140.

The communication unit 110 has a function of performing communication with an external device such as the camera 200, and the display operation device 300 via the network

500. The communication unit 110 receives information from the network 500, and transmits the received information to the request control unit 140. The communication unit 110 transmits the received data to an external device via the network 500 in accordance with the instruction from the request control unit 140. Communication is performed by using a common communication protocol such as, for example, Ethernet (registered trademark) standard, and TCP/IP. The same also applies hereinafter. Communication may be performed in a wired or wireless manner.

The securable resource information acquisition unit 120 has a function of determining, in response to the request from the request control unit 140, whether a new application (hereinafter referred to as the additional application) can be installed on the camera 200, and if determined that the application can be installed, calculating an imaging time per unit time, and a zoom magnification thereof, and generating securable resource information. Details of the securable resource information generation processing are described later. Here, a principle of the generating processing is described briefly.

The securable resource information acquisition unit 120 performs group information generation processing of generating group information based on whether an imaging area needed by each of the existing applications can be captured with one PTZ setting for applications already installed on the camera (hereinafter, referred to as the existing applications, which are applications using a pickup image including those installed either before or after shipment). The group may include only one existing application.

Next, the securable resource information acquisition unit 120 generates a group combination pattern based on the generated group information so as to include all existing applications, and generates, in the combination pattern, schedule information in which an imaging time of each group is set such that imaging is available for a period of at least imaging time set in each of existing applications.

Then, in the combination pattern of each group in the generated schedule information, the securable resource information acquisition unit 120 generates securable resource information for the additional application which lists an imaging time available for capturing an imaging area on the display operation device 300 selected by the user, and a zoom magnification. The securable resource information acquisition unit 120 transmits the generated securable resource information to the request control unit 140. When an imaging time of the additional application cannot be secured with any combination pattern, information indicating that the application cannot be installed is returned to the request control unit 140.

The information management unit 130 has a function of storing applications and data necessary for operation of the management device 100. The information management unit 130 is implemented, for example, by a nonvolatile semiconductor memory such as a flush memory, or a HDD (Hard Disc Drive).

The request control unit 140 has a function of receiving a request from the communication unit 110 to determine whether a new application can be installed on the camera 200, and requesting the securable resource information acquisition unit 120 to determine as per the request. Then, the request control unit 140 transmits securable resource information, or installation unavailability information received from the securable resource information acquisition unit 120 to the display operation device 300 being the originator of the request via the communication unit 110.

Figure 3:
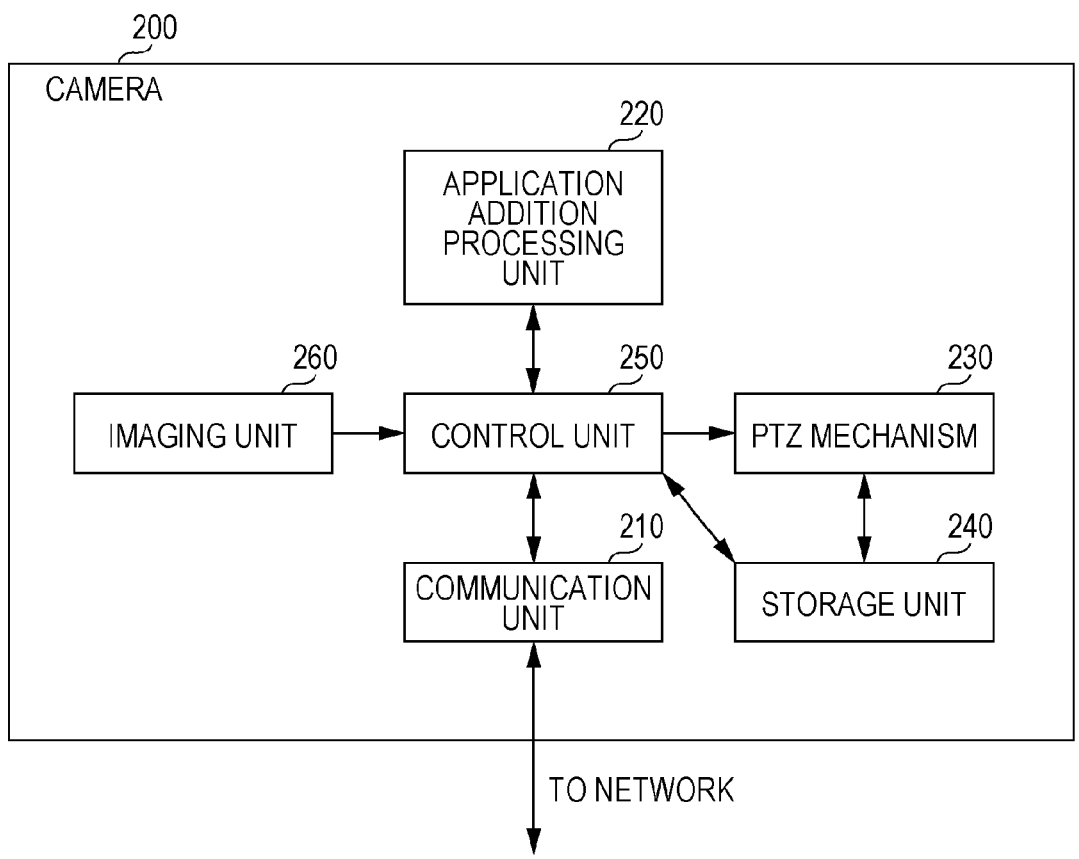
FIG. 3 is a functional block diagram of a camera according to the first embodiment.

FIG. 3 is a block diagram showing a function configuration of the camera 200.

As illustrated in FIG. 3, the camera 200 comprises a communication unit 210, an application addition processing unit 220, a PTZ mechanism 230, and a storage unit 240.

The communication unit 210 includes a function of performing communication with an external device such as the management device 100, and the display operation device 300 via the network 500.

The application addition processing unit 220 has a function of installing an application transmitted from the display operation device 300 or the application issuing server 400 via the network 500.

The PTZ (Pan-Tilt-Zoom) mechanism 230 has such functions for imaging with the camera 200 as changing the direction of the camera by panning which moves the direction of the lens in the camera 200 in a horizontal direction, and by tilting which moves the lens in a vertical direction, and controlling the size of the imaging range by performing a telescopic or wide angle zooming.

The storage unit 240 stores existing application information which is the information relative to each of at least one application (referred to as the existing application) already installed and executed on the camera 200.

The existing application information includes information for each of the existing applications relative to a required imaging area, an imaging time for capturing the necessary imaging region per unit time, and a zoom magnification of the camera 200 for capturing the imaging area. The storage unit 240 is implemented, for example, by a nonvolatile semiconductor memory such as a flush memory, or HDD (Hard Disc Drive).

The control unit 250 has a function of controlling each unit of the camera 200. In response to the information request from the display operation device 300 by communication, the control unit 250 transmits stored information to the display operation device 300 via the communication unit 210. Further, the control unit 250 controls operation timing, imaging direction, zoom magnification, and so on of the camera 200 such that an area including an imaging area needed by each of applications is captured within a unit time in accordance with a schedule transmitted from the display operation device 300. When the camera 200 captures an area including an imaging area needed by an existing application in accordance with an execution processing of the respective application, the control unit 250 has a function of extracting, for example, a portion of the imaging area from pickup image data, and performing a processing such as image recognition.

The control unit 250 controls the PTZ mechanism 230 based on a setting value (PTZ setting) regarding a movement amount in a horizontal direction, a movement amount in a vertical direction, and a zoom magnification in the PTZ mechanism 230. With this setting, orientation of the camera 200, and size of an imaging range which the camera can capture at one time can be controlled.

One PTZ setting includes a corresponding imaging time. The imaging time is information indicating a time length for capturing with the camera 200. Based on one PTZ setting, image capturing is performed for an imaging time with the camera 200 which is set to a predetermined orientation and a predetermined size of the imaging range which can be captured at one time.

The PTZ setting and a corresponding imaging time are retained, for example, by the storage unit 240.

The PTZ setting and a corresponding imaging time may be, for example, transmitted from the management device 100 and retained by the storage unit 240.

The camera 200 reads information of the PTZ setting and a corresponding imaging time from the storage unit 240, and controls the camera 200 itself.

The imaging unit 260 performs image capturing in accordance with the instruction from the control unit 250. The imaging unit 260 converts an optical image signal entered into the device through an optical lens (not shown) or the like to image data. The imaging unit 260 has an analog/digital conversion circuit which converts analog image data to digital image data. Format of converted data may be a YCbCr format which represents the color of each pixel with a brightness component Y, and color difference components Cb and Cr, or a RGB format. The imaging unit 260 transmits image data obtained by conversion to the control unit 250. The image data is, for example, transmitted to the display operation device 300, and displayed thereon. Alternatively, the image data is transmitted to the application issuing server 400 for use in marketing and so on.

FIG. 4 is a block diagram showing a function configuration of the display operation device 300.

As shown in FIG. 4, the display operation device 300 is a computer terminal such as a so-called personal computer, including a communication unit 310, a display unit 320, an input unit 330, and a control unit 340.

The communication unit 310 has a function of performing communication with an external device such as the management device 100, and the camera 200 via the network 500.

The display unit 320 has a function of displaying information in accordance with the instruction from the control unit 340. The display unit 320 has a function of displaying information as to whether an application received from the communication unit 310 can be installed.

The input unit 330 has a function of receiving input from the user. The input unit 330 receives input from the user requesting to determine whether an additional application can be installed, and transfers to the control unit 340. Also, the input unit 330 receives designation of the imaging area needed by an application to be newly installed in the camera 200 from the user, and transmits the received imaging area to the control unit 340.

The control unit 340 has a function of controlling respective units of the display operation device 300. Upon receiving the request to determine whether an additional application can be installed according to user's input to the input unit 330, the control unit 340 communicates with the camera 200 via the communication unit 310, and acquires information of the existing application (imaging area, zoom magnification when the camera 200 captures an imaging range including the imaging area, and the imaging time). Then, the control unit 340 transmits a determination request requesting to determine whether the additional application can be newly installed, to the management device 100 via the communication unit 310, together with information of the acquired existing applications, and information of the imaging area of the additional application.

FIG. 5 is a block diagram showing a function configuration of the application issuing server 400.

As shown in FIG. 5, the application issuing server 400 comprises a communication unit 410, a storage unit 420, and a control unit 430.

The communication unit 410 has a function of performing communication with an external device such as the management device 100, and the display operation device 300 via the network 500. The communication unit 410 receives an application specification request from the display operation device 300, and transfers to the control unit 430. The communication unit 410 transmits specification information of the application transferred from the control unit 430 according to the received application specification request, to the display operation device 300 which has transmitted the application specification request.

The communication unit 410 receives an application request from the camera 200 via the network 500, and transfers to the control unit 430. The communication unit 410 transmits application transferred from the control unit 430 according to the received application request, to the camera 200 which has transmitted the application request.

The storage unit 420 has a function of storing a program and data needed for operation of the application issuing server 400. The storage unit 420 stores a main body of a program of an application (or an installer thereof) which the operator intends to operate with cameras, and specification information thereof. Although specification of the application varies according to information required by an application issuer or operator, an application performs, for example, imaging of a selected area, image recognition of an image obtained by imaging, counting of an object (person or car) within the image, and determination of person travel direction and gender. The storage unit 420 is implemented, for example, by a nonvolatile semiconductor memory such as a flush memory, or HDD (Hard Disc Drive).

The control unit 430 has a function of controlling respective units of the application issuing server 400. Upon receiving the application specification request from the communication unit 410, the control unit 430 reads specification information from the storage unit 420, and transfers the specification information to the communication unit 410. Upon receiving the application request from the communication unit 410, the control unit 430 reads a main body of a program of the application (or installer thereof) from the storage unit 420, and transfers the main body of the program of the application (or installer thereof) to the communication unit 410.

Function configuration of components forming the imaging system is as described above.

<Data>

Hereinafter, data according to the embodiment is described. Data generated by the management device 100 in a generation process of securable resource information is described sequentially in conjunction with operation thereof. Here, only information of the existing application (hereinafter referred to as the existing application information) retained by the camera 200 is described.

FIG. 6 is a data schematic chart showing data configuration of the existing application information 600 retained by the camera 200.

As shown in FIG. 6, the existing application information 600 is information with which an application number 601, an imaging time 602, a zoom value 603, and an imaging area 604 are associated.

The application number 601 is identification information for identifying an existing application running on the camera 200. Here, an example of three existing applications installed and running on the camera 200 is shown.

The imaging area 604 is information indicating a coordinate range needed by each existing application in a whole panorama coordinate system available for imaging of the camera 200. Here, the imaging area is a rectangular area, being information of coordinate values of minimum value (X_min) and maximum value (X_max) in the x axis (horizontal) direction, and minimum value (Y_min) and maximum value (Y_max) in the y axis (vertical) direction.

The existing application information 600 is stored in the camera 200, but referred to by the management device 100 for determining whether an additional application can be installed.

The imaging time 602 is information indicating an imaging time for capturing an image including a coordinate range needed by each existing application, or alternatively, for example, information indicating an imaging time per unit time (in this case, 1 minute).

The zoom value 603 is information indicating a zoom magnification selected for the camera 200 when the camera 200 captures an imaging area needed by each existing application. However, in facts, the image is not captured with this zoom value 603. For some applications, an image captured with a zoom value of higher magnification may be taken into an image with the resolution of a selected zoom value by image processing.

In this case, the camera 200 should be provided with a transformation unit (not shown) which takes an image captured with a zoom value of high magnification into an image with a resolution of a selected zoom value by image processing.

<Operation>

Hereinafter, operation involved in the imaging system is described.

First, installation of the additional application, and selection of the imaging area by using GUI on the display operation device 300 is described.

Figure 7:
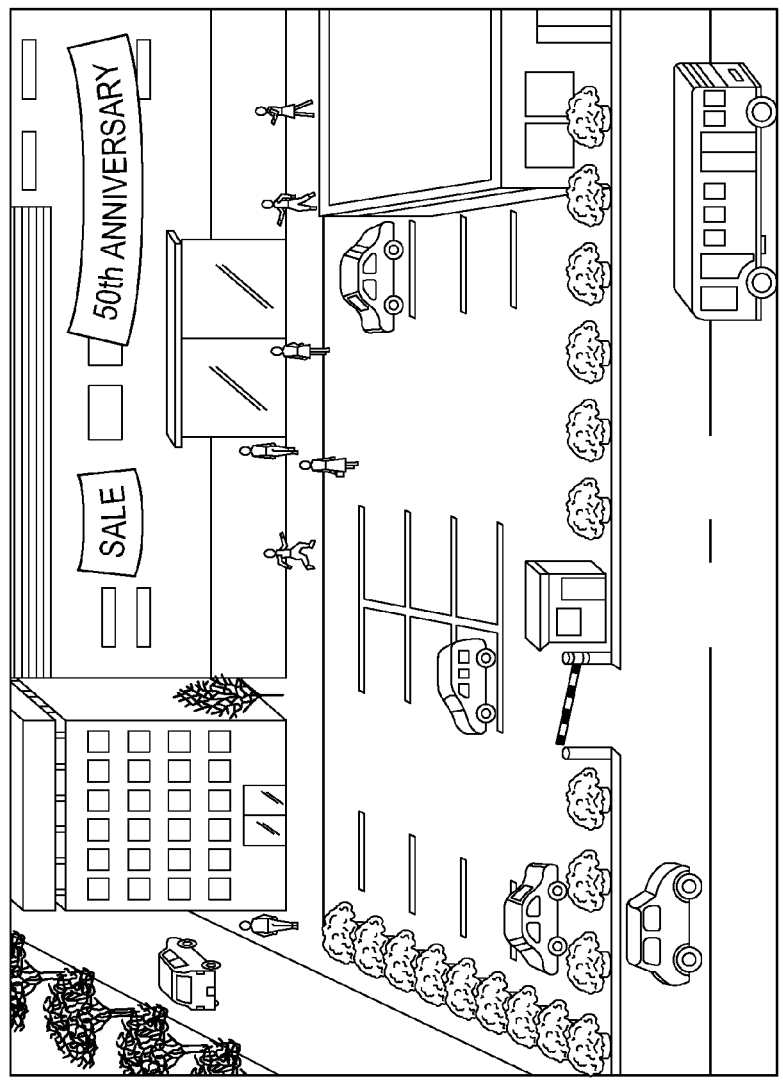
FIG. 7 is a data schematic chart of imaging field angle information of an imaging device according to the first embodiment.

FIG. 7 shows an example of a panorama image 700 in a maximum range which can be captured with the camera 200 by panning and tilting. An imaging range with one PTZ of the camera 200 is narrower than this area. A method of preparing the panorama image is disclosed, for example, by Japanese Unexamined Patent Application Publication No. 2013-172434. In this embodiment, the panorama image 700 is an image having 5,000 pixels in the width, and 3,000 pixels in the height, the image being pre-stored in the camera 200. However, the image may be obtained by capturing when adding an application or when selecting an imaging area for determining whether an additional application can be installed.

Figure 8:
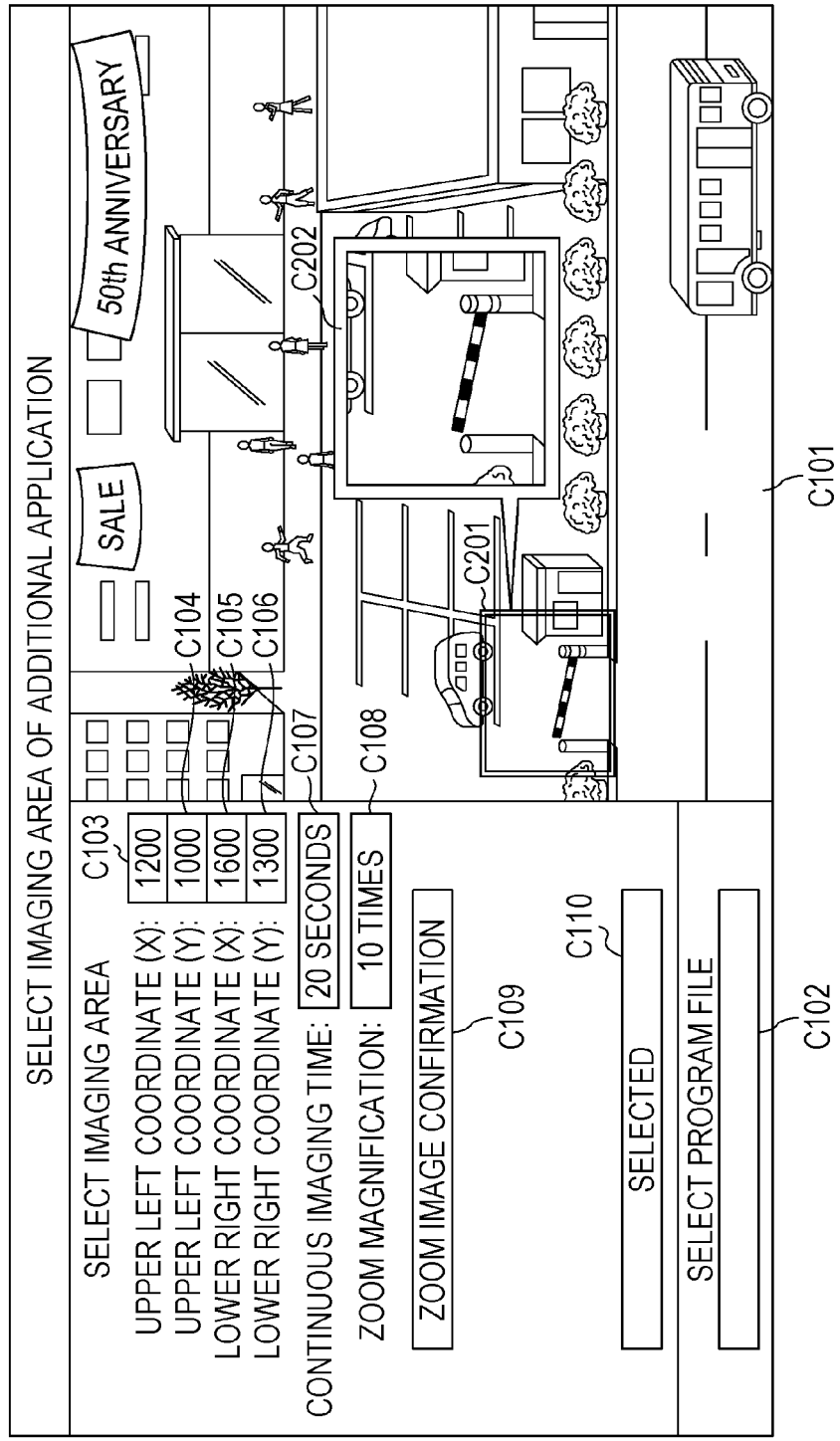
FIG. 8 shows an example of an information input screen according to the first embodiment.

FIG. 8 shows an example of an interface screen for selecting the imaging area of the additional application in the display operation device 300. Installation of the additional application is described here briefly since the GUI operates similarly with a common GUI.

The imaging area of the additional application is within a range of a frame C201 in a panorama image C101 generated based on an image captured by the camera. The frame C201 may be selected by cursor dragging operation on the panorama image C101, or an upper left coordinate and a lower right coordinate of an apex of the frame C201 may be input into frames C103 to C106.

When the frame C201 is determined by cursor dragging operation on the panorama image C101, frames C103 to C106 are automatically filled. Conversely, when coordinates are entered into frames C103 to C106, the frame C201 corresponding to the coordinates is displayed on the panorama image C101.

Enter an imaging time shorter than a predetermined time of the additional application into a frame C107 for selecting the continuous imaging time, and enter a zoom magnification for imaging during execution of the additional application into a frame C108 for selecting the zoom magnification.

Enter a file name of the additional application into a program file select frame C102, enter a file name indicating an additional application issued by the application issuing server 400, and click a selected button C110. Then, setting of values entered in frames C103 to C108, and a main body of a program of the additional application are transferred to the camera 200, and installed by an application addition processing unit 200 of the camera 200.

By entering such details in this way, the new application can be installed on the camera 200 similarly with a general GUI.

Next, an example of an input screen for requesting the management device 100 to determine whether a new application can be installed is described.

Figure 9:
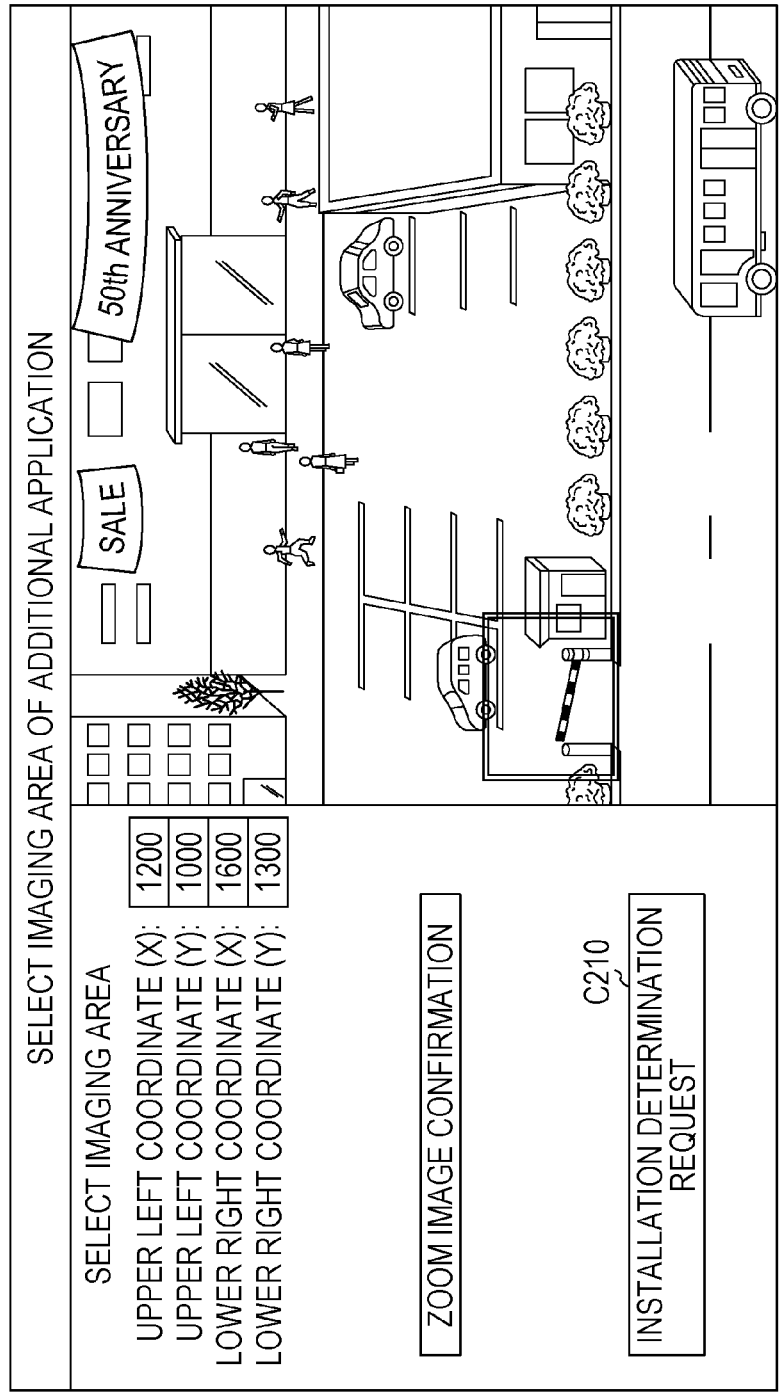
FIG. 9 shows an example of an information input screen according to the first embodiment.

FIG. 9 shows an example of an interface screen for requesting the management device 100 by using the display operation device 300 whether a new application can be installed.

Here, description is focused on differences from FIG. 8 since the example of the interface screen shown in FIG. 9 is almost same as FIG. 8.

By using the display operation device 300, the user selects an imaging area intended to capture with an application to be newly added. The selection procedure is the same as FIG. 8.

When an installation determination request button C210 in FIG. 9 is pressed, an installation determination request including coordinate values entered to select the imaging area, and an existing application information (see FIG. 6) obtained from the camera 200 in advance are transmitted from the display operation device 300 to the management device 100.

Upon receiving the installation determination request, the management device 100 determines, based on received coordinate values indicating the imaging area, and the existing application information, whether the additional application can be newly installed on the camera 200. And if the management device 100 determines that the additional application can be installed, the management device 100 further determines a zoom magnification and a time available for image capturing for the additional application.

In both cases of FIG. 8 and FIG. 9, a magnified image C202 within a selected area may be displayed as shown in FIG. 8 by clicking a zoom image confirmation button C109. This is an image used by an additional application for image recognition processing, or the like when the application is newly installed on the camera 200. FIG. 8 shows a state where a magnified image is displayed, and FIG. 9 shows a state where a magnified image is not displayed.

By entering such details in this way, the user may request the management device 100 for capability determination of the installation of a new application.

Figure 10:
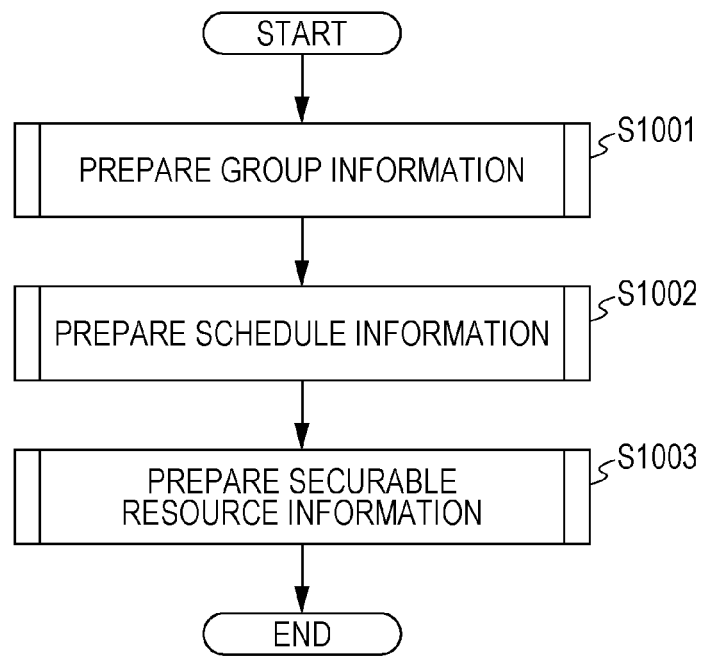
FIG. 10 is a flowchart showing operation of the management device according to the first embodiment.

FIG. 10 is a flowchart showing a rough flow of the securable resource information preparation processing performed when the management device 100 receives the above capability determination request.

As shown in FIG. 10, the management device 100 of the imaging system first performs the group information preparation processing (step S1001).

The group information preparation processing is a processing for preparing a group of applications (or an imaging area needed by an existing application) which are captured simultaneously in an imaging range of the camera 200 identified with one PTZ setting, for an imaging area predetermined for an application already installed in the camera 200 (hereinafter referred to as the existing application including applications not installed before shipment of the camera 200). Here, one PTZ setting is a set of settings of one lens for the camera 200, the settings including the horizontal orientation, vertical orientation, and zoom magnification for imaging. For the zoom magnification, applications having different zoom magnifications may be included in a same group if a pickup image needed by an application can be obtained by re-sizing a pickup image. Further details of the group information preparation processing are described later.

After preparing the group information, the management device 100 then prepares schedule information (step S1002). Schedule information preparation processing is a processing for generating a group combination pattern based on the group information prepared in the step S1001, and generating schedule information defining all patterns of the imaging time of groups for each of the combination patterns. Details of the schedule information preparation processing are described later.

Then, based on the prepared schedule information, the management device 100 prepares securable resource information (step S1003). The securable resource information is information indicating a setting available for imaging an additional application to be newly added, and information indicating a combination of the imaging time and zoom magnification available for capturing a selected imaging area. Details of the securable resource information preparation processing are also described later.

Hereinafter, details of individual processing shown in steps of FIG. 10 are described.

(Group Information Preparation Processing)

Figure 11:
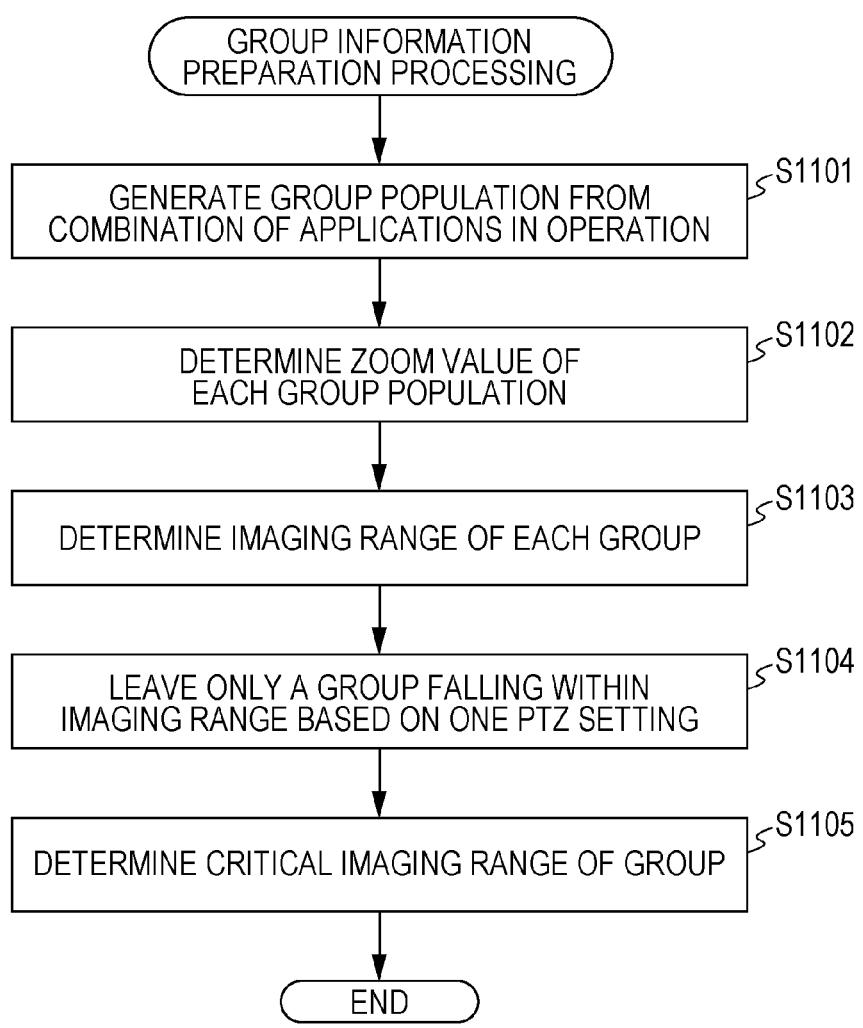
FIG. 11 is a flowchart showing a group information preparation processing according to the first embodiment.

FIG. 11 is a flowchart showing operation of the management device 100 in the group information preparation processing. The group information preparation processing is described by using a specific example along the flowchart of FIG. 11.

First, the securable resource information acquisition unit 120 prepares a group population covering combinations of existing applications (step S1101). Hereinafter, data enclosed with "[" and "]" represents a batch of data.

In the first embodiment, it is assumed that there are three applications as existing applications; that is, the application number 1, application number 2, and application number 3. In this case, seven group populations [1], [2], [3], [1, 2], [1, 3], [2, 3], and [1, 2, 3] are generated. The number in each of the group populations corresponds respectively to the application number. Description below is made based on the imaging time, the zoom value, and the imaging area of each of existing applications shown in FIG. 6.

Information relative to the group population is as shown in FIG. 12. In FIG. 12, seven groups G1 to G7 indicated by the group numbers are generated as group populations. In FIG. 12, when an existing application is included in the group, "O" is indicated in the column of a corresponding application number.

After preparing the group population, the securable resource information acquisition unit 120 assigns a group number for identifying each group thereof.

Next, the securable resource information acquisition unit 120 performs the following processing for each group.

First, the securable resource information acquisition unit 120 identifies one group population. Then, the securable resource information acquisition unit 120 determines whether all of imaging ranges needed by existing applications included in the identified group are included in an imaging range of the camera 200 identified with one PTZ setting (processing in steps S1102 to S1104).

The securable resource information acquisition unit 120 obtains a maximum field angle available for imaging of the camera 200 with reference to camera specific information. The camera specific information is stored, for example, in the storage unit 240 of the camera 200, and the securable resource information acquisition unit 120 acquires the camera specific information from the camera 200 in advance, and stores in a storage unit (not shown) of the management device 100 such as a memory. The camera specific information includes information such as, for example, a maximum resolution available for imaging of the camera 200, and a maximum value of the zoom magnification.

In the first embodiment, the maximum resolution available for imaging of the camera 200 is an image of 1,280 pixels in the width, and 960 pixels in the height, and the maximum zoom magnification is 20 times.

The securable resource information acquisition unit 120 determines whether all of imaging ranges of existing applications fall within a range of the maximum resolution. Here, when zoom magnifications different from each other are set for existing applications within a group, the securable resource information acquisition unit 120 converts the coordinate system to a largest zoom magnification of the zoom magnifications, and determines whether the imaging range falls within an imaging range under one PTZ setting.

For example, since the imaging area of each of existing applications is represented by a coordinate system converted with the zoom magnification of 1 time in the first embodiment, the securable resource information acquisition unit 120 calculates maximum width and height available for imaging when the coordinate system is converted to a coordinate system with the zoom magnification of 20 times, and determines whether imaging is available in an imaging area indicated with the width and the height.

The width and height of the zoom magnification to be converted are calculated by using the following equations:

$$\text{Width} = \frac{1280}{\sqrt{(\text{Zoom Value})}} \quad \text{Equation (1)}$$

$$\text{Height} = \frac{960}{\sqrt{(\text{Zoom Value})}} \quad \text{Equation (2)}$$

As shown in Equation (1), the width is obtained by dividing a resolution in the width direction by the square root of the zoom magnification. As shown in Equation (2), the height is obtained by dividing a resolution in the height direction by the square root of the zoom magnification. Therefore, when the zoom magnification is four times, the imageable range of the existing application is in a range of 640 pixels in the width and 480 pixels in the height, and when the zoom magnification is 16 times, the imageable range of the existing application is in a range of 320 pixels in the width and 240 pixels in the height.

The securable resource information acquisition unit 120 determines a zoom value of each group population (step S1102). Specifically, the securable resource information acquisition unit 120 acquires the zoom magnification of each of existing applications included in the group. Then, a largest zoom magnification is identified out of zoom magnifications of the existing applications within the group. This is because when the zoom magnification of each of existing applications belonging to one group is different from each other, imaging must be performed by using a larger zoom magnification. When re-sizing an image captured with a certain zoom magnification to a resolution of a different magnification, re-sizing to an image of low resolution with a smaller zoom magnification from an image of high resolution with a large zoom magnification is relatively easier than a reverse case.

In an example shown in FIG. 12, for example, a group corresponding to the group number G4 includes applications corresponding to the application number 1, and the application number 2. Referring to FIG. 6, a zoom magnification for the camera 200 capturing an imaging area needed by the application number 1 is one time. On the other hand, a zoom magnification for the camera 200 capturing an imaging area needed by the application number 2 is four times. Therefore, in FIG. 12, a zoom magnification for a group corresponding to the group number G4 is four times.

Then, the securable resource information acquisition unit 120 determines whether an imaging area required by all existing applications belonging to a group can be captured with an identified zoom magnification (step S1103).

The securable resource information acquisition unit 120 calculates, for each group, information for identifying a minimum rectangular range (referred to as the range of group imaging area) including an imaging area needed by the existing applications included in a group. When one existing applications belongs to a group, X_min, Y_min, X_max, and Y_max of a corresponding existing application shown in FIG. 6 is calculated as a range of the imaging area of the group. After obtaining X_min, Y_min, X_max, and Y_max, the securable resource information acquisition unit 120 calculates the range of the imaging area (width W and height H). The width W is calculated from X_max-X_min, and the height H is calculated from Y_max-Y_min.

On the other hand, when a plurality of existing applications belong to a group, a range of the group imaging area is determined by searching imaging areas of existing applications included in the group for minimum X_min and Y_min, and maximum X_max and Y_max. Then, after obtaining minimum X_min and Y_min, and maximum X_max and Y_max, the securable resource information acquisition unit 120 calculates a range of the imaging area (a square area identified with the width W and the height H). The width W is calculated from X_max−X_min, and the height H is calculated from Y_max−Y_min.

The securable resource information acquisition unit 120 leaves only a group falling within the imaging range of the camera 200 corresponding to one PTZ setting (step S1104). Specifically, the securable resource information acquisition unit 120 determines whether calculated width W and height H satisfy Equation (3), and Equation (4).

$$W \leq \frac{1280}{\sqrt{(\text{Zoom Value})}} \quad \text{Equation (3)}$$

$$H \leq \frac{960}{\sqrt{(\text{Zoom Value})}} \quad \text{Equation (4)}$$

When the width W and the height H satisfy Equation (3) and Equation (4) respectively, the securable resource information acquisition unit 120 determines that the group can be captured, and leaves the group. When the equations are not satisfied, the securable resource information acquisition unit 120 determines that the group cannot be captured, and deletes the group.

For example, each group corresponding to group numbers G1 to G4 satisfies Equation (3) and Equation (4) respectively with the zoom magnification, W, and H shown in FIG. 12.

On the other hand, as shown in FIG. 12, the group number G5 has a corresponding zoom magnification of 16 times, W of 480, and H of 570. When Equation (4) is calculated by assigning these values, Equation (3) and Equation (4) are not satisfied.

When also calculated for group numbers G6 and G7 in a similar manner, Equation (3) and Equation (4) are not satisfied.

Consequently, groups satisfying the both equations are four groups of group numbers G1, G2, G3, and G4.

This means that orientation of the camera 200 can be adjusted such that for respective group numbers G1, G2, G3, and G4, an imaging range of the camera 200 includes an imaging area needed by an existing application included in the group corresponding to one of the group numbers G1, G2, G3, and G4 if a zoom value of camera 200 is set to a zoom value included in said group.

Hereinafter, being possible to adjust orientation of the camera 200 such that an imaging area needed by an existing application included in a group is included within an imaging range of a size corresponding to the group is referred to as "including, in an imaging range of the camera 200, an imaging area needed by an existing application included in a group".

This means that, for group numbers G1, G2, G3, and G4, one PTZ setting value identifying the orientation and the size of imaging range of the camera 200 including an imaging area needed by an existing application included in the group can be identified.

After identifying the group which can be captured with one PTZ setting, the securable resource information acquisition unit 120 identifies a critical imageable range for each of identified groups (step S1105).

In the above example, the critical imageable range is identified for each of group numbers G1, G2, G3, and G4.

Here, identification of the critical imageable range is described by using one group as an example. First, identification of the critical imageable range for one application belonging to the group, for example, the group G3 shown in FIG. 12 is described by using FIG. 13.

First, a zoom magnification of the group is referred to. The zoom magnification of the group G3 is 16 times. Thus, the size of the imaging range (hereinafter referred to as the imageable range) of the camera 200 for the group 3 is 320 pixels in width×240 pixels in height from the above Equation (1) and Equation (2).

The existing application belonging to the group G3 is only an application of the application number 3.

Figure 13:
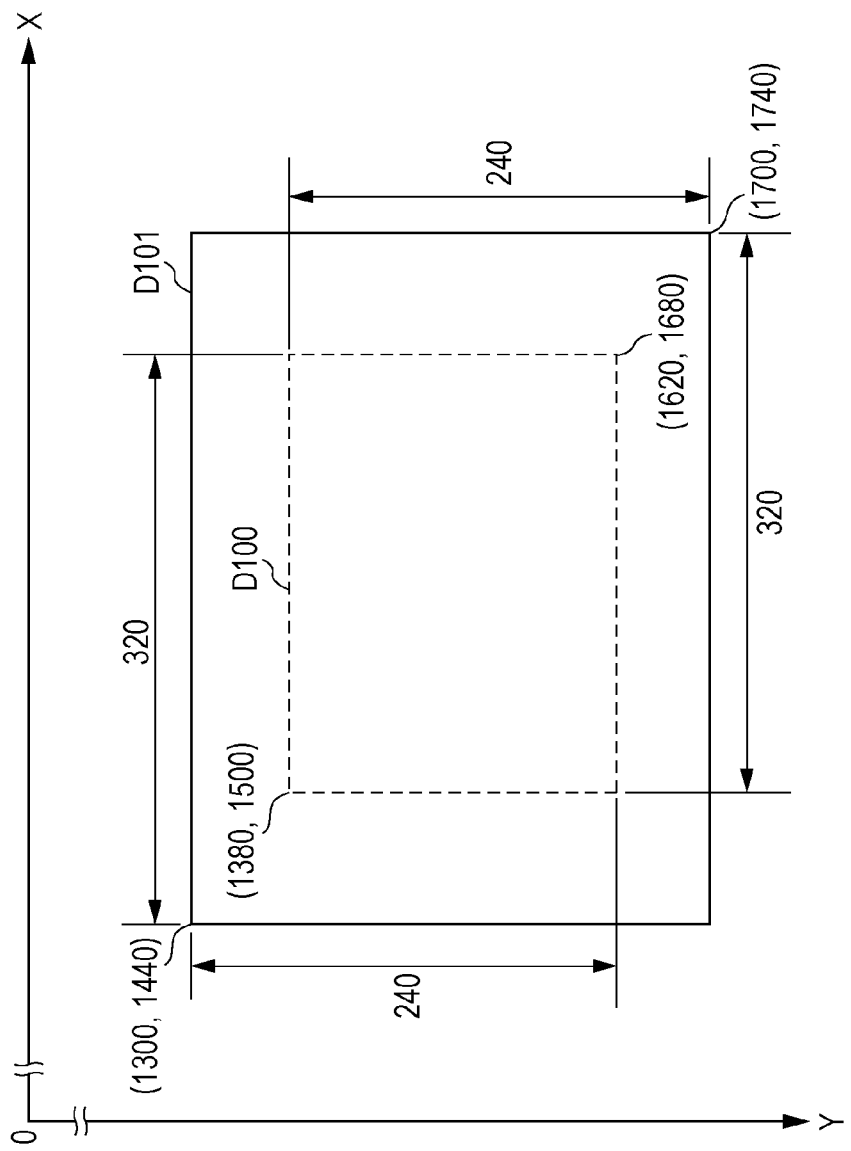
FIG. 13 illustrates a method of calculating a critical imaging area of a group G3 according to the first embodiment.

In FIG. 13, an area D100 enclosed by a dotted line indicates an imaging area needed by an existing application of the application number 3. The imaging area comprises 240 pixels in width×180 pixels in height, which is smaller than the imageable range of the camera. Thus, the imaging range has a corresponding margin in the width direction or in the height direction.

Thus, a range in which orientation of the camera 200 can be changed so as to include this area D100 (or, a panned or tilted range) is the critical imageable range. That is, the critical imageable range of the group G3 is a region D101 which has a horizontal margin corresponding to 80 (320−240) pixels in a left or right direction of the area D100, and a vertical margin corresponding to 60 (240−160) pixels in an upward or downward direction of the area D100.

Thus, the critical imageable range of the group G3 is a range covered by X_min=1300, Y_min=1440, X_max=1700, and Y_max=1740. Then, pixels included in the critical imageable range of the group G3 are 400 in width×300 in height (pixels).

This means that when a PTZ setting value corresponding to an imaging range having a size of 320 in width×240 in height (pixels) within an area D101 corresponding to the critical imageable range of the group G3 is generated, a region D100 (an imaging area needed by an existing application of the application number 3) is always included in the imaging range of the camera 200 based on the PTZ setting value.

Similarly, the critical imageable range also can be identified for groups G1, and G2. For the group G1, X_min is set to 0, as the setting value becomes negative since the size of the critical imageable range does not fall within a panning range of the camera 200.

Figure 14:
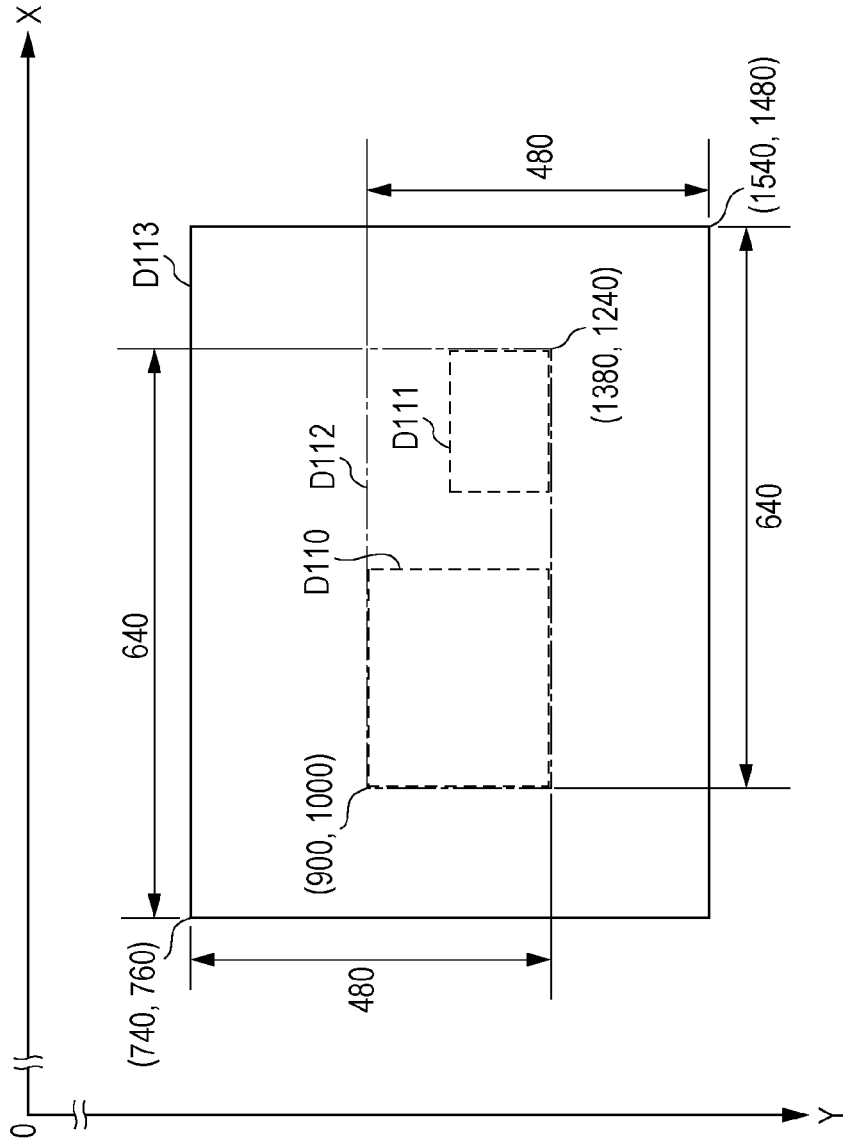
FIG. 14 illustrates a method of calculating a critical imaging area of a group G4 according to the first embodiment.

Next, a method of identifying the critical imageable range when a plurality of existing applications are included in a group is described by using the group G4 of FIG. 12 as an example with reference to FIG. 14.

As shown in FIG. 12, the group G4 includes existing applications of the application number 1, and the application number 2. Since zoom magnification of the group G4 is 4 times, the size of the imaging range of the group G4 is 640 pixels in width×480 pixels in height from the above Equation (1), and the Equation (2).

On the other hand, as shown in FIG. 14, the imaging range of the existing application of the application number 1 is an area D110 (X_min=900, Y_min=1000, X_max=1220, and Y_max=1240). The imaging range of the existing application of the application number 2 is an area D111 (X_min=1340, Y_min=1210, X_max=1380, and Y_max=1240).

First, the securable resource information acquisition unit 120 identifies a area D112 (X_min=900, Y_min=1000, X_max=1380, and Y_max=1240) including the area D110, and the area D111.

The area D112 is a range of 480 (1380−900) in width×240 (1240−1000) in height. As described above, the imaging range of the group G4 is 640 in width×480 in height, the size having a margin corresponding to 160 pixels in the horizontal direction, and 240 pixels in the vertical direction.

Thus, the critical imageable range of the group G4 is a range D113 (X_min=740, Y_min=760, X_max=1540, and Y_max=1480). Then, pixels included in the critical imageable range of the group G4 are 800 in width×720 in height (pixels).

This means that when a PTZ setting value corresponding to an imaging range having a size of 640 in width×480 in height (pixels) within a critical imageable range of the group G4 is generated, a region D112 (an imaging area needed by an existing application of the application number 2) is always included in the imaging range captured based on the PTZ setting value.

When a plurality of existing applications are included in a group like this case, securable resource information acquisition unit 120 identifies an imaging range of the group including imaging ranges of respective existing applications, then calculates a difference between the identified imaging range and an imaging range identified by a zoom magnification corresponding to the group, and identifies a critical imageable range by shifting the imaging range in the horizontal or vertical direction.

In this way, the securable resource information acquisition unit 120 of the management device 100 ends the group information preparation processing. Group information finally obtained by using FIGS. 6 and 12 is shown in FIG. 15.

As shown in FIG. 15, groups G1 to G4 noted in the row of the group number are left as the group information, and the existing application belonging thereto, the continuous imaging time, the zoom magnification, and the critical imaging area are associated therewith. As shown in FIG. 12, the imaging time of each existing application is associated with the application number of each existing application. Also, the imaging time corresponding to the each existing application, specified in the FIG. 12, corresponds to the imaging time specified in the FIG. 6.

For example, in FIG. 15, the group G4 includes two existing applications indicated by application numbers "1" and "2", a longer imaging time of "20" seconds out of the both applications is associated as a continuous imaging time, the zoom magnification is "4 times", and the critical imaging area is within a rectangular area having an upper left coordinate of (740, 760), and a lower right coordinate of (1540, 1480).

(Schedule Information Preparation Processing)

Figure 16:
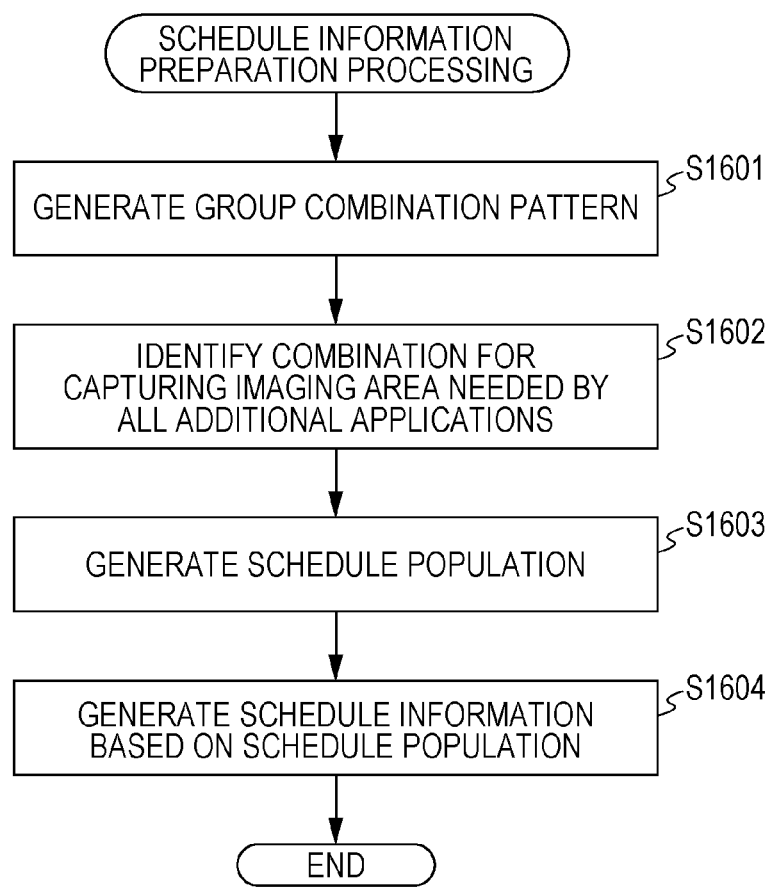
FIG. 16 is a flowchart showing a schedule information preparation processing according to the first embodiment.

FIG. 16 is a flowchart showing a detail of a schedule information preparation processing corresponding to step S1002 in FIG. 10.

The securable resource information acquisition unit 120 prepares schedule information from finally prepared group information. That is, the securable resource information acquisition unit 120 identifies a combination of groups which can be scheduled for performing the imaging of an imaging range of the camera 200 identified with a PTZ setting value corresponding to each of groups included in the prepared group information for a continuous imaging time corresponding to the group (referred to as the PTZ scheduling). In the first embodiment, scheduling is performed in a cycle of 1 minute. That is, the imaging by the camera is scheduled such that a cycle of capturing an imaging range including an imaging area needed by an existing application, and capturing an imaging range including an imaging area needed by an additional application to be added completes in 1 minute.

Therefore, the PTZ scheduling is performed such that total imaging time for imaging just for a predetermined continuous imaging time by panning, tilting, and zooming in the imaging area of each group becomes less than one minute.

First, the securable resource information acquisition unit 120 generates a combination pattern for each group included in the group information (step S1601).

In the first embodiment, the group information includes four groups of groups G1, G2, G3, and G4 as shown in FIG. 15.

Thus, total 15 combination patterns are available as shown in FIG. 17A. A group combination pattern to which only one group belongs is also counted as one pattern. In FIG. 17A, one column indicates one group combination, and a symbol "O" indicates that a group corresponding to the symbol belongs to the combination pattern.

After preparing the group combination pattern, the securable resource information acquisition unit 120 leaves only a group combination including imaging areas of all existing applications out of the group combinations (step S1602).

The example of FIG. 17A indicates three applications of application numbers 1, 2, and 3 as existing applications. However, for imaging all of these existing applications, schedule must be prepared so as to have a combination of [G1, G2, G3], or [G3, G4] as a subset. As a result, five combination patterns as shown in FIG. 17B are left.

Next, the securable resource information acquisition unit 120 records, in a list shown in 17B, a continuous imaging time of an existing application having a longest time out of existing applications belonging to each group, as a continuous imaging time assigned to the group. Thus, when imaging based on PTZ setting corresponding to the group, a maximum time assigned to imaging of the group can be referred to. Then, the securable resource information acquisition unit 120 allocates a combination pattern number to each group combination.

Then, the securable resource information acquisition unit 120 determines an imaging time of each group included in each of combination patterns. The securable resource information acquisition unit 120 generates a schedule population (step S1603). The schedule population is a time variation allocable to the group extracted based on the group combination.

Here, the schedule population is prepared based on the following three conditions:

(I) Time allocated to each group is a time in a unit of 5 seconds.

(II) Each of groups included in each of group combinations is definitely allocated with a time larger than 0.

(III) A time larger than a maximum imaging time of the group is not allocated.

Here, condition (II) is a condition for preventing duplication of the variation. For example, if 0 is allocated to the group number G2 in the combination of the group combination number 1, the combination duplicates a combination of the group combination number 3.

Hereinafter, processing of filling up information relative to the schedule population is described. Here, an example of the group combination number 1 [G1, G2, G3, G4] is described.

In the group combination number 1, an imaging time available for the group G1 is [5, 10, 15, 20], an imaging time available for the group G2 is [5, 10], an imaging time available for the group G3 is [5, 10], and an imaging time available for the group G4 is [5, 10, 15, 20]. Unit of the value in each group is in the second.

A schedule population covering all combinations of these available times is as shown in FIG. 18. Then, the securable resource information acquisition unit 120 calculates the sum of the imaging time of each group in the group. Also, the securable resource information acquisition unit 120 generates a schedule population generate a schedule population based on the group combination number 2 [G1, G2, G3], the group combination number 3 [G1, G3, G4], the group combination number 4 [G2, G3, G4], and the group combination number 5 [G3, G4], in a similar manner.

Thus, the securable resource information acquisition unit 120 generates a schedule population for all group combinations.

The securable resource information acquisition unit 120 generates schedule information from the generated schedule population (step S1604).

First, the securable resource information acquisition unit 120 deletes a column element, from the generated schedule population for all group combinations, whose total imaging time is not less than a period of time (in this case, not less than 1 minute) when a predetermined PTZ schedule is circulated once.

The PTZ schedule is a respective schedule within the schedule population, being information defining a time when the camera 200 captures an image of the group by using the PTZ mechanism so as to capture an imaging area (the imaging area including an imaging area required by all existing applications included in the group) set to each group.

Next, the securable resource information acquisition unit 120 generates a condition which a continuous imaging time of each group should satisfy in order to satisfy a continuous imaging time of each existing application. The condition is that for each of existing applications, the sum of the imaging time of groups having the existing application is larger than a continuous imaging time of the existing application.

In the first embodiment, relationship between each existing application and the group is as shown in FIG. 15. As apparent from FIG. 15, the existing application of the application number 1 is included in groups G1, and G4. The continuous imaging time of the existing application of the application number 1 is 20 seconds. From these, a condition of "the sum of the continuous imaging time of groups G1 and G4 is 20 seconds or more" is obtained.

Similarly, a required condition is also determined for existing applications of application numbers 2 and 3. From the existing application of the application number 2, a condition of "the sum of the continuous imaging time of groups G2 and G4 is 10 seconds or more" is obtained, and from the existing application of the application number 3, a condition of "the sum of the continuous imaging time of the group G3 is 10 seconds or more" is obtained.

Based on these conditions, the securable resource information acquisition unit 120 leaves only a schedule satisfying the continuous imaging time of each existing application in the schedule population which is generated based on the group combination number 1 [G1, G2, G3, G4], the group combination number 2 [G1, G2, G3], the group combination number 3 [G1, G3, G4], the group combination number 4 [G2, G3, G4], the group combination number 5 [G3, G4]. Then, the securable resource information acquisition unit 120 assigns a schedule number to each of left schedules.

Figure 19:
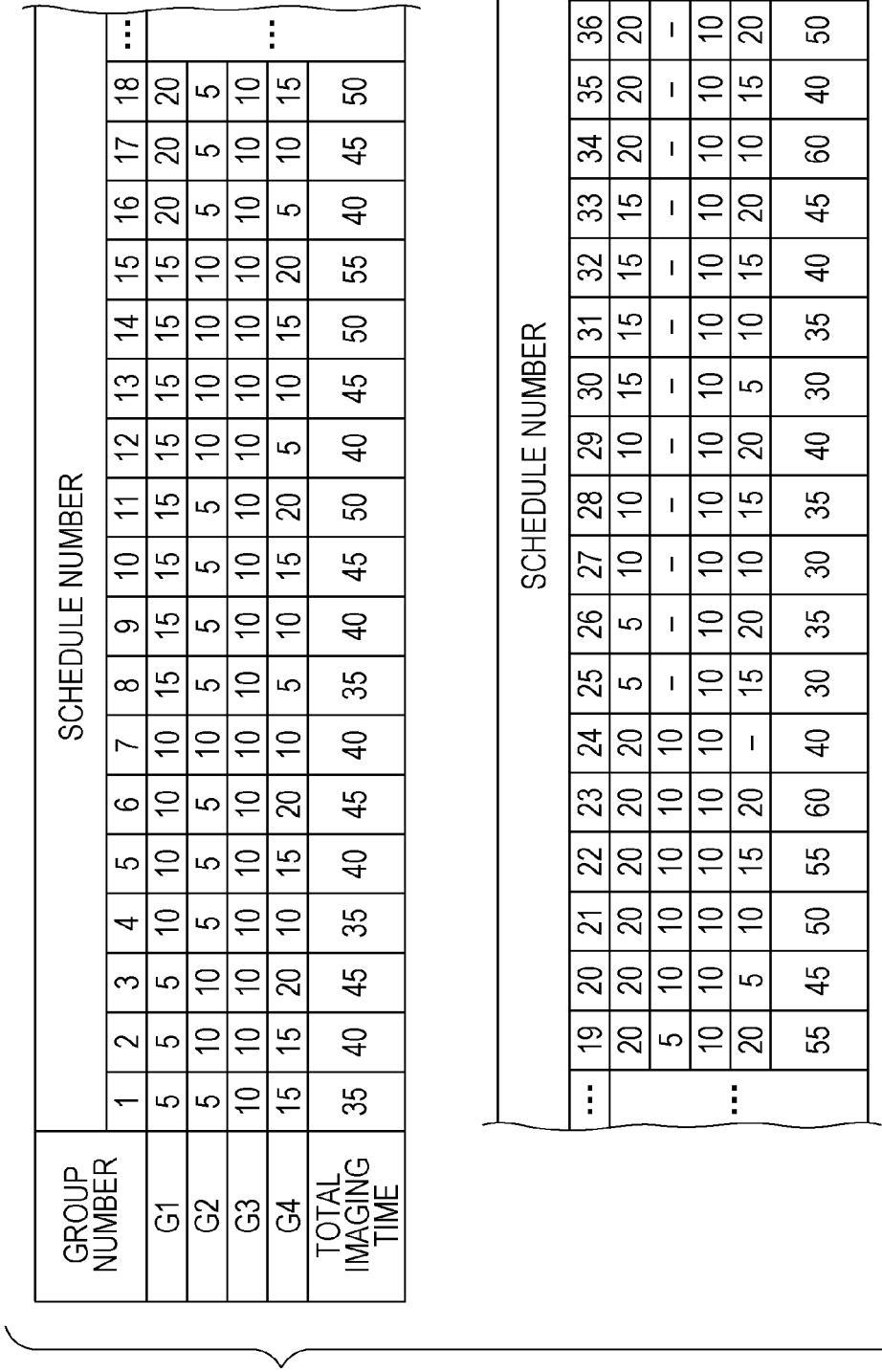
FIG. 19 shows schedule information according to the first embodiment.

Information thus obtained is as shown in FIG. 19. A symbol "-" in FIG. 19 means that there is no imaging schedule for the group. Even when there is no imaging schedule for the group, the above conditions are satisfied.

As shown in FIG. 19, in case of the schedule number 26, for example, the imaging time of the group G1 is 5 seconds, the imaging time of the group G2 is nil (that is, 0 second), the imaging time of the group G3 is 10 seconds, and the imaging time of the group G4 is 20 seconds. As a result, the total imaging time being the sum of each imaging time of the group G1 to the group G4 for the schedule number 26 at the moment is 35 seconds.

Based on the schedule information thus prepared, the securable resource information acquisition unit 120 generates the securable resource information.

Figure 20:
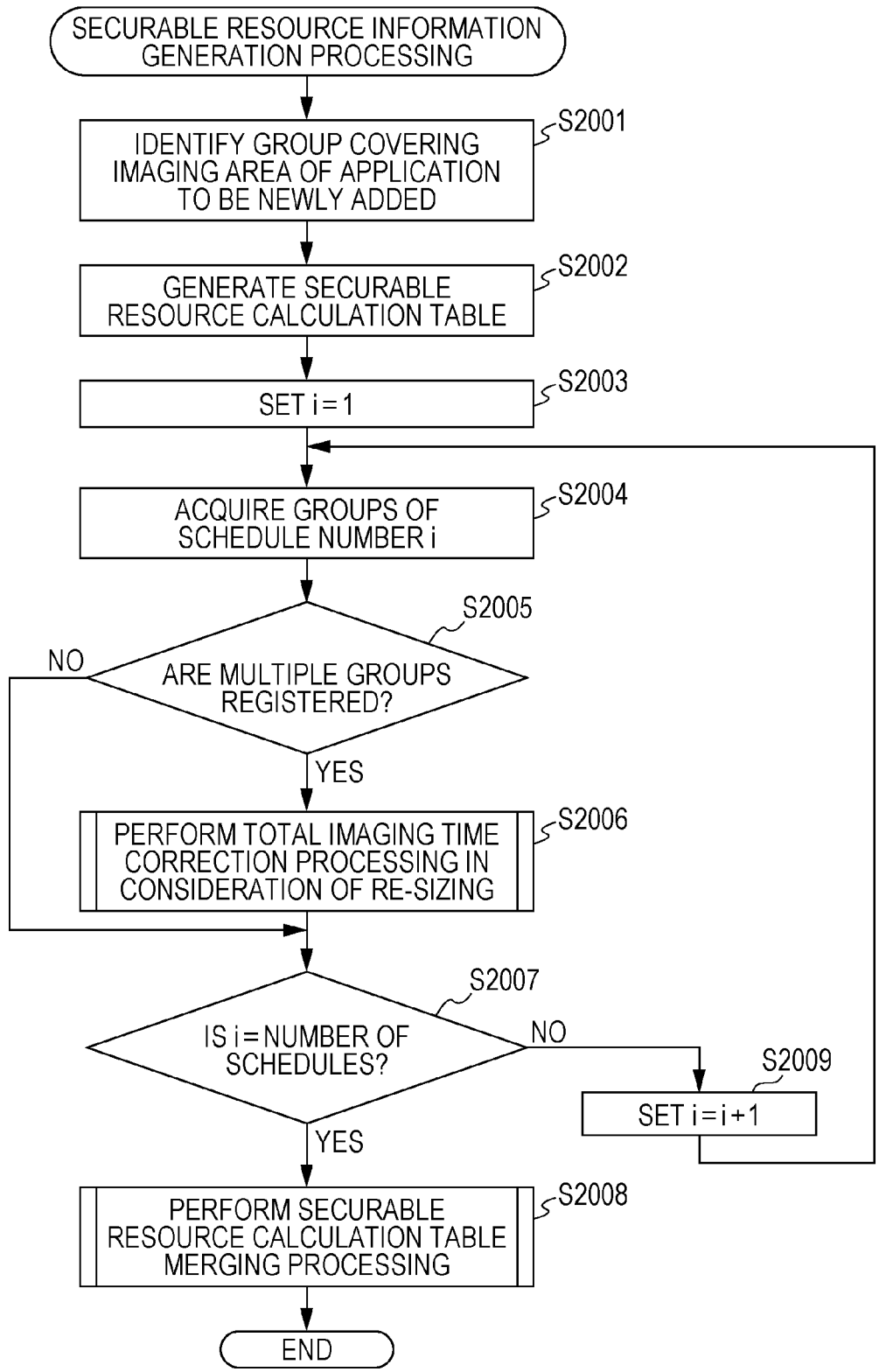
FIG. 20 is a flowchart showing a securable resource information preparation processing according to the first embodiment.

FIG. 20 is a flowchart showing operation of the management device 100 in the securable resource information acquisition processing.

As shown in FIG. 20, the securable resource information acquisition unit 120 first determines (first determination) whether an imaging range of a size corresponding to each of groups included in the combination indicated in the schedule information simultaneously covers an imaging area of the group, and an imaging area selected by the user for an additional application (hereinafter referred to as the additional application imaging area), and identifies a group determined to cover both of the imaging areas simultaneously (step S2001). Here, the case that the groups identified by the step S2001 are G1, G2, and G3 is described below.

Next, based on the prepared schedule information (see FIG. 19), the securable resource information acquisition unit 120 prepares a securable resource calculation table (step S2002). The securable resource calculation table is a table for listing temporary information used to prepare the securable resource information.

FIG. 21 is a data schematic chart of the securable resource calculation table.

The securable resource information acquisition unit 120 inserts, with reference to the prepared group information, a value of each of the "zoom magnification", the "total imaging time", and the "continuous imaging time" to the securable resource calculation table.

"G_remainder" in the securable resource calculation table indicates a time length not used for imaging of the camera 200 per unit time (time corresponding to 1 cycle, and 1 minute in this embodiment). That is, the group is a temporary group for posting a resource (time) in which an additional application imaging area can be set freely as a new imaging area irrespective of an imaging area of an existing application. Since the PTZ schedule is performed in a unit of 1 minute, the time is a value obtained by subtracting a sum of the time allocated to each group from 1 minute. For example, in the first embodiment, "G_remainder" is described by using the schedule number 1 as an example. In this case, as shown in FIG. 19, 5 seconds are needed for imaging of the group G1, 5 seconds for imaging of the group G2, 10 seconds for imaging of the group G3, and 15 seconds for imaging of the group G4. Therefore, the total imaging time being the sum of each imaging time of the group G1 to the group G4 is 35 seconds. Since 1 cycle is 1 minute (60 seconds), "60−35=25 seconds" can be allocated as a time for capturing the other area. Time allocatable as a time available for capturing the other area is the G_remainder. The G_remainder of the schedule number 1 is 25 seconds as shown in FIG. 21, with a zoom magnification of 20 times. When there is no remainder (when the sum of the imaging time of each group for the schedule is 1 minute), the G_remainder is 0.

In FIG. 21, a value posted in a cell where a group number and a schedule number cross each other is a value obtained by adding a value of a group number corresponding to a zoom magnification larger than a zoom magnification corresponding to the relevant group number, and a value of the group number "G_remainder" shown in FIG. 21 to a value posted in a corresponding cell in FIG. 19. A flow chart of a process, for calculating the value posted in the cell, in the FIG. 21, where a group number and a schedule number cross each other, is described later. The specific description is explained in "Total imaging time correction processing in consideration of re-sizing" (See step S2006 in FIG. 20, and FIG. 22).

For example, the imaging time allocated for capturing the group number G1 in the schedule number "1" shown in FIG. 19 is 5 seconds. Zoom magnification of the group number "1" shown in FIG. 21 is 1 time. Group numbers with a zoom magnification shown in FIG. 21 larger than "1 time" are the group number G2, the group number G3, and the group number G_remainder. In FIG. 19, a value posted in a cell where the schedule number "1" and the group number "G1" cross each other is 5 seconds, a value posted in a cell where the schedule number "1" and the group number "G2" cross each other is 5 seconds, and a value posted in a cell where the schedule number "1" and the group number "3" cross each other is 10 seconds.

In FIG. 21, a value posted in a cell where the schedule number "1" and the group number "G_remainder" cross each other is 25 seconds.

Thus, in FIG. 21, a value posted in a cell where the schedule number "1" and the group number "G1" cross each other is 5+5+10+25=45 seconds.

In FIG. 21, a value posted in a cell where the group number "G1" and the schedule number "1" cross each other indicates a maximum value of the time available for capturing an imaging area needed by an additional application on the camera 200 with a zoom magnification of 1 time (zoom magnification originally needed by the group number "G1").

Although a zoom magnification of a pickup image corresponding to each of group numbers G2, G3, and G_remainder is larger than 1 time, a pickup image with such a zoom magnification may be used as a pickup image with a zoom magnification of 1 time by transforming to a pickup image corresponding to a zoom magnification of 1 time.

In this case, as a matter of course, a transformation unit (not shown) for transforming (re-sizing) a pickup image captured by the camera 200 to an image with a zoom magnification of 1 time must be provided.

For example, referring to FIG. 21, consider a case of controlling the camera 200 by using a value (45 seconds) posted in a cell where the schedule number "1" and the group number "G1" cross each other.

In this case, an imaging range including both an imaging area needed by an existing application corresponding to the application number 1, and an additional application imaging area needed by an additional application as an imaging region of the camera 200 in the group number "G1" included in the schedule number "1" shown in FIG. 19, a PTZ setting value indicating a zoom magnification of 1 time, and an imaging time (5 seconds) for imaging with the PTZ setting value are set to the camera 200 (first setting).

Then, an imaging range including both an imaging area needed by an existing application corresponding to the application number 2, and an additional application imaging area needed by an additional application as an imaging region of the camera 200 in the group number "G2" included in the schedule number "1" shown in FIG. 19, a PTZ setting value indicating a zoom magnification of 4 times, and an imaging time (5 seconds) for imaging with the PTZ setting value are set to the camera 200 (second setting).

Then, an imaging range including both an imaging area needed by an existing application corresponding to the application number 3, and an additional application imaging area needed by an additional application as an imaging region of the camera 200 in the group number "G3" included in the schedule number "1" shown in FIG. 19, a PTZ setting value indicating a zoom magnification of 16 times, and an imaging time (10 seconds) for imaging with the PTZ setting value are set to the camera 200 (third setting).

Then, an imaging range including an imaging area needed by an additional application as an imaging region of the camera 200 in the group number "G_remainder" included in the schedule number "1" shown in FIG. 21, a PTZ setting value indicating a zoom magnification of 20 times, and an imaging time (10 seconds) for imaging with the PTZ setting value are set to the camera 200 (fourth setting).

Then, a PTZ setting value including an imaging range including an imaging area needed by an existing application corresponding to the application number 3 as an imaging region of the camera 200 in the group number "G4" included in the schedule number "1" shown in FIG. 19, and an imaging time (15 seconds) for imaging with the PTZ setting value are set to the camera 200 (fifth setting).

Then, imaging of the camera 200 may be performed by using the first to fifth settings in a cycle of 1 minute.

The zoom magnification of the pickup image captured by the camera 200 in the second setting is 4 times as shown in FIG. 21. Therefore, this image is transformed to a pickup image with a zoom magnification of 1 time to obtain an image of an imaging area needed by an additional application. On the other hand, when obtaining an image of an imaging area needed by an existing application included in the group number "G2", a pickup image with a zoom magnification of 4 times captured by the camera 200 is used.

The same applies to capturing of the camera 200 with each of the third and fourth settings.

That is, an image of an imaging area needed by the additional application is obtained from a pickup image captured by the camera 200 by using each of the first to fourth settings.

However, pickup images captured by the camera 200 by using each of the second to fourth settings are transformed to pickup images corresponding to a zoom magnification of 1 time. Then, the additional application obtains an image of a needed imaging area from the transformed pickup image.

A value posted in a cell shown in FIG. 21 where the schedule number "1" and the group number "G2" cross each other is described.

As shown in FIG. 21, the zoom magnification of the group number "G2" is 4 times. Group numbers with a zoom magnification larger than "4 times" shown in FIG. 21 are the group number "G3", and the group number "G_remainder".

By applying the same concept as above, a value posted in a cell where the schedule number "1" and the group number "G2" cross each other is a value (40 seconds) by adding a value (5 seconds) posted in a cell in FIG. 19 where the schedule number "1" and the group number "G2" cross each other, and a value (10 seconds) posted in a cell on FIG. 19 where the schedule number "1" and the group number "G3" cross each other, and a value (25 seconds) posted in a cell in FIG. 21 where the schedule number "1" and the group number "G_remainder" cross each other.

In FIG. 21, a value posted in a cell where the group number "G2" and the schedule number "2" cross each other indicates a maximum value of the time available for imaging of an imaging area needed by an additional application on the camera 200 with a zoom magnification of 4 times (a zoom magnification originally needed by the group number "G2").

Referring to FIG. 21, control of the camera 200 by using a value (40 seconds) posted in a cell where the schedule number "1" and the group number "G2" cross each other may be performed by setting the above first to fifth settings to the camera 200, and repeating imaging with the camera 200 by using the first to fifth settings at intervals of the unit time (1 minute).

An image of an imaging area needed by the additional application is obtained from a pickup image captured by the camera 200 by using each of the second, third, and fourth settings. However, pickup images captured by the camera 200 respectively by using the third to fourth settings are transformed to pickup images corresponding to a zoom magnification of 4 times. Then, the additional application obtains an image of a needed imaging area from the transformed image.

Referring to FIG. 21, a value posted in a cell where the schedule number "1" and the group number "G3" cross with each other is described.

As shown in FIG. 21, the zoom magnification of the group number "G3" is 16 times. Referring to FIG. 21, a group number with a zoom magnification larger than "16 times" is the group number "G_remainder".

By applying same concept as above, a value posted in a cell where the schedule number "1" and the group number "G3" cross each other is a value (35 seconds) obtained by adding a value (10 seconds) posted in a cell shown in FIG. 19 where the schedule number "1" and the group number "G3" cross each other, and a value (25 seconds) posted in a cell shown in FIG. 21 where the schedule number "1" and the group number "G_remainder" cross each other.

In FIG. 21, the value posted in a cell where the group number "G3" and the schedule number "1" cross each other indicates a maximum value of the time available for capturing of an imaging area needed by an additional application on the camera 200 with a zoom magnification of 16 times (a zoom magnification originally needed by the group number "G3").

Referring to FIG. 21, control of the camera 200 by using a value (35 seconds) posted in a cell where the schedule number "1" and the group number "G3" cross each other may be performed by setting the above first to fifth settings to the camera 200, and repeating capturing with the camera 200 by using the first to fifth settings at intervals of the unit time (1 minute).

An image of an imaging area needed by the additional application is obtained from a pickup image captured by the camera 200 by using the third and fourth settings respectively.

However, a pickup image captured by the camera 200 by using the fourth setting is transformed to a pickup image corresponding to a zoom magnification of 16 times. Then, the additional application obtains an image of a needed imaging area from the transformed pickup image.

Referring to FIG. 21, the value posted in a cell where the schedule number "1" and the group number "G_remainder" cross each other is described.

As shown in FIG. 21, the zoom magnification of the group number "G_remainder" is 20 times. In FIG. 21, there is no group number with the zoom magnification larger than "20 times" shown in FIG. 21. This is because "20 times" is a maximum zoom magnification selectable for the camera 200.

By applying the same concept as above, a value posted in a cell where the schedule number "1" and the group number "G_remainder" cross each other is a value (25 seconds) posted in a cell shown in FIG. 21 where the schedule number "1" and the group number "G_remainder" cross each other.

In FIG. 21, the value posted in a cell where the group number "G_remainder" and the schedule number "1" cross each other indicates a maximum value of the time available for capturing an imaging area needed by an additional application on the camera 200 with a zoom magnification of 20 times (a zoom magnification originally needed by the group number "G_remainder").

Referring to FIG. 21, control of the camera 200 by using a value (25 seconds) in a cell where the schedule number "1" and the group number "G_remainder" cross each other may be performed by setting the above first to fifth settings to the camera 200, and repeating imaging with the camera 200 by using the first to fifth settings at intervals of the unit time (1 minute).

A image of an imaging area needed by the additional application is obtained from a pickup image captured by the camera 200 by using the fourth setting.

Description of the value in a cell shown in FIG. 21 where each of schedule numbers "2" to "39" and each of group numbers cross each other is omitted, since it may be considered similarly with a value in a cell shown in FIG. 21 where the schedule number "1" and each of group numbers cross each other.

Then, processing of determining a time and a zoom magnification available for capturing an imaging area needed by the additional application is performed for each of schedule numbers.

First, the securable resource information acquisition unit 120 sets the internal variable "i" to 1 (step S2003). The internal variable "i" is a number indicating a schedule number being processed. The value of the internal variable "i" is stored and managed in an internal buffer of the securable resource information acquisition unit 120.

The securable resource information acquisition unit 120 acquires information of groups of the schedule number indicated by the internal variable "i" (step S2004). The acquired information of groups is information for identifying a group included in a schedule indicated by the schedule number, such as G1, G2, G3, and G4 in this case.

The securable resource information acquisition unit 120 determines whether the schedule indicated by the acquired schedule number includes a plurality of groups (step S2005). When a plurality of groups are not included (NO in the step S2005), the process shifts to the step S2007.

When a plurality of groups are included (YES in the step S2005), the securable resource information acquisition unit 120 performs the total imaging time correction processing in consideration of re-sizing (step S2006). Details of the correction processing are described later.

Then, the securable resource information acquisition unit 120 determines whether the schedule number "i" matches the total number of schedules (step S2007).

When not matching (NO in the step S2007), 1 is added to "i" (step S2009), and the process returns to the step S2004.

When matching (YES in the step S2007), the securable resource information acquisition unit 120 performs securable resource calculation table merging processing (step S2008), generates the securable resource information, and ends the processing.

(Total Imaging Time Correction Processing in Consideration of Re-Sizing)

Figure 22:
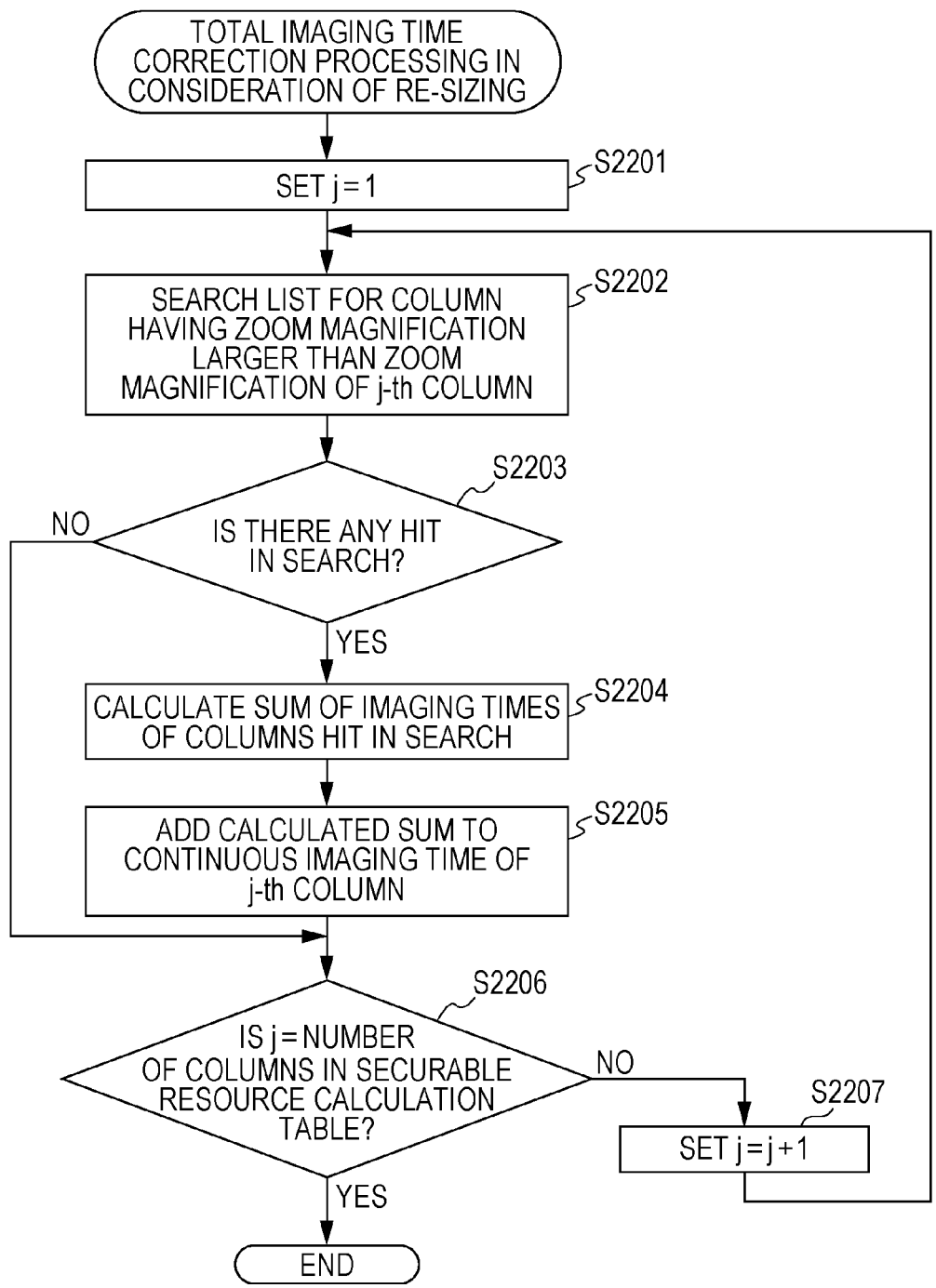
FIG. 22 is a flowchart showing a total imaging time correction processing in consideration of re-sizing according to the first embodiment.

FIG. 22 is a flowchart showing a correction processing performed by the management device 100 in the step S2006 of FIG. 20.

First, the securable resource information acquisition unit 120 sets the internal variable "j" to 1 (step S2201). The internal variable "j" is a variable stored and managed in an internal buffer of the securable resource information acquisition unit 120 for determining the reference destination row of the securable resource calculation table in the correction processing.

The securable resource information acquisition unit 120 acquires a zoom magnification of the row (hereinafter referred to as the reference zoom magnification) with reference to the row in the securable resource calculation table indicated by the internal variable "j" (step S2202). For example, the securable resource calculation table in the first embodiment is as shown in FIG. 21. If "j" is 1, the reference zoom magnification is 1 time.

The securable resource information acquisition unit 120 refers to other rows in the securable resource calculation table to search for whether there is a row having a magnification larger than the reference zoom magnification (step S2203). The securable resource information acquisition unit 120 returns "hit" if result of the search is affirmative, and "not hit" if the result is negative.

In the case of "not hit" (NO in the step S2203), the process shifts to the step S2206.

In the case of "hit" (YES in the step S2203), the securable resource information acquisition unit 120 stores a list of groups hit in the search into an internal buffer thereof. Then, the securable resource information acquisition unit 120 calculates the sum of imaging times in the hit row (step S2204). Then, the securable resource information acquisition unit 120 adds the calculated sum to the sum of the continuous imaging time of each of groups included in the list stored in the internal buffer (step S2205). Then, a list of added values is reflected on the securable resource calculation table.

The securable resource information acquisition unit 120 determines whether "j" matches the number of rows in the securable resource calculation table (step S2206).

When not matching (NO in the step S2206), 1 is added to "j" (step S2207), and the process returns to the step S2202.

When matching, correction processing ends, and the process returns to the step S2207 of FIG. 20.

(Securable Resource Calculation Table Merging Processing)

Figure 23:
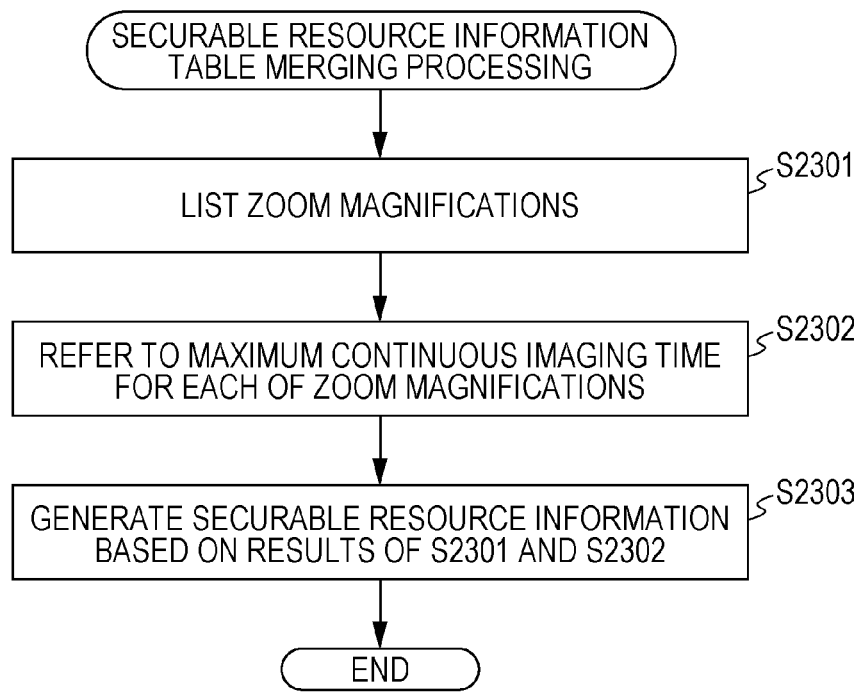
FIG. 23 is a flowchart showing a securable resource calculation table merging processing according to the first embodiment.

FIG. 23 is a flowchart showing a securable resource calculation table merging processing in the step S2208 of FIG. 20 performed by the management device 100.

First, the securable resource information acquisition unit 120 lists up each zoom magnification of the securable resource calculation table prepared for each of schedules, and stores in the internal buffer (step S2301).

The securable resource information acquisition unit 120 compares the continuous imaging time of each schedule in the securable resource calculation table for each of listed groups. Then, as a result of the comparison, the securable resource information acquisition unit 120 stores a set of a longest continuous imaging time and a zoom magnification for each group into the internal buffer (step S2302).

Then, the securable resource information acquisition unit 120 generates securable resource information comprising a set of the continuous imaging time for each of obtained zoom magnifications (step S2303), and ends the processing.

Figure 24:
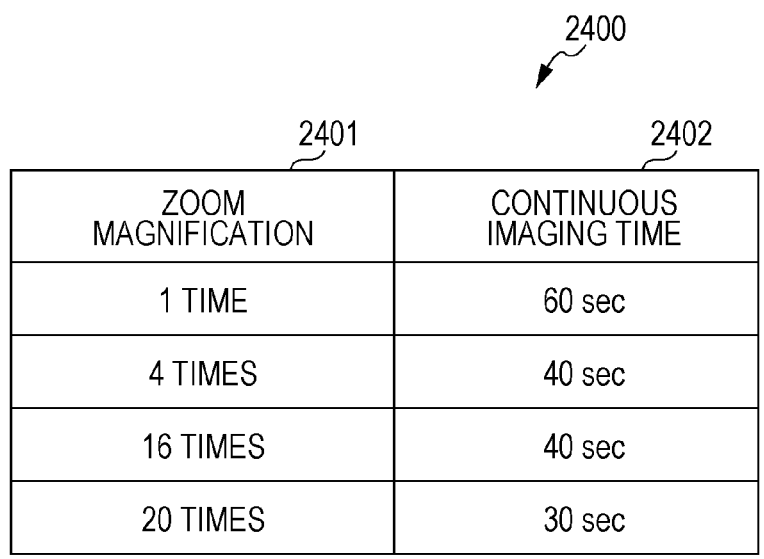
FIG. 24 shows an example of securable resource information according to the first embodiment.
Figure 25:
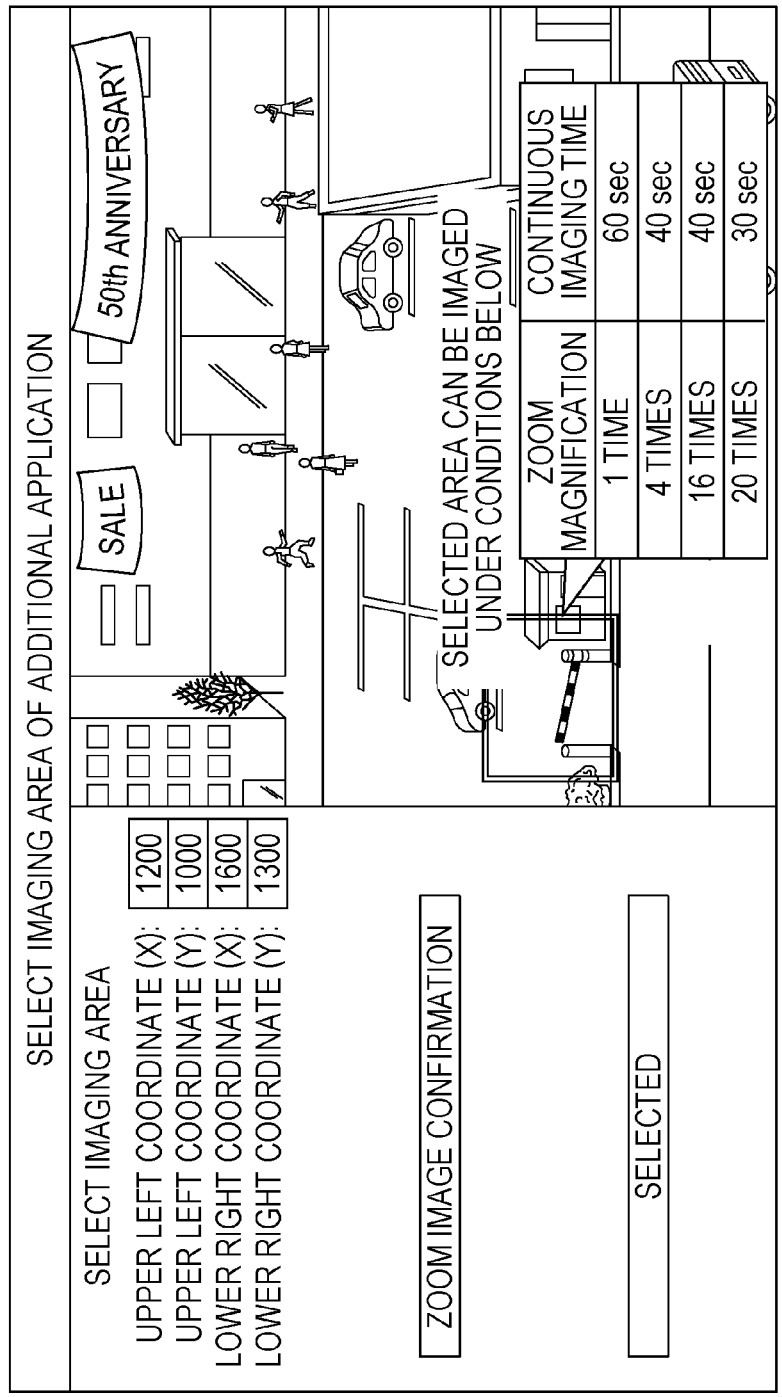
FIG. 25 shows a screen example of presenting securable resource information to a user according to the first embodiment.

FIG. 24 shows an example of the securable resource information generated as described above. As shown in FIG. 24, the securable resource information 2400 is information of the list with which the zoom magnification 2401 and the continuous imaging time 2402 are associated. The securable resource information includes the information indicating a zoom magnification and a continuous imaging time which can be used when installing an additional application onto the camera 200. The securable resource information generated by the securable resource information acquisition unit 120 of the management device 100 is transmitted to the display operation device 300 via the network. Upon receiving the securable resource information, the display operation device 300 displays, as shown in FIG. 25, a determination result as to whether a new application can be installed, and information comprising a set of continuous imaging time and a zoom magnification, which are allocated to the additional application if the new application can be installed.

At that time, if the time for imaging an additional imaging area needed by the additional application is not available in any schedule, the securable resource information acquisition unit 120 returns "the schedule for the additional application cannot be secured" to the request control unit 140, and the request control unit 140 causes the communication unit 110 to transmit, to the display operation device 300, information indicating that the additional application cannot be installed on the camera.

(Example of Securable Resource Information Preparation Processing by Using a Use Case)

Here, an example of preparing securable resource information according to the imaging area of the additional application is described more specifically by using two examples of the use case.

Setting values of the imaging area, zoom magnification, and continuous imaging time of the existing applications installed on the camera 200 are as shown in FIG. 6.

Example 1

An example of an additional application having the imaging area of X_min=1350, Y_min=1500, X_max=1590, and Y_max=1680 is described. Input of the above additional application imaging area by the user is performed by using an additional application information input screen of FIG. 9. Description of processing following the user's input up to completion of the schedule information preparation processing is omitted as being the same as described above. Here, the securable resource information preparation processing is described in detail.

In the step S2001 of FIG. 20, the securable resource information acquisition unit 120 performs a processing of determining a group with which the additional application imaging area can be captured simultaneously. In this example, the additional application imaging area is an area of X_min=1350, Y_min=1500, X_max=1590, and Y_max=1680. Since the critical imaging area of each group is as shown in FIG. 15, the critical imaging area of each of G1, G2, and G3 includes the above additional application imaging area within the range. Thus, in the step S2001, the securable resource information acquisition unit 120 determines that group numbers G1, G2, and G3 can be captured simultaneously by including an imaging area and an additional application imaging area corresponding to each of the group numbers into an imaging range of the camera 200.

As a result, group numbers G1, G2, and G3 are determined as groups which can be captured simultaneously.

For example, in the case of the group number G3, when a PTZ setting value is generated such that an imaging range of the camera 200 capturing an rectangular area having the width of 320×the height of 240 (pixels) is within the area D101 corresponding to a critical imaging area as shown in FIG. 13, the area D100 (imaging area needed by an existing application of the application number 3) is always included in an imaging range of the camera 200 identified based on the PTZ setting value, as described above.

For example, being possible to simultaneously capture the group number G3 means that at least one PTZ setting value causing to include the area D100 within the area D101, and an additional application imaging area in an imaging range of the camera 200 exists.

Thus, when a PTZ setting value is generated such that a rectangular area of 320 in width×240 in height (pixels) including both the area D100 and the additional application imaging area within the area D101 corresponding to the critical imaging area becomes the imaging range, an imaging area needed by an application of the application number 3 (that is, area 100), and an imaging area needed by an additional application can be included simultaneously within the imaging range of the camera 200 identified based on the PTZ setting value.

On the other hand, since the additional application imaging area is not included in the critical imaging area of the group number G4 shown in FIG. 15, it is determined in the step S2001 that the additional application imaging area cannot be captured simultaneously when the group number G4 is captured. As a result, the group number G4 is determined as a group which cannot be captured simultaneously.

Next, in the step S2002, the securable resource information acquisition unit 120 prepares the securable resource calculation table. The securable resource calculation table is prepared based on groups G1, G2, and G3 determined as groups which can be captured simultaneously in the step S2001. The group information is as shown in FIG. 15, and the schedule information is as shown in FIG. 19. Thus, the securable resource calculation table is as shown in FIG. 38. In the step S2002, continuous imaging times listed in the securable resource calculation table are as shown in FIG. 38, as those are just transferred from FIG. 19. As the case may be, continuous imaging times in the securable resource calculation table are updated through a processing described later.

In the step S2003, the securable resource information acquisition unit 120 stores the internal variable "i" as 1 in the internal buffer.

In the step S2004, the securable resource information acquisition unit 120 acquires a group number of each of groups included in a schedule of the schedule number 1 on the securable resource calculation table. As the securable resource calculation table in the first embodiment is as shown in FIG. 38, the securable resource information acquisition unit 120 acquires group numbers G1, G2, G3, and G_remainder.

In the step S2005, since total four groups (groups corresponding to group numbers G1, G2, G3, and G_remainder) are registered in the schedule number 1 of the securable resource calculation table in the first embodiment, the process shifts to the step S2006.

Next, in the step S2006, the securable resource information acquisition unit 120 performs the total imaging time correction processing in consideration of re-sizing. A subsequent processing is described in accordance with a flowchart of FIG. 22.

First, in the step S2201, the variable "j" is stored as "1" in the internal buffer for preparation of a processing following the step S2102.

In the step S2201, since j=1, a first element in the securable resource calculation table is referred to, and a corresponding zoom magnification is used as a reference zoom magnification. Since the securable resource calculation table of the schedule number 1 is as shown in FIG. 38, the reference zoom magnification is 1.

Next, a row having a magnification larger than 1 time being the reference zoom magnification is searched for by sequentially referring to other rows in the securable resource calculation table. Since the securable resource calculation table is as shown in FIG. 38, groups having a magnification larger than 1 are [G2, G3, and G_remainder].

Thus, the result of searching in the step S2202 is "hit". Further, [groups G2, G3, G_remainder] is stored in the internal buffer as a reference zoom search result list.

In the step S2203, since the result is "hit", the process shifts to the step S2204.

In the step S2204, the sum of an imaging time corresponding to each of rows of G2, G3, and G_remainder hit by the search in the step S2203 is calculated. The imaging time of a row referred to in the step S2204 is as shown in FIG. 19 for group numbers G1 to G3, and as shown in FIG. 38 for the group number G_remainder. In the step S2203, the reference zoom search result list stored in the internal buffer is [group G2, G3, G_remainder]. Thus, the sum of a continuous imaging time in each row of groups G2, G3, and G_remainder is calculated. In this example, continuous imaging times of group numbers G2, G3, and G_remainder corresponding to the schedule number 1 are as shown in FIG. 38. Thus, the calculated sum of the continuous imaging time of group numbers G2, G3, and G=remainder is 40 seconds.

In the step S2205, the calculation result in the step S2204 is added to the continuous imaging time in the first row of the securable resource calculation table. Since the securable resource calculation table is as shown in FIG. 38, and the calculation result in the step S2204 is 40 seconds, the continuous imaging time of the securable resource calculation table in the first row is updated to 5+40=45 seconds.

After completion of the processing in the step S2205, the process shifts to a processing of the step S2206.

In the step S2206, since variable j=1 does not match the number of rows in the securable resource calculation table, the process shifts to the step S2207.

In the step S2207, "j" is updated to j+1, that is, j=2, and the process shifts to the step S2202.

Description of a processing for j=2 to j=3 is omitted as the processing is same as the case of j=1. The case of j=4 is described as the process flow thereof is different from the case of j=1.

In the step S2203, the reference zoom magnification becomes 20 as shown in FIG. 21. Since search result of the row having a magnification larger than the reference zoom magnification is "not hit", the process shifts to the step S2206.

In the step S2206, since j=4 (number of rows in the securable resource calculation table), the securable resource information acquisition unit 120 ends the total imaging time correction processing in consideration of re-sizing.

Next, the securable resource information acquisition unit 120 ends the processing of the step S2006. FIG. 21 shows a content of the securable resource calculation table after the processing in the step S2006.

After completing the processing of S2006, the securable resource information acquisition unit 120 shifts to a processing of the step S2007.

In the branch of the step S2007, the process shifts to the step S2008 since i=1 is not equal to the number of schedules.

In the step S2008, "i" is updated to 2, and the process shifts to the step S2004.

Description of a processing for i=2 to i=38 is omitted as the processing is same as the case of i=1. The case of i=39 is described as the process flow thereof is different from i=1.

Hereinafter, description is focused on a processing different from the case of i=1.

In the step S2004, since i=39, the securable resource information acquisition unit 120 acquires group numbers belonging to the schedule number 39, that is, G3 and G4.

In the step S2005, since a plurality of groups are registered in the securable resource calculation table, the process branches to the step S2006.

In the step S2203, since the search result is "hit", the reference zoom search result list is stored in the internal buffer as [group G_remainder].

In the step S2203, since the search result in the step S2203 is "hit", the process shifts to the step S2204.

In the step S2204, since the reference zoom search result list stored in the internal buffer in the step S2203 is [group G_remainder], a continuous imaging time of 30 seconds of the group G_remainder is obtained in the step S2204.

In the step S2205, since the calculation result in the step S2204 is 30 seconds, the continuous imaging time of the securable resource calculation table in the first row is updated to 40 seconds.

In the step S2206, since j=1, the process shifts to the step S2207.

In the step S2207, since a similar processing is also performed for a next row of the securable resource calculation table, "j" is updated to 2, and the process shifts to the step S2202.

In the step S2202, the reference zoom magnification becomes 20 as shown in FIG. 38. No row having a zoom magnification larger than 20 times exists in the securable resource calculation table shown in FIG. 38. Thus, search result of the row having a magnification larger than the reference zoom magnification is "not hit", and the process shifts to the step S2206.

In the step S2206, since processing for all rows of the securable resource calculation table has completed with j=2, the process branches to the end.

FIG. 21 shows a content of the securable resource calculation table after the processing in the step S2206.

In the step S2007, since processing has completed for all schedules, the process shifts to the step S2008.

In the step S2008, securable resource calculation table merging processing is performed. A subsequent process is described in accordance with a flowchart shown in FIG. 23.

In the step S2301, since the securable resource calculation table is as shown in FIG. 21, a zoom magnification corresponding to each of the groups is 1 time for G1, 4 times for G2, 16 times for G3, and 20 times for G4. In the step S2302, a largest continuous imaging time is obtained for each of groups listed in the step S2301. Since the securable resource calculation table is as shown in FIG. 21, the largest continuous imaging time is 60 seconds for G1 (with zoom magnification of 1 time), 40 seconds for G2 (with zoom magnification of 4 times), 40 seconds for G3 (with zoom magnification of 16 times), and 30 seconds for G4 (with zoom magnification of 20 times).

Finally, in the step S2303, securable resource information is generated based on results of steps S2301 and S2302, and the securable resource information shown in FIG. 24 is obtained.

After completion of the processing of the step S2303, the securable resource information acquisition unit 120 ends the securable resource generation processing.

The securable resource information acquisition unit 120 outputs securable resource information acquired in the above processing to the request control unit 140. Then, the request control unit 140 transmits the received securable resource information to the display operation device 300 via the communication unit 110.

The securable resource information thus generated is presented to the user through the display operation device 300 as shown in FIG. 25.

Example 2

An example of an additional application imaging area of X_min=2000, Y_min=1000, X_max=2240, and Y_max=1180 is described. Input of the above additional application imaging area by user is performed by using the additional application information input screen. Description of a processing following the end of the user's input up to completion of the schedule information preparation processing in the step S1002 is omitted as being the same as described above.

The securable resource information preparation processing in the step S1003 and subsequent processing is described in detail.

In the step S2001, the securable resource information acquisition unit 120 performs a processing of determining a group with which the additional application imaging area can be captured simultaneously. In this example, the additional application imaging area is an area of X_min=2000, Y_min=1000, X_max=2240, and Y_max=1180. Since critical imaging areas of respective groups are as shown in FIG. 12, each of the critical imaging areas does not include the above additional application imaging area within a range thereof. Thus, in the step S2001, the securable resource information acquisition unit 120 determines that there is no group which can be captured simultaneously.

In the step S2002, the securable resource information acquisition unit 120 prepares the securable resource calculation table. In the step S2001, it is determined that there is no group which can be captured simultaneously. Thus, the securable resource calculation table is prepared only with the G_remainder as an element. The securable resource calculation table generated in the step S2002 is as shown in FIG. 26.

In the step S2003, the securable resource information acquisition unit 120 stores the internal variable "i" as 1 in the internal buffer.

In the step S2004, the securable resource information acquisition unit 120 acquires a group number of each of groups of the schedule number 1. In the example 2 of the first embodiment, the group number on the securable resource calculation table is as shown in FIG. 26, the group number G_remainder is acquired.

In the step S2005, since the number of groups registered in the securable resource calculation table of the schedule number 1 in the first embodiment is one, the process shifts to the step S2007.

In the branch of the step S2007, since i=1, the process shifts to the step S2009.

In the step S2009, "i" is updated to 2, and the process shifts to the step S2004.

Description of processing for i=2 to i=38 is omitted as the processing is same as the case of i=1.

The case of i=39 is described as the process flow thereof is different from i=1.

In the step S2004, since i=39, the securable resource information acquisition unit 120 acquires group number [G_remainder] belonging to the schedule number 2.

In the step S2005, since the number of groups registered in the securable resource calculation table is one, the process branches to the step S2007.

In the step S2007, since processing has completed for all schedules, the process shifts to the step S2008.

In the step S2008, the securable resource calculation table merging processing is performed. A subsequent process is described in accordance with a flowchart shown in FIG. 23.

In the step S2301, since the securable resource calculation table is as shown in FIG. 26, the zoom magnification appearing on the list is [20 times].

In the step S2302, a largest continuous imaging time is obtained for each of zoom magnifications listed in the step S2301. Since the securable resource calculation table is as shown in FIG. 26, the continuous imaging time of G_remainder is 30 seconds (with the zoom magnification of 20 times).

Figure 27:
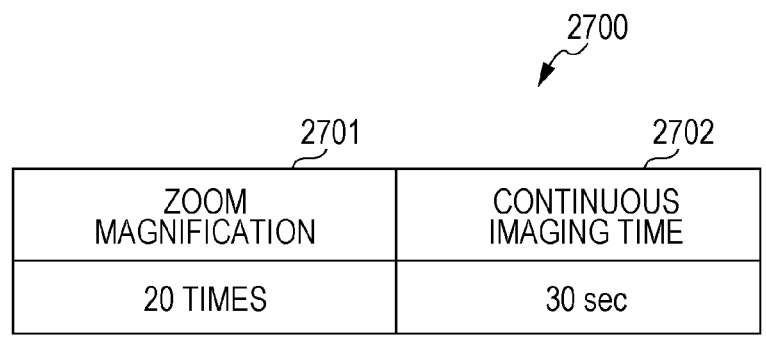
FIG. 27 shows an example of a securable resource calculation table relative to an input example 1 according to the first embodiment.

Finally, in the step S2303, securable resource information is generated based on results of steps S2301 and S2302, and the securable resource information shown in FIG. 27 is obtained.

After completion of the processing of the step S2303, the securable resource information acquisition unit 120 ends the securable resource generation processing.

The securable resource information acquisition unit 120 outputs securable resource information acquired in the above processing to the request control unit 140.

Description of subsequent processing up to display of the securable resource information on the display unit 320 of the display operation device 300 is omitted as being the same as described above.

As apparent by comparing results of Example 1 and Example 2, resulting zoom magnification and imaging time in the list are different according to an imaging area to be captured by the additional application. That is, the result can be outputted according to the position of the imaging area of the additional application. Since the management device 100 can present the imaging time for each of any available zoom magnifications, a plurality of imaging plans can be presented for the additional application.

CONCLUSION

In the first embodiment, the imaging range which can be captured at one time by the camera 200 compatible with the imaging device varies according to the zoom magnification. The camera 200 includes a PTZ mechanism capable of changing the orientation and zoom magnification thereof. Therefore, the orientation and the size of imaging range of the camera 200 can be changed by controlling the PTZ mechanism.

Movable directions of the camera 200 include a horizontal direction (pan), and a vertical direction (tilt).

Control information corresponding to a set of the orientation and zoom magnification of the camera 200 is referred to as the PTZ setting value. The orientation and the size of imaging range of the camera 200 can be identified by using one PTZ setting value.

The management device 100 acquires information relative to each of one or more existing applications already installed in the camera 200 (for example, the imaging area needed by each of applications, imaging time, and zoom magnification of the camera 200), and information relative to an imaging area newly needed by an application.

The management device 100 determines at least one combination of existing applications, and associates a determined combination with one group. The number of associated groups corresponds to the number of possible combinations of one or more existing applications (see FIG. 12).

The management device determines, for each of the associated groups, whether the orientation and the size of imaging range of the camera 200 including an imaging area needed by an existing applications included in the group can be identified by using one PTZ setting value, and extracts a group which can be identified by using one PTZ setting value (see FIG. 15). At that time, the size of imaging range of the camera 200 varies according to a zoom magnification set in the existing application included in the group. When a plurality of existing applications are included in the group, the size is determined with a largest zoom magnification out of zoom magnifications corresponding to each of a plurality of existing applications included in the group.

Next, a group combination pattern is prepared by using the group so as to include all existing applications (see FIG. 17B). Then, the imaging time of each group in each of combination patterns is determined. The imaging time is determined such that total imaging time of a group to which each of existing applications belongs is equal to (or longer than) an imaging time predetermined for each of the existing applications.

At that time, a total imaging time of a group of the combination pattern longer than a predetermined unit time (in the first embodiment, 1 minute) is dumped.

After generating schedule information by determining the imaging time of each group in the combination pattern in such a manner (see FIG. 19), the following processing is performed for each group included in the combination pattern shown in the schedule information.

First, one schedule number shown in the schedule information is identified. Next, the following processing is performed for each group shown in the identified schedule number. The management device 100 identifies one of the schedule numbers in the schedule information. Next, the following processing is performed for each group included in the specified combination pattern. The management device 100 determines whether both an imaging area of an additional application, and an imaging area needed by an existing application included in the group can be included simultaneously in an imaging range of a size determined by a zoom magnification predetermined for an existing application included in the group (first determination).

The above determination can be performed by determining whether orientation of the camera 200 can be adjusted such that an imaging range of the camera 200 having the above size can simultaneously include an imaging area of an additional application, and an imaging area need by the existing application included in the group.

When determined that an imaging area of an additional application, and an imaging area needed by the existing application included in the group can be included in the imaging range of the camera 200 (when the first determination is affirmative), the management device 100 keeps the PTZ setting indicating the orientation of the camera 200 and the size of imaging range (zoom magnification) satisfying the above determination. Information of the orientation of the camera 200 stored by the PTZ setting is information for adjusting (panning and tilting) the orientation of the camera 200 such that the imaging area of an additional application and an imaging area needed by the existing application included in the group can be simultaneously included in the imaging range of the camera 200.

Information of the zoom magnification of the camera 200 stored by the PTZ setting is a maximum value of the zoom magnification needed by the existing application included in the group. The group is associated with the zoom magnification. Thus, a total imaging time corresponding to the zoom magnification is calculated.

In this case, total imaging time correction processing in consideration of resizing is performed to calculate an imaging time corresponding to the zoom magnification. Zoom magnification correction processing is a processing to add an imaging time corresponding to a group having a high zoom magnification to an imaging time corresponding to a group having a low zoom magnification, when a first determination satisfies multiple groups shown in the identified schedule number.

Total imaging time correction processing in consideration of resizing is a processing performed to add a difference between a total imaging time of multiple groups shown in the identified schedule number and a predetermined unit time (1 minute) to an imaging time corresponding to the zoom magnification, if the total imaging time is less than the predetermined unit time. A securable resource calculation table is generated by performing the above processing for all schedule numbers shown in the schedule information. Then, securable resource information is generated by calculating, for each of zoom magnifications, a maximum value of imaging times shown in the securable resource calculation table (see FIG. 24).

In this case, as information indicating that the additional application can be installed on the camera 200, a message of "the designated area can be imaged on the following condition" and securable resource information including a maximum value of the time length available for capturing an imaging area needed by the additional application when the zoom magnification needed by the additional application is set to be a zoom magnification needed by any one of one or more existing applications are presented to the display operation device 300.

The securable resource information includes a maximum value of the time length available for capturing an imaging area needed by the additional application when the zoom magnification needed by the additional application is set to be a zoom magnification (in this case, 20 times) not needed by any one of the existing applications (for example, see FIG. 25).

Thus, the user using the display operation device 300 can determine that the additional application can be installed on the camera 200. Time obtained by subtracting the total imaging time from a predetermined unit time (1 minute) means a time (remaining time) not allocated to capturing by the camera 200 in the unit time.

The management device 100 also determines whether a total value of imaging times (total imaging time) of groups included in the combination pattern is shorter than a predetermined unit time (1 minute) (second determination). When determined that the total imaging time is shorter than the predetermined unit time (1 minute) (when result of the second determination is affirmative), a time obtained by subtracting the total imaging time from the predetermined unit time (1 minute) becomes the time length available for capturing when an additional imaging area for the additional application is set as a new imaging range of the camera 200. In this case, a PTZ setting value corresponding to the imaging range of the camera 200 including an additional imaging area is generated and retained.

Figure 28:
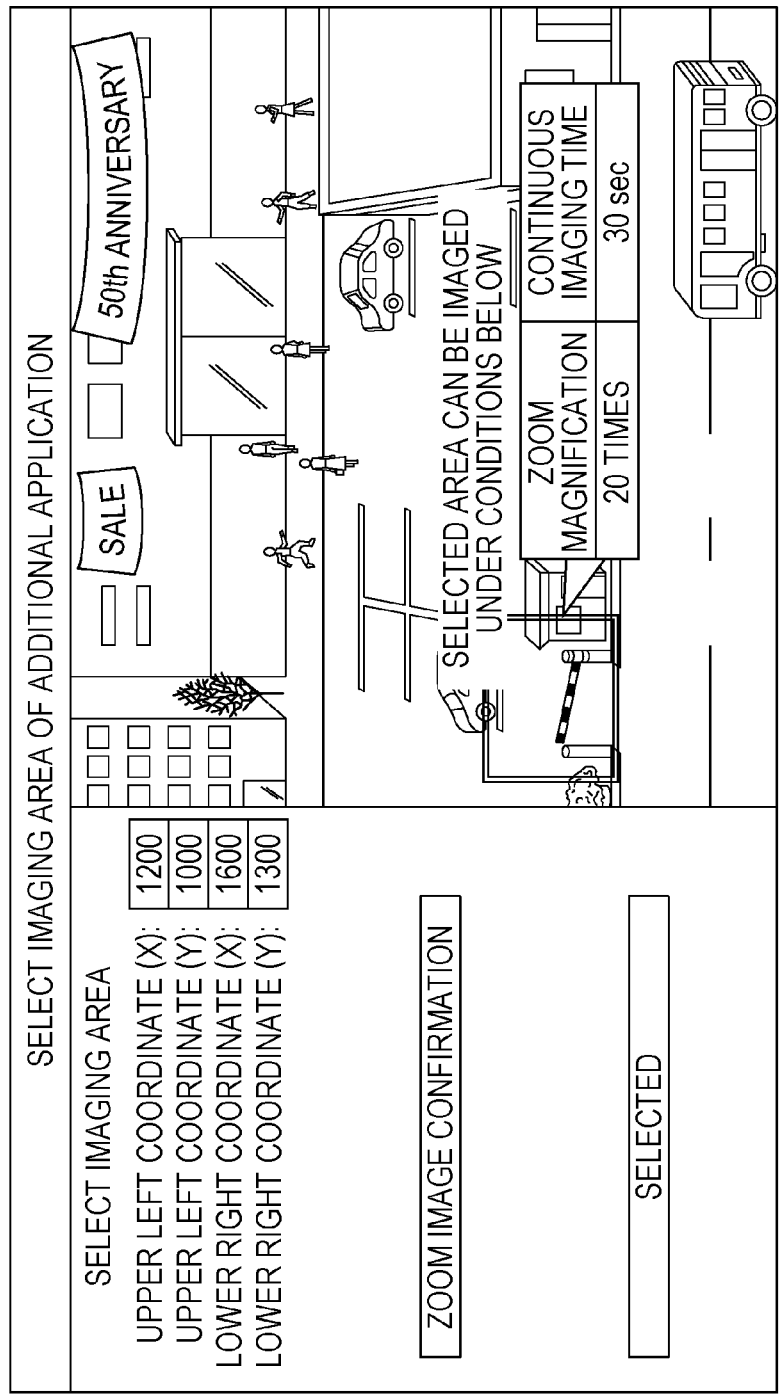
FIG. 28 shows a screen example of presenting securable resource information to a user according to the first embodiment.

As information indicating that the additional application can be installed in the camera 200, a message of "the designated area can be imaged on the following condition" information related to the securable resource information are presented to the display operation device 300. The securable resource information comprises a time length obtained by subtracting the total imaging time from the above unit time as a maximum time length available for capturing the imaging area needed by the additional application with a zoom magnification needed for the additional application (for example, see FIGS. 25, and 28).

For example, when any one of sets of the zoom magnification and the time obtained by subtracting the total imaging time from the above unit time presented to the display operation device 300 is selected by the display operation device 300, information corresponding to a selected set is transmitted to the camera 200.

For example, consider a case where a set of the zoom magnification of 1 time and the continuous imaging time of 60 seconds shown in FIG. 25 is selected. As shown in FIG. 21, the schedule number 24 of the group number G1 with the continuous imaging time of 60 seconds is selected.

For example, if the group number G1 includes a plurality of schedule numbers with the continuous imaging time of 60 seconds, any one of the plurality of schedule numbers is selected.

At that time, the continuous imaging time of the group number G1 (or with a zoom magnification of 1 time) shown in FIG. 21 includes an imaging time (20 seconds) of the group number G1, a continuous imaging time (10 seconds) of the group number G2, an imaging time (10 seconds) of the group number G3, and a continuous imaging time (20 seconds) of the group number G_remainder.

As shown in FIG. 19, a continuous imaging time of the group number G4 in the schedule number 24 is 0 second.

A pickup image of the group number G2, a pickup image of the group number G3, and a pickup image of the group number G_remainder are respectively captured with a zoom magnification shown in FIG. 21.

A pickup image of the group number G2, a pickup image of the group number G3, and a pickup image of the group number G_remainder are those captured respectively with a zoom magnification shown in FIG. 21.

On the contrary, when utilizing a pickup image of the group number G2, a pickup image of the group number G3, and a pickup image of the group number G_remainder as an image with a zoom magnification of 1 time, these pickup images are re-sized respectively to a pickup image with a zoom magnification of 1 time.

PTZ information and imaging time corresponding to each of the above group numbers are transmitted to the camera 200.

When utilizing a pickup image obtained with corresponding PTZ information, and imaging time for each of group numbers G2, G3, and G_remainder for an original purpose of each of the group numbers, an image captured with a corresponding zoom magnification is used.

When utilizing a pickup image obtained with corresponding PTZ information, and imaging time for each of group numbers G2, G3, and G_remainder as an image with a zoom magnification of 1 time, an image captured with a corresponding zoom magnification is used by re-sizing to an image with a zoom magnification of 1 time.

When results of both the first and second determinations are negative, the additional application cannot be newly installed on the camera. In this case, information indicating that the additional application cannot be installed on the camera 200 is presented on the display operation device 300. Thus, an imaging system according to the first embodiment just needs user's input of an imaging range to be captured with an additional application through a display operation device 300, then a management device 100 determines whether a new application can be installed, and determined that the new application can be installed, presents a securable zoom magnification and imaging time.

In an imaging system according to this embodiment, especially, since determination as to whether an additional application can be installed is made based on whether an imaging condition (imaging area and imaging time) needed by a plurality of applications can be satisfied by one PTZ setting, more applications can be installed and run on the camera 200 compared with a case where applications are run by a scheduling in a simple time robin mode.

Second Embodiment

In the first embodiment described above, a method of preparing securable resource information in the management device 100 is shown. In the second embodiment, a method of further enhancing user's convenience in preparation of securable resource information is described.

That is, although securable resource information according to the first embodiment just presents a zoom magnification and an imaging time available for capturing in a selected imaging area, securable resource information according to the second embodiment not only includes the selected imaging area, but also further presents selectable imaging area information indicating a maximum range expandable from the selected imaging area (or a range available for capturing a wider area) under the condition of the zoom magnification and imaging time.

Hereinafter, a detail of the method therefor is described.

In the second embodiment, since the basic configuration is common to the first embodiment, only differences from the first embodiment are described, and description of other details is omitted.

Specifically, the second embodiment is different from the first embodiment in the securable resource calculation table merging processing in the securable resource information preparation processing of the management device 100. Therefore, the securable resource information acquisition unit 120 also has a function of identifying and associating a selectable imaging area with securable resource information, in addition to functions shown in the first embodiment.

FIG. 29 shows a format of securable resource information generated by the securable resource information acquisition unit 120 in the second embodiment. As shown in FIG. 29, unlike securable resource information according to the first embodiment, the securable resource information is further associated with information of the selectable imaging area.

Figure 30:
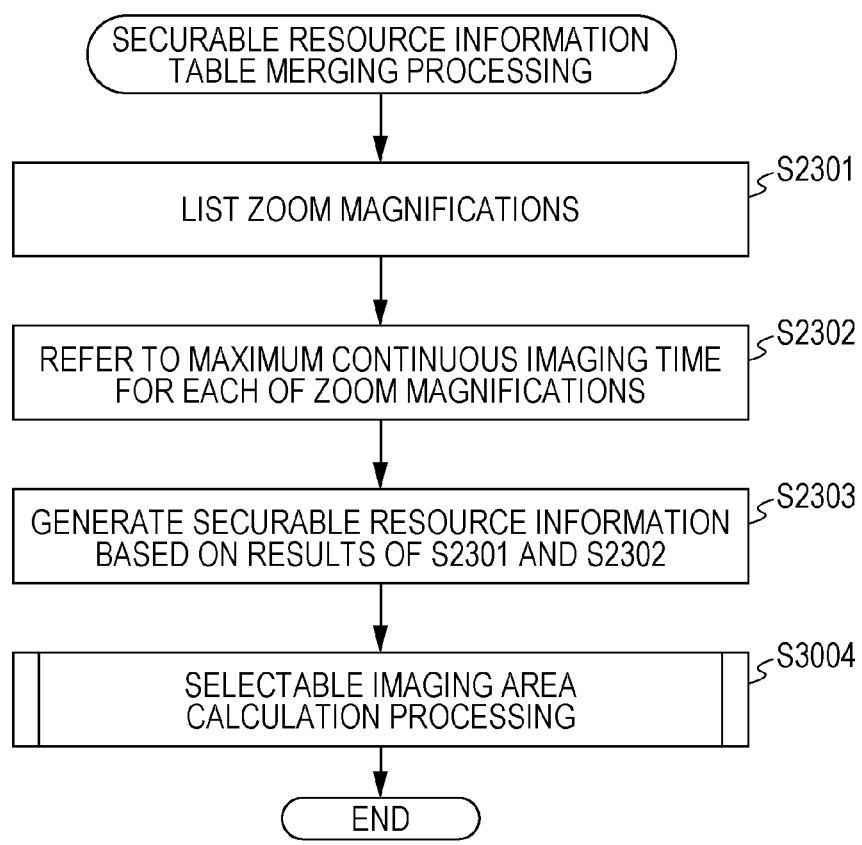
FIG. 30 is a flowchart showing a securable resource calculation table merging processing according to the second embodiment.

FIG. 30 is a flowchart of the securable resource calculation table merging processing in the second embodiment. Unlike a securable resource calculation table merging processing of FIG. 23 shown in the first embodiment, the securable resource information acquisition unit 120 further performs a selectable imaging area calculation processing shown in the step S3004.

Figure 31:
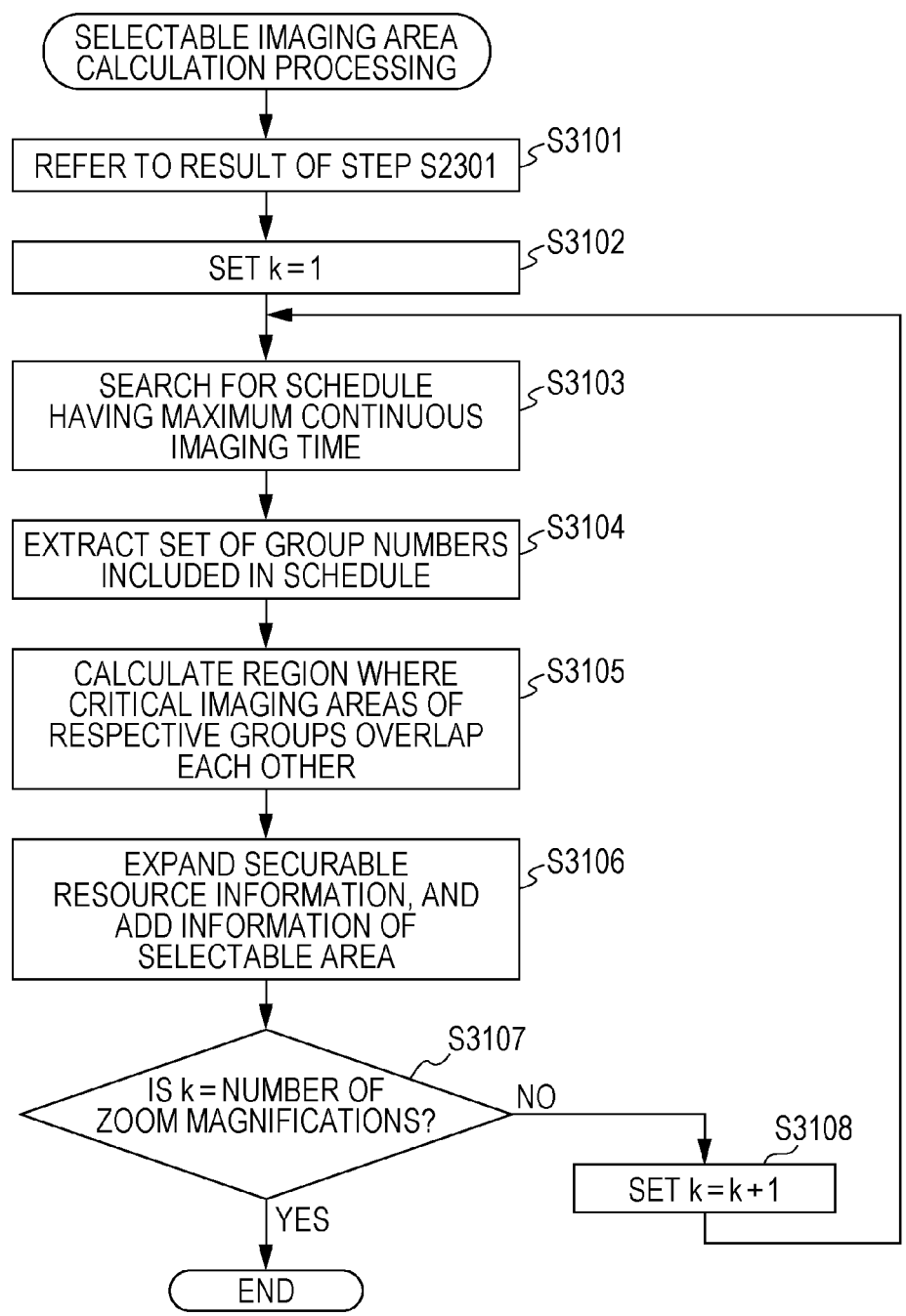
FIG. 31 is a flowchart showing a selectable imaging area calculation processing according to the second embodiment.

FIG. 31 is a flowchart showing operation of the selectable imaging area calculation processing performed by the management device 100 according to the second embodiment.

First, the securable resource information acquisition unit 120 refers to the array of zoom magnifications listed in the securable resource information calculation table stored in the internal buffer in the step S2301 (step S3101).

Next, the securable resource information acquisition unit 120 sets the internal variable "k" used for the selectable imaging area calculation processing to 1 (step S3102).

The securable resource information acquisition unit 120 refers to a kth zoom magnification (hereinafter, referred to as the target zoom magnification) in the array of zoom magnifications referred to in the step S3101. Also, the securable resource information acquisition unit 120 performs the following processing with further reference to the securable resource calculation table generated in the step S2007 shown in the first embodiment.

The securable resource information acquisition unit 120 searches the securable resource calculation table for the schedule of a cell with maximum continuous imaging time with respect to a row of a zoom magnification same as the target zoom magnification, and lists up schedule numbers thereof (step S3103).

Then, the securable resource information acquisition unit 120 extracts a set of group numbers having a zoom magnification larger than (or equal to) the target zoom magnification for all schedules of the listed schedule numbers (step S3104). At that time, the securable resource information acquisition unit 120 deletes any duplicated set of group numbers.

Next, the securable resource information acquisition unit 120 calculates, for each set of extracted groups, an area in which all of critical imaging areas of groups included in the set overlap. The securable resource information acquisition unit 120 identifies maximum X_min and Y_min, and minimum X_max and Y_max out of X_min, Y_min, X_max, and Y_max of each of critical imaging areas of groups included in the extracted set. Then, the securable resource information acquisition unit 120 identifies a rectangle having an apex formed by identified X_min, Y_min, X_max, and Y_max, as a selectable imaging area (step S3105). Here, the continuous imaging time shown in each cell of the securable resource calculation table is calculated by also taking into account the capturing in all groups having a zoom magnification larger than the target zoom magnification. Therefore, an available range for capturing by all groups having a zoom magnification larger than the target zoom magnification becomes the selectable imaging area.

If the securable resource calculation table generated in the step S2303 does not include a row of the selectable imaging area, the securable resource information acquisition unit 120 newly prepares a row of the selectable imaging area, and posts information of the calculated selectable imaging area into a cell corresponding to the target zoom magnification (step S3106).

The securable resource information acquisition unit 120 determines whether "k" matches the number of elements in the array of the zoom magnification (step S3107). When not matching (NO in the step S3107), "k" is incremented by 1 (step S3108), and the process returns to the step S3103. When matching (YES in the step S3107), the process ends.

(Example of Securable Resource Calculation Table Merging Processing by Using a Use Case)

Hereinafter, operation of the securable resource information acquisition unit 120 in the second embodiment is described by using a specific use case. Setting values of the imaging area, zoom magnification, and continuous imaging time of the existing applications already operating in the camera 200 are as shown in FIG. 6 similarly with the first embodiment. Also, similarly with the first embodiment, the additional application imaging area is an area of X_min=1350, Y_min=1500, X_max=1590, and Y_max=1680. Thus, the securable resource calculation table according to the second embodiment is the same as the table shown in FIG. 21.

Description of processing from the step S2301 to the step S2303 in FIG. 30 is omitted as being the same as the first embodiment. Therefore, a selectable imaging area calculation processing of the step S3004 and subsequent steps is described hereinafter.

In the step S3101, the securable resource information acquisition unit 120 refers to the array of zoom magnifications stored in the internal buffer in the step S2301. In this case, the list referred to is [1 time, 4 times, 16 times, and 20 times].

In the step S3102, the securable resource information acquisition unit 120 stores the internal variable k=1 in the internal buffer.

In the step S3103, the securable resource information acquisition unit 120 selects the target zoom magnification of 1 time which is a first zoom magnification.

Next, with reference to the securable resource calculation table, the securable resource information acquisition unit 120 lists up schedule numbers of a schedule in a cell with maximum continuous imaging time with respect to a row of a zoom magnification of 1 time. Since the securable resource calculation table according to the second embodiment is the same as the table shown in FIG. 21, the schedule number to be listed up is [24].

In the schedule of the schedule number 24, group numbers having a zoom magnification equal to or larger than the target magnification are [G1, G2, G3, and G_remainder]. Since there is no duplication of sets of groups, result of the step S3104 is [G1, G2, G3, G_remainder].

In the step S3105, the securable resource information acquisition unit 120 calculates an area in which all critical imaging areas of groups [G1, G2, G3, G_remainder] overlap each other. Since the critical imaging area of each of groups [G1, G2, G3, and G_remainder] is as shown in FIG. 15, the overlapping area is in the coordinates of X_min=1300, Y_min=1440, X_max=1700, and Y_max=1690. Since the critical imaging area of G_remainder is a whole range which can be captured by the camera 200, the selectable imaging area is in the coordinates of X_min=0, Y_min=0, X_max=5000, and Y_max=3000.

In the step S3106, the securable resource information acquisition unit 120 adds a cell of the selectable imaging area, corresponding to the target zoom magnification, to the securable resource information. Further, the overlapping area is posted into the added cell as a selectable imaging area corresponding to the target zoom magnification.

In the step S3107, since the number of elements in the array of the zoom magnification is 4, and k=1, the process branches to the step S3108.

In the step S3108, the value of k is incremented by 1 to k=2, and the process shifts to the step S3103.

In the step S3103, the securable resource information acquisition unit 120 selects the target zoom magnification of 4 times which is a second zoom magnification.

Next, with reference to the securable resource calculation table, the securable resource information acquisition unit 120 lists up schedule numbers of a schedule in a cell with a maximum continuous imaging time with respect to a row of a zoom magnification of 4 times on the securable resource calculation table. Since the securable resource calculation table according to the second embodiment is the same as the table shown in FIG. 21, schedule numbers to be listed up are [1, 4, 7, 8, 12, 24, 37, 38].

In the step S3104, the securable resource information acquisition unit 120 extracts sets of group numbers having a zoom magnification equal to or larger than 4 times being the target zoom magnification with respect to all schedules of schedule numbers [1, 4, 7, 8, 12, 24, 37, 38]. Since the securable resource calculation table according to the second embodiment is as shown in FIG. 21, result of the step S3104 is [G2, G3, G_remainder].

In the step S3105, the securable resource information acquisition unit 120 calculates an area in which all critical imaging areas of groups [G2, G3, G_remainder] overlap each other. Since critical imaging areas of groups [G2, G3, and G_remainder] are as shown in FIG. 15, the overlapping area is in the coordinates of X_min=1300, Y_min=1440, X_max=1700, and Y_max=1690.

In the step S3106, the securable resource information acquisition unit 120 adds a cell of the selectable imaging area, corresponding to the target zoom magnification of 4 times, to the securable resource information. Further, the overlapping area is posted into the added as a selectable imaging area corresponding to the target zoom magnification.

In the step S3107, since the number of elements in the row of the zoom magnification is 4, and k=2, the process branches to the step S3108.

In the step S3108, the value of k is incremented by 1 to k=3, and the process shifts to the step S3103.

Description of a processing for k=3 is omitted as being the same as described above.

A processing for k=4 is described as the process flow thereof is different from the above.

In the step S3103, the securable resource information acquisition unit 120 selects a target zoom magnification of 20 times which is a fourth zoom magnification.

Next, with reference to the securable resource calculation table, the securable resource information acquisition unit 120 lists up a schedule number of a schedule in a cell with a maximum continuous imaging time with respect to a row of the target zoom magnification of 20 times on the securable resource calculation table. Since the securable resource calculation table according to the second embodiment is the same as the table shown in FIG. 21, schedule numbers to be listed up are [25, 30, 39].

In the step S3104, the securable resource information acquisition unit 120 extracts sets of group numbers having a zoom magnification equal to larger than the target zoom magnification of 20 times with respect to schedules of the schedule numbers [25, 30, 39], and deletes any duplicate set. Since the securable resource calculation table according to the second embodiment is as shown in FIG. 21, result of the step S3104 is [G_remainder].

In the step S3105, the securable resource information acquisition unit 120 calculates an area in which all critical imaging areas of groups of [G_remainder] overlap each other. Since the critical imaging area of G_remainder is a whole range which can be captured by the camera 200, the overlapping area is in the coordinates of X_min=0, Y_min=0, X_max=5000, and Y_max=3000.

In the step S3106, the securable resource information acquisition unit 120 adds a cell of the selectable imaging area, corresponding to the target zoom magnification of 20 times, to the securable resource information. Further, the overlapping area is posted into the added cell as a selectable imaging area corresponding to the target zoom magnification.

In the step S3107, since the number of elements in the column of the zoom magnification is 4, and k=4, the process branches to the end.

After completion of the processing in the step S2304, the securable resource information acquisition unit 120 ends the securable resource generation processing.

Figure 32:
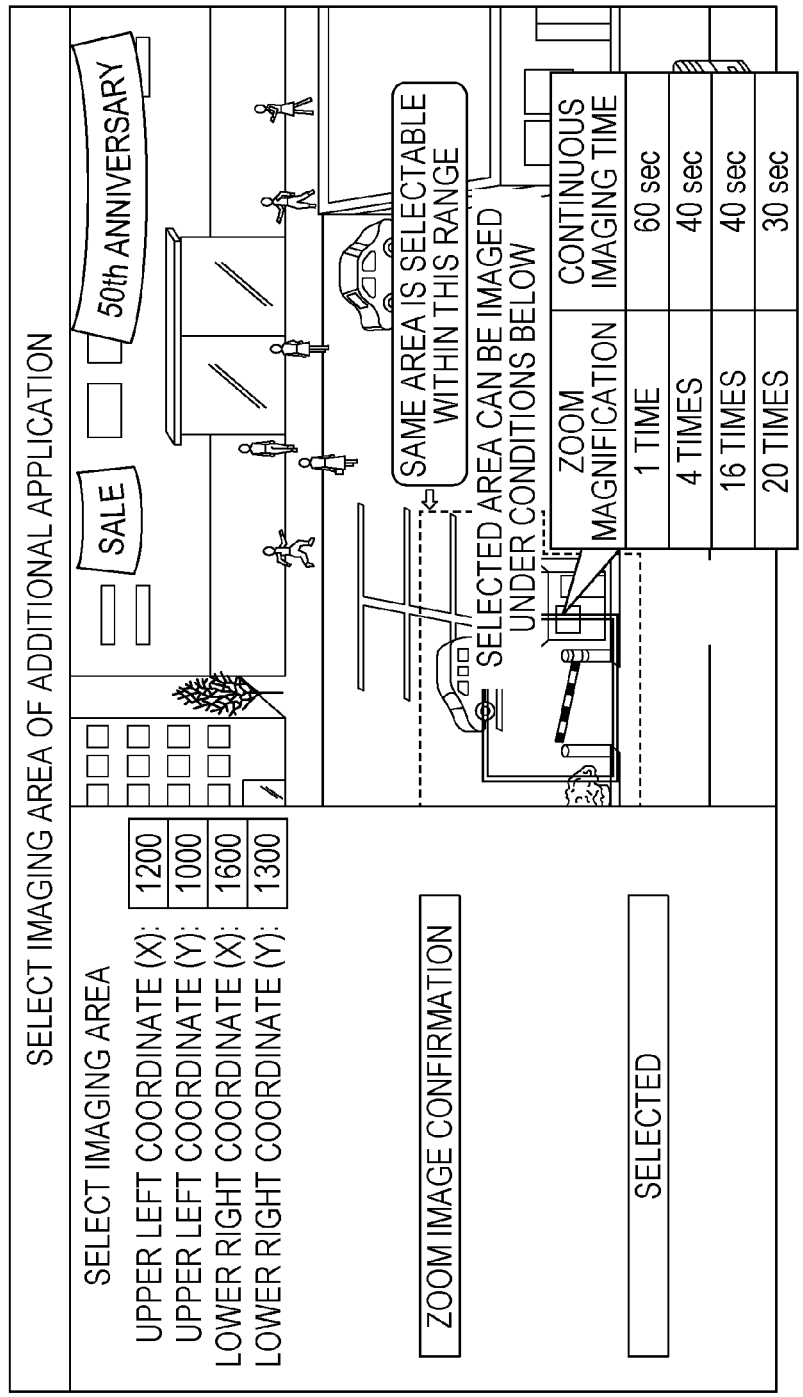
FIG. 32 shows a screen example of presenting securable resource information to a user according to the second embodiment.

Since securable resource information thus generated includes information of the selectable imaging area corresponding to each zoom magnification as shown in FIG. 29, the display operation device 300 further can visually display a selectable imaging area of which corresponding zoom magnification is 1 time, 4 times and 16 times with using the generated resource information, as shown by a frame of dotted line in FIG. 32. Thus, the user can capture an image in a wider range, and provide an image picking up a portion in a range more convenient for an application issued by the application issuing server 400.

<Variant>

Although the imaging system according to the present disclosure is described in accordance with the embodiments described above, the present disclosure is not limited thereto. Hereinafter, variants included as a concept of the present disclosure are described.

(1) In the first embodiment described above, an example that the management device 100 includes the securable resource information acquisition unit 120 is shown. However, a device other than the management device 100 may include the securable resource information acquisition unit 120. For example, the camera 200 may include the securable resource information acquisition unit 120 Also, the display operation device 300 or the application issuing server 400 may include the securable resource information acquisition unit 120.

Figure 37:
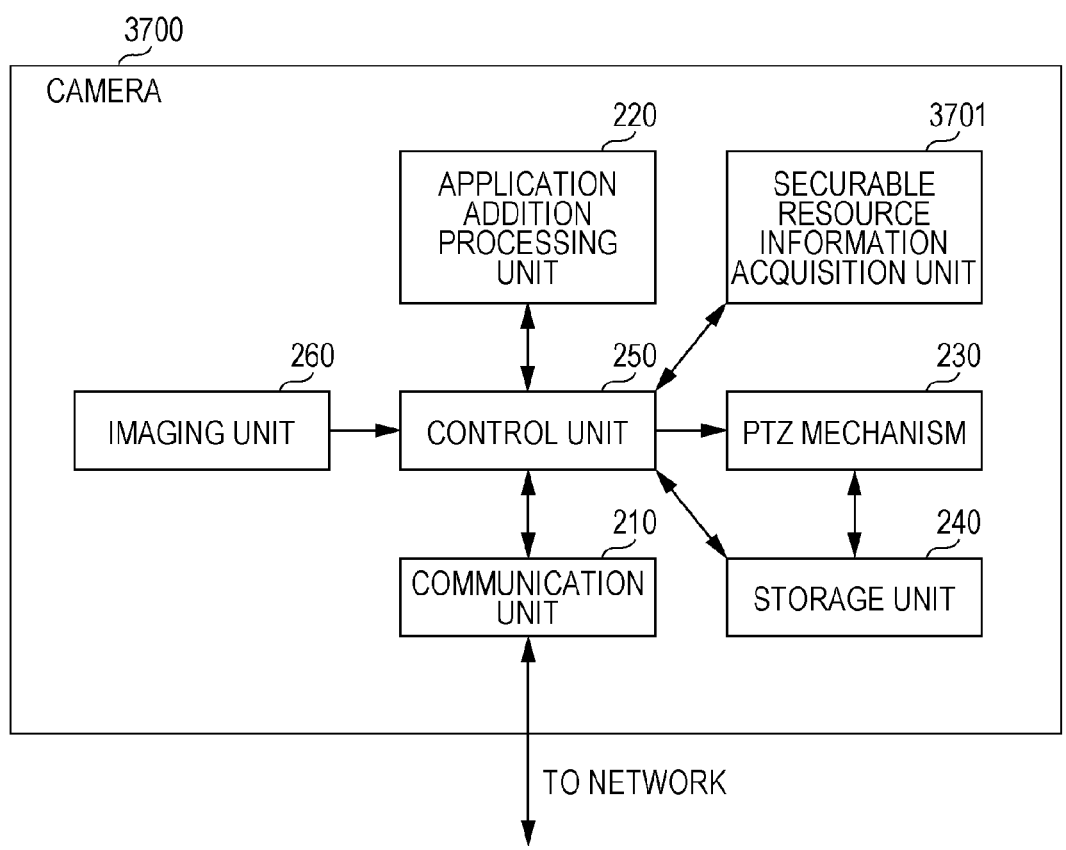
FIG. 37 is a functional block diagram of a camera according to a variant.

FIG. 37 is a functional block diagram showing an example of a camera 3700 including a securable resource information acquisition unit 3701. Upon receiving an instruction from the display operation device 300, and information of the imaging area of the additional application, the securable resource information acquisition unit 3701 determines whether the additional application can be installed, and if the additional application can be installed, prepares a list of the zoom magnification and imaging time, similarly with the securable resource information acquisition unit 120 shown in the embodiments described above. Then, the camera 3700 transmits the prepared list to the display operation device 300, and the display operation device 300 displays the information. Thus, the camera 3700 may generate the securable resource information. Similarly, the display operation device 300 including the securable resource information acquisition unit may generate the securable resource information.

(2) Although an example of entering the additional application from the display operation device 300 into the management device 100 via the network 500 is described in the first embodiment, the entry method is not limited thereto. For example, when an input device such as a monitor or a keyboard is provided in the management device 100, the user may directly input through an input device provided in the management device 100.

Similarly, although the management device 100 transmits generated information of whether the application can be installed to the display operation device 300 and displays it on the display operation device 300, this information may be displayed on a display device provided on the management device 100, if a display device such as a monitor is provided on the management device 100.

(3) In the above embodiments, schedule information is prepared without taking into account operation time (time for PTZ) of the camera 200 for panning, tilting, and zooming so as to simplify explanation for easy understanding. However, the schedule information may be prepared by taking into account the operation time. For example, the camera 200 may pre-store a time needed for panning or tilting by a predetermined amount, and a time for changing the zoom magnification. And the management device 100 may obtain the pre-stored time from the camera 200, and prepare schedule information with taking into account the operation time of the camera 200 in the schedule (here, the operation refers to operation of the camera 200 in a state of imaging an object up to directing the lens thereof toward a next imaging area).

(4) In the above first embodiment, the management device 100 prepares group information when determining whether a new application can be installed. However, the group information prepared in advance may be used. For example, group information prepared previously when determining whether an application can be installed may be used, or group information prepared by a user of the camera 200 may be transferred to the management device 100.

(5) In the above embodiments, although time is allocated to each group in the group combination in a unit of 5 seconds when preparing the schedule information (above condition (I)), the time is not limited thereto, and may be other time than 5 seconds. If a finer control is needed, the time may be allocated in a unit of a smaller time (for example, in a unit of 1 second or 0.5 millimeter seconds), and if there is no problem with a more rough control, the time may be allocated in a more rough time unit (for example, in a unit of 10 seconds, 1 minute, or 1 hour).

(6) In the above embodiments, when determining whether an additional application can be installed, fine processing is performed so as to calculate preferable zoom magnification and imaging time. However, a method other than those shown in the above embodiments may be used if the determination is made by focusing on whether imaging areas required by a plurality of applications can be captured with one PTZ setting.

For example, processing may be more simplified than the processing shown in the first embodiment. Specifically, for example, three applications of application numbers 1 to 3 are operated so as to make a round by completing respective applications in 20 seconds, 30 seconds, and 10 seconds. Here, for determining whether an additional application can be newly installed, it may be determined whether an imaging area needed for one of the existing applications 1 to 3 and an imaging area needed for the additional application are captured simultaneously by camera with one PTZ setting. Then, if determined that the imaging area needed for one of the existing applications 1 to 3 and the imaging area needed for the additional application are captured simultaneously by camera with one PTZ setting, then it may be determined that the additional application can be installed. For example, if both the imaging area of the additional application and the imaging area of the application number 2 can be captured by the camera with one PTZ setting, the zoom magnification and the imaging time of the application 2 may be presented as a zoom magnification and an imaging time selectable for the additional application.

(7) In the above embodiments, the management device 100 presents installation capability information of the additional application, and the zoom magnification and the imaging time, if the additional application can be installed. Further, the management device 100 may prepare and present a schedule of application execution on the camera 200. The above schedule may include not only information relative to the imaging time, zoom magnification, imaging range of each of groups included in the group combination pattern, but also information determining a capturing sequence among groups.

In this case, the schedule may be prepared in accordance with a previous scheduling, but in such a manner to capture groups included in the group combination pattern, and an additional application not included in any of the groups or having a remaining imaging time respectively, just for a predetermined continuous imaging time so as to complete within a predetermined time (within 1 minute in the above embodiments).

(8) In the above embodiments, an example of managing the imaging time in the second is shown. But, the time may be expressed, for example, with a frame rate of the camera 200 needed for each of the applications, or the number of imaging frames per unit time, but not with the time itself.

(9) Another example of the group information generating processing in the above first embodiment is described.

Figure 33:
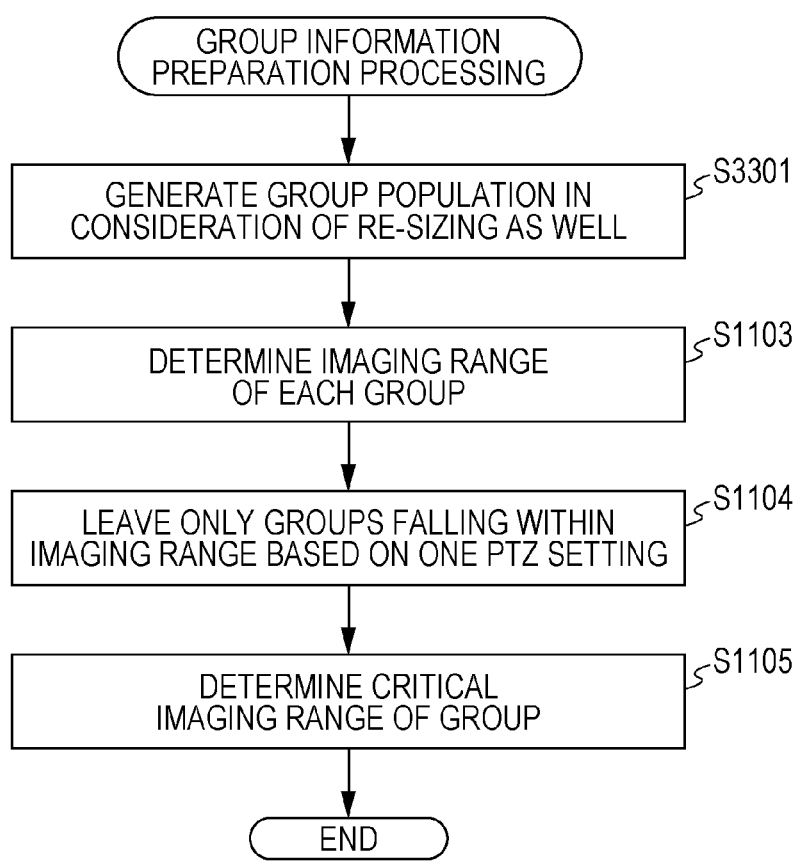
FIG. 33 is a flowchart showing a group information preparation processing according to the first embodiment.

Here, unlike the above first embodiment, the securable resource information acquisition unit 120 prepares the group information generation processing in accordance with a flowchart shown in FIG. 33, but not a flowchart shown in FIG. 11.

Specifically, in the step S1101 of FIG. 11, the securable resource information acquisition unit 120 generates one group population for the application combination of one pattern. The processing herein described is different from that processing in respect that a plurality of groups each of which has a different zoom magnification in consideration of re-sizing are generated for one application combination. Hereinafter, this processing is described with reference to FIG. 33.

Description is focused on differences from FIG. 11, and description of contents common to FIG. 11 is omitted.

Hereinafter, description is made by using an example in which one additional application of the application number 1, the imaging area of X_min=1000, Y_min=1000, X_max=1320, and Y_max=1240, and the zoom magnification of 4 times is registered as the imaging field angle information of the application in operation, and further, one application of the application number 1, and a continuous imaging time of 10 seconds is registered as the continuous imaging time of the application in operation.

Next, in the step S3301, the securable resource information acquisition unit 120 generates group information in consideration of re-sizing.

Specifically, the securable resource information acquisition unit 120 generates the array covering combinations of existing applications. In this variant, only one additional application of the application number 1 is registered. Thus, the number of combinations of additional applications is [1].

Next, the securable resource information acquisition unit 120 searches for a maximum zoom magnification out of zoom magnifications of additional applications belonging to the group.

The securable resource information acquisition unit 120 generates a group population based on the combination of additional applications, and the maximum zoom magnification. The group population according to this variant is as shown in FIG. 34A.

FIG. 34A shows an example of the group population according to this variant.

The securable resource information acquisition unit 120 generates a group population having the maximum zoom magnification with respect to each combination of additional applications. In addition, the securable resource information acquisition unit 120 generates a group population having a zoom magnification larger than the maximum zoom magnification. In this variant, the group population is prepared such that the maximum zoom magnification covers only zoom magnifications of 1 time and multiples of 4.

Since imaging field angle information of existing applications according to this variant is as described above, zoom magnifications of combination [1] of additional applications are 4 times, 8 times, 12 times, 16 times, and 20 times. Thus, the group population is as shown in FIG. 34A.

Although in the step S3301, the group population is prepared so as to cover only zoom magnifications of 1 time and multiples of 4, the present disclosure is not limited thereto. For example, a positive integer like "1 time, 2 times, 3 times, . . . " may be used as the magnification.

In the step S1103, the imaging range is determined as described above.

In the step S1104, a group falling within the imaging range of the camera 200 according to one PTZ setting is left as described above. As described above, maximum resolution of the camera 200 according to the first embodiment is 1280 in the width and 960 in the height, and maximum zoom magnification is 20 times. Therefore, processing is performed according to the above Equation (3), Equation (4), and information shown in FIG. 34B is obtained as the result of the processing.

In the step S1105, the securable resource information acquisition unit 120 calculates the critical imaging range as shown. Group information according to this variant is as shown in FIG. 35.

Hereafter, schedule information preparation processing of the step S1002, and schedule information preparation processing of the step S1003 are performed.

For example, processing of the securable resource information acquisition unit shown in FIG. 35 is performed with the imaging area in the imaging area information of the additional application as X_min=870, Y_min=910, X_max=910, and Y_max=940.

At that time, schedule information of the step S1002 is generated based on the group information of FIG. 35. Thus, in the securable resource information preparation processing of the step S1003, the total imaging time is also corrected in consideration of re-sizing for a zoom magnification different from those of additional applications belonging to the group.

An example of an additional application having the imaging area information of X_min=870, Y_min=910, X_max=910, and Y_max=940 is described. Since group information is as shown in FIG. 35, G1, G2, G3, and G4 are determined in the step S2001 as groups which can be captured simultaneously, and a securable resource calculation table is generated in the step S2002.

Thus, the securable resource information acquisition unit 120 can perform the step S2003 and subsequent steps for not only G1 whose zoom magnification is the same as the zoom magnification belonging to the group, but also G2, G3, and G4, which have different zoom magnifications.

In the step S2006, the securable resource information acquisition unit 120 also corrects the total imaging time in consideration of re-sizing in the step S2006 for groups G2, G3, and G4 having a zoom magnification other than a zoom magnification of each group.

Thus, the securable resource information acquisition unit 120 also can output securable resource information having a zoom magnification different from a zoom magnification of the group (additional application in operation).

As described above, this variant enables to perform securable resource information preparation processing based on group information with re-sizing also taken into account. Thus, the securable resource information acquisition unit 120 also can correct the total imaging time in consideration of re-sizing in the step S2006 for a zoom magnification other than a zoom magnification of each group. As a result, if one PTZ setting allows simultaneous image pickup, the sum of continuous imaging times of the group is posted in the securable resource information.

By performing this processing, the user may recognize more precise securable resource information with re-sizing taken into account, and thereby convenience of the imaging system can be enhanced.

(10) In the second embodiment described above, a securable maximum imaging area is identified as a selectable imaging area subject to a precondition to the additional application that the imaging area includes an imaging area selected by the user without changing a zoom magnification and a continuous imaging time posted in the securable resource information.

Figure 36:
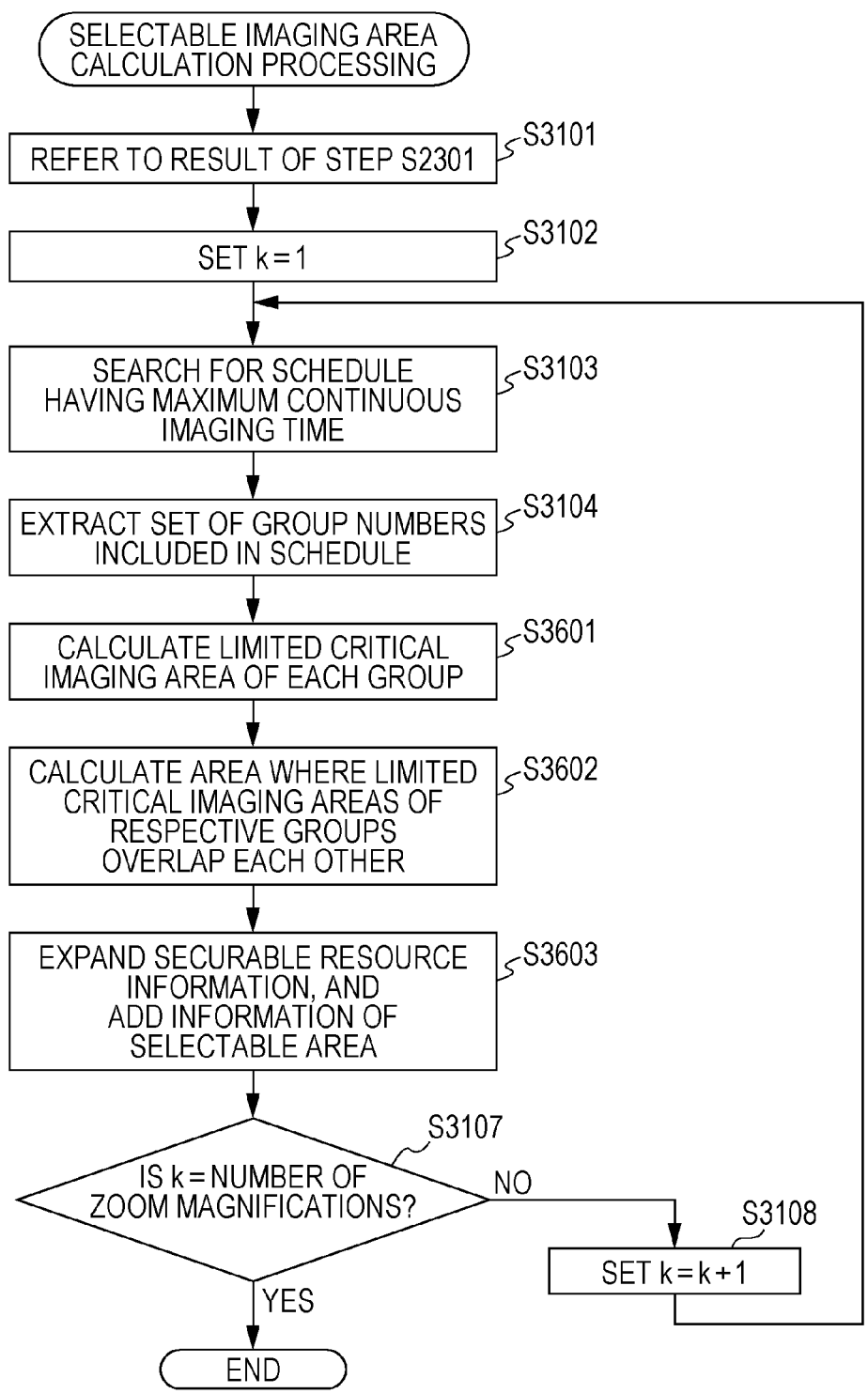
FIG. 36 is a flowchart showing a selectable imaging area calculation processing according to a variant of the second embodiment.

However, this is not limited thereto. Here, another example of the selectable imaging area calculation processing is described by using a flowchart of FIG. 36. Here, description is focused on differences from a flowchart shown in FIG. 31.

Thus, description starts from the step S3104 where a set of group numbers belonging to a schedule is extracted.

The securable resource information acquisition unit 120 calculates a restricted critical imaging area of the group for each set of groups extracted in the step S3104 (step S3601). Here, the restricted critical imaging area refers to a critical imaging area calculated based on both imaging areas of existing applications belonging to the group, and an imaging area of the additional application expected to be newly added. The method of calculating the restricted critical imaging area is the same as a method of calculating the critical imaging area used in the step S1105.

The securable resource information acquisition unit 120 calculates, for each set of groups extracted in the step S3104, an area where all of restricted critical imaging areas of the group overlap each other (step S3602). The method of calculating the overlapping area is the same as a method described in the step S3105 of the above second embodiment.

Next, the securable resource information acquisition unit 120 posts an overlapping area calculated in the step S3602 into the securable resource information as a selectable imaging area (step S3603).

In the step S3602, the overlapping area is calculated by using a restricted critical imaging area while taking into account an imaging area of the additional application. Therefore, in this case, a securable maximum imaging area can be presented as a critical imaging area while including an imaging area of the additional application selected by the user. Thus, the user can recognize how far the selected imaging area can be expanded.

(11) In the above embodiments, a coordinate system with a panorama image captured with a zoom magnification of 1 time as one plane is used for X and Y coordinates representing the imaging area, but the present disclosure is not limited thereto. For example, a coordinate system with a panorama image captured with the other zoom magnification as one plane may be used. Alternatively, a coordinate system associating the panning and tilting angles of the camera with X and Y values may be used.

(12) In the above embodiments, an application installation screen, and an interface screen for inquiring the management device whether an application can be installed are shown in FIGS. 8 and 9. But, these are just examples, and any display form may be used if the imaging area and the application program can be selected.

(13) The camera used in the above embodiments is not limited to the monitoring camera, but a camera of any type, for example, such as a portable terminal camera, a consumer camcorder, and a web camera.

(14) In the above embodiments, an example of entering one imaging area for an additional application into the display operation device 300 is shown. But, this is a location, and instead, a plurality of imaging areas may be entered. In this case, the management device 100 determines whether the additional application can be captured for each of entered imaging areas, and if result of the determination is affirmative, calculates a zoom magnification thereof, and determines whether the additional application can be installed for each of a plurality of imaging areas. Then, the management device 100 transmits the determination result to the display operation device 300 by associating with selected imaging area information, and the user may recognize whether the application can be installed for each of the entered imaging ranges.

(15) In the above embodiments, schedule for controlling operation timing, imaging direction, and magnification of the camera 200 for execution of applications is transmitted from the display operation device 300. But, the schedule may be transmitted from the management device 100.

(16) In the above embodiments, as the existing application information used in the securable resource information preparation processing, existing application information which the display operation device 300 has received from the camera 200 in advance is transmitted to the management device 100 in response to the installation determination request. But, the present disclosure is not limited thereto. For example, the management device 100 may acquire existing application information from the camera 200 in advance.

(17) In the above embodiments, when intending to newly install an application, that is, before installing an application, installation capability is inquired to the management device 100 by using the display operation device 300. But, the present disclosure is not limited thereto. For example, since the application has been installed on the camera 200, the user may transmit an imaging area of the application to the management device 100 by using the display operation device 300 when starting operation of the application.

In this case, the management device 100 generates securable resource information similarly with the processing described above, and transmits to the display operation device 300. Thus, based on the securable resource information, the display operation device 300 can present the user information as to whether the application is operable.

(18) In the above embodiments, the management device 100 and the application issuing server 400 are configured as devices separate from each other, but the present disclosure is not limited thereto. For example, those devices may be installed on a same hardware device.

(19) A control program comprising program codes for causing a processor of a device such as a management device, camera, and display operation device, and circuits connected thereto to run operations relating to the communication, and various processing relating to generation of the securable resource information shown in the above embodiments (see FIGS. 10, 11, 16, 20, 22, 23, 29, 30, 32, and 35) involved in the communication may be recorded into a recording medium, or distributed via various communication paths. Such a recording medium includes an IC card, a hard disk, an optical disk, a flexible disk, a ROM, etc. A distributed control program may be provided for use by storing into a memory or the like from which the control program can be read, and functions shown in the embodiments may be implemented when the control program is run by the processor.

(20) Each function unit of devices pertaining to the imaging system shown in the above embodiments may be implemented as a circuit running the function, or by running of a program by one or more processor. Alternatively, each function unit of devices according to the above embodiments may be formed as a package of an IC (Integrated Circuit), LSI (Large Scale Integration), or other integrated circuit. The package is used by incorporating into devices, and thereby the devices implement such functions as shown in the embodiments.

Function blocks are implemented as a LSI which is typically an integrated circuit. Each of these blocks may be put into one chip separately, or a portion or a whole of these blocks may be integrated into one chip. The term LSI used herein may be referred to as an IC, a system LSI, a super LSI, or an ultra LSI depending on the integration degree. The device integration method is not limited to LSI, and may be implemented by using a dedicated circuit or a general purpose processor. FPGA (Field Programmable Gate Array) which is programmable after fabrication of LSI, or a reconfigurable processor allowing reconfiguration of connection and setting of circuit cells inside the LSI may be used.

(21) Configurations according to the above embodiments and variants may be combined as appropriate.

<Supplementary>

An embodiment of the management device, imaging system, imaging device, and determination method according to the present disclosure, and effects thereof are described hereinafter.

(a) The management device according to the present disclosure is a management device capable of communicating with an imaging device that captures an imaging range determined based on a zoom magnification, the imaging system comprising:

a receptor that receives designation of an imaging area needed by an application to be newly operated in the imaging device, an acquisitioner that acquires, for each of one or more existing applications already installed in the imaging device, information including an imaging area needed by the existing application, an imaging time indicating a time length when the imaging device captures the imaging area, and a zoom magnification of the imaging device when capturing the imaging area, a generator that generates information indicating whether the newly operated application can be installed on the imaging device, based on an imaging area needed by the newly operated application, of which the designation is received by the receptor, the imaging area, the imaging time, and the zoom magnification corresponding to each of the one or more existing applications which is acquired by the acquisition unit, and an outputter that outputs the information, in which the generation unit performs a first determination to determine whether the imaging device can include the imaging area needed by any one of the one or more existing applications, and the imaging area needed by a newly operated application in an imaging range determined by the zoom magnification, and if result of the first determination is affirmative, generates information indicating that the newly operated application can be installed on the imaging device.

Thus, just by receiving user's designation of the imaging area, the management device can determine whether a new application can be installed on the imaging device. The user holding the imaging device can simply recognize, by viewing the result, whether the application can be newly installed.

(b) Further, in the management device, when the result of the first determination is affirmative, the generator may generate securable resource information including an imaging time indicating a time length, in which the imaging device can simultaneously capture the imaging area needed by the newly operated application and the imaging area needed by any one of the one or more existing applications in a case that a zoom magnification needed by the newly operated application is the zoom magnification needed by any one of the one or more existing applications, and the outputter may further output the securable resource information.

Thus, the user holding the imaging device can further recognize a zoom magnification and an imaging time available for a newly operated application.

(c) In the management device, the imaging device is a camera including:

a PTZ (Pan-Tilt-Zoom) mechanism that changes orientation and zoom magnification of the camera; and a controller that controls the orientation of the camera, and size of an imaging range which the camera can capture at one time, by controlling the PTZ mechanism with a PTZ setting value including a set of the orientation and zoom magnification of the camera, in which the size of the imaging range of the camera is determined based on the zoom magnification of the camera, the generator generates one or more groups of the existing applications corresponding to imaging areas included in the imaging range of the camera, generates a combination pattern by combining the one or more groups, and generates schedule information associated with the group included in the generated combination pattern, and an imaging time in which the camera can capture the imaging range corresponding to the group, a total imaging time of imaging times of the one or more groups in the combination pattern included in the schedule information is shorter than a predetermined unit time, the first determination may determine, for each of the one or more groups of a combination pattern included in the schedule information, whether the imaging area needed by the existing application included in the group, and the imaging area needed by the newly operated application can be included simultaneously in an imaging range of the camera determined by the zoom magnification needed by the existing application, and if there is a group determined to be included simultaneously, calculate a maximum value of a time length in which the imaging area needed by the newly operated application in the case that the zoom magnification needed by the newly operated application is the zoom magnification needed by any one of the one or more existing applications in the determined group.

Thus, the management device determines whether the imaging area needed respectively by each of a plurality of applications is included in an imaging range identified by one PTZ setting value which can be captured by the camera at one time, and then determines whether the new application can be installed on the imaging device. Therefore, when the imaging area needed respectively by each of a plurality of applications can be captured at one time in an imaging range which the camera can capture at one time, possibility of installing much more applications in the imaging device is enhanced.

(d) The generation unit may
further determine whether the one or more existing applications are included in each of the one or more groups of the combination pattern included in the schedule information, and if determined that the one or more existing applications is included in the group, determine whether the imaging area needed by the newly operated application, and the imaging area needed respectively by each of the one or more existing applications included in the group is included in an imaging range of the camera with a maximum zoom magnification out of zoom magnifications respectively needed by the one or more existing applications included in the group.

Thus, when determined that the one or more existing applications is included in the group, even if a zoom magnification required by each of the one or more existing applications included in the group is different from each other, capability of capturing with a predetermined zoom magnification can be determined by re-sizing the pickup image. Thus, capability of adding a new application can be determined while satisfying conditions (zoom magnification, imaging time, imaging range) required by much more applications.

(e) In the management device, the schedule information includes a plurality of group combinations, and values of the imaging time in which an imaging range respectively corresponding to each of a plurality of groups can be captured with the camera, and if a plurality of groups out of one or more groups included in the combination pattern are determined in the first determination to be included simultaneously, the generator calculates a maximum value of time length in which an imaging area needed by the newly operated application can be captured with a zoom magnification selected by any one of the plurality of groups or a maximum value of zoom magnifications selectable with the camera, by using a value of the imaging time in which imaging ranges respectively corresponding to each of the plurality of groups can be captured with the camera.

Thus, a maximum value of the time length in which an imaging area needed by the newly operated application can be captured is obtainable.

(f) In the management device, the securable resource information may include selectable imaging area information indicating a limit range of an imaging area which the newly operated application can secure within the imaging range.

Thus, the management device can also present an imageable limit area, and thereby provide further convenience to users holding the imaging device.

(g) In the management device, the selectable imaging area information may include an imaging area needed by the newly operated application, and indicate a maximum range expandable from the imaging area needed by the newly operated application.

Thus, the management device can present an imageable limit area including the imaging area for the newly added application designated by the user, and thereby provide further convenience to users holding the imaging device.

(h) In the management device, a second determination may be performed for each of the one or more existing applications to determine whether a total imaging time being the sum of imaging times in which the imaging device captures an imaging area needed by the existing application is shorter than a predetermined unit time, and if result of the second determination is affirmative, capability information indicating that the newly operated application can be installed on the imaging device may be generated.

Thus, a time length obtained by subtracting the total imaging time from the unit time may be used as a time for capturing the newly operated application.

(i) The imaging device according to the present disclosure is an imaging device configured to capture an imaging range determined based on a zoom magnification, the imaging device including:

a receptor that receives designation of an imaging area needed by a newly operated application;

an acquisitioner that acquires, for each of one or more existing applications already installed on the imaging device, information including an imaging area needed by the existing application, an imaging time needed by the existing application when the imaging device captures the imaging area, and a zoom magnification of the imaging device for capturing the imaging area;

a generator that generates information indicating whether the newly operated application can be installed on the imaging device, based on the imaging area needed by the newly operated application of which the designation is received by the receptor, and the imaging area, the imaging time, and the zoom magnification corresponding to each of the one or more existing applications which is acquired by the acquisitioner; and an outputter that outputs information indicating whether the newly operated application can be installed on the imaging device, in which the imaging device performs a first determination to determine whether the imaging area needed by any one of the one or more existing applications, and the imaging area needed by the newly operated application can be included in an imageable imaging range determined by the zoom magnification, and if result of the first determination is affirmative, generates information indicating that the newly operated application can be installed on the imaging device.

Thus, just by receiving user's designation of the imaging area, the imaging device can determine whether a new application can be installed on the imaging device. The user holding the imaging device can simply recognize, by viewing the result, whether the application can be newly installed.

(j) The imaging system according to the present disclosure includes:

an imaging device that images capture an imaging range determined based on a zoom magnification;

a receptor that receives receive designation of an imaging area needed by an application newly operated on the imaging device;

an acquisitioner that acquires, for each of one or more existing applications already installed on the imaging device, information including an imaging area needed by the existing application, an imaging time needed by the existing application when the imaging device images the imaging area, and a zoom magnification of the imaging device for capturing the imaging area;

a generator that generates information indicating whether the newly operated application can be installed on the imaging device, based on an imaging area needed by the newly operated application of which the designation is received by the receptor, and the imaging area, the imaging time, and the zoom magnification corresponding to each of the one or more existing applications which is acquired by the acquisitioner; and an outputter that outputs information indicating whether the newly operated application can be installed on the imaging device, in which the generator performs a first determination to determine whether the imaging device can include the imaging area needed by any one of the one or more existing applications, and the imaging area needed by the newly operated application in an imaging range determined by the zoom magnification, and if result of the first determination is affirmative, generates information indicating that the newly operated application can be installed on the imaging device.

Thus, just by receiving user's designation of the imaging area, the management device can determine whether a new application can be installed on the imaging device. The user holding the imaging device can simply recognize, by viewing the result, whether the application can be newly installed.

(k) A determination method according to the present disclosure is a method of determining whether a new application can be installed in an imaging device that captures an imaging range determined based on a zoom magnification, the method including:

receiving designation of an imaging area needed by an application newly operated on an imaging device, acquiring, for each of one or more existing applications already installed in the imaging device, information including an imaging area needed by the existing application, an imaging time needed by the existing application when the imaging device captures the imaging area, and a zoom magnification of the imaging device for capturing the imaging area, generating information indicating whether the newly operated application can be installed in the imaging device, based on an imaging area needed by the newly operated application designated in the receiving, and the imaging time, and the zoom magnification corresponding to each of the one or more existing applications which is acquired in the acquiring; and outputting information indicating whether the newly operated application can be installed on the imaging device, in which the generating performs a first determination to determine whether the imaging area needed by any one of the one or more existing applications, and the imaging area needed by the newly operated application can be included in an imaging range determined by the zoom magnification, and if result of the first determination is affirmative, generates information indicating that the newly operated application can be installed on the imaging device.

Thus, just by receiving user's designation of the imaging area, the determination method can determine whether a new application can be installed on the imaging device. The user holding the imaging device can simply recognize, by viewing the result, whether the application can be newly installed.

The management device according to the present disclosure provides convenience to users holding a camera as a device that determines whether a new application can be installed in a camera, and presents installation capability.

What is claimed is:

1. A management device capable of communicating with an imaging device configured to capture an imaging region determined based on a zoom magnification, the management device comprising:

a receiver that receives designation of an imaging area needed by an application newly operated on the imaging device;

an interface that acquires, for each of one or more existing applications already installed in the imaging device, information including an imaging area needed by the existing application, an imaging time indicating a time length when the imaging device captures the imaging area, and a zoom magnification of the imaging device for capturing the imaging area;

a generator that generates information indicating whether the newly operated application can be installed in the imaging device, based on an imaging area needed by the newly operated application of which the designation is received by the receiver, the imaging area, the imaging time, and the zoom magnification corresponding to each of the one or more existing applications which is acquired by the interface; and an output that outputs information indicating whether the newly operated application can be installed on the imaging device, wherein the generator performs a first determination to determine whether the imaging device can include the imaging area needed by any one of the one or more existing applications, and the imaging area needed by the newly operated application in an imaging range determined by the zoom magnification and if result of the first determination is affirmative, generates information indicating that the newly operated application can be installed on the imaging device.

2. The management device according to claim 1, wherein when the result of the first determination is affirmative, the generator generates securable resource information including an imaging time indicating a time length, in which the imaging device can simultaneously capture the imaging area needed by the newly operated application and the imaging area needed by any one of the one or more existing applications in a case that a zoom magnification needed by the newly operated application is the zoom magnification needed by the one of the one or more existing applications, and the output further outputs the securable resource information.

3. The management device according to claim 2, wherein the imaging device is a camera comprising:

a PTZ (Pan-Tilt-Zoom) mechanism that changes orientation of the camera, and a zoom magnification of the camera; and a controller that controls the orientation of the camera, and size of an imaging range which the camera can capture at one time, by controlling the PTZ mechanism with a PTZ setting value including a set of the orientation of the camera and the zoom magnification of the camera, wherein the size of the imaging range of the camera is determined based on the zoom magnification of the camera, the generator generates one or more groups of the existing applications corresponding to imaging areas included in an imaging region of the camera, generates a combination pattern by combining the one or more groups, and generates schedule information associated with the group included in the generated combination pattern, and an imaging time in which the camera can capture the imaging range corresponding to the group, a total imaging time of imaging times of the one or more groups in the combination pattern included in the schedule information is shorter than a predetermined unit time, the first determination determines, for each of the one or more groups of a combination pattern included in the schedule information, whether the imaging area needed by the existing application included in the group, and the imaging area needed by the newly operated application can be included simultaneously in an imaging range of the camera determined by the zoom magnification needed by the existing application, and

49 if there is a group determined to be included simultaneously, calculates a maximum value of a time length available for capturing the imaging area needed by the newly operated application in the case that the zoom magnification needed by the newly operated application is the zoom magnification needed by any one of the one or more existing applications in the determined group.

4. The management device according to claim 3, wherein the generator
   further determines whether the one or more existing applications are included in each of the one or more groups of the combination pattern included in the schedule information, and
   if determined that the one or more existing applications is included in the group, determines whether the imaging area needed by the newly operated application, and imaging area needed by each of the one or more existing applications included in the group are included in an imaging range of the camera with a maximum zoom magnification out of zoom magnifications respectively needed by the one or more existing applications included in the group.

5. The management device according to claim 4, wherein if a plurality of groups out of one or more groups included in the combination pattern are determined in the first determination to be included simultaneously, the generator calculates a maximum value of a time length in which an imaging area needed by the newly operated application can be captured with a zoom magnification selected by any one of the plurality of groups or a maximum value of zoom magnifications selectable with the camera, by using a value of an imaging time in which an imaging range corresponding to each of the plurality of groups can be captured with the camera.

6. The management device according to claim 1, wherein the securable resource information includes selectable imaging area information indicating a limit range of an imaging area which the newly operated application can secure within the imaging range.

7. The management device according to claim 6, wherein the selectable imaging area information includes an imaging area needed by the newly operated application, and indicates a maximum range expandable from the imaging area needed by the newly operated application.

8. The management device according to claim 1, wherein the generator further performs a second determination to determine, for each of the one or more existing applications, whether a total imaging time being the sum of imaging times in which the imaging device captures an imaging area needed by the existing application is shorter than a predetermined unit time, and if result of the second determination is affirmative, generates the information indicating that the newly operated application can be installed on the imaging device.

9. An imaging device configured to capture an imaging region determined based on a zoom magnification, the imaging device comprising:
   a receiver that receives designation of an imaging area needed by a newly operated;
   an interface that acquires, for each of one or more existing applications already installed on the imaging device, information including an imaging area needed by the existing application, an imaging time indicating a time length when the imaging device images the imaging area, and a zoom magnification for capturing the imaging area;
   a generator that generates information indicating whether the newly operated application can be installed in the imaging device, based on an imaging area needed by the newly operated application of which designation is received by the receiver, and the imaging area, the imaging time, and the zoom magnification corresponding to each of the one or more existing applications which is acquired by the interface; and
   an output that output that outputs information indicating whether the newly operated application can be installed on the imaging device, wherein
   the imaging device performs a first determination to determine whether the imaging area needed by any one of the one or more existing applications, and the imaging area needed by the newly operated application are included in an imaging range determined by the zoom magnification, and if result of the first determination is affirmative, generates information indicating that the newly operated application can be installed on the imaging device.

10. An imaging system comprising:
    an imaging device that images an imaging range determined based on a zoom magnification;
    a receiver that receives designation of an imaging area needed by an application newly operated in the imaging device;
    an interface that acquires, for each of one or more existing applications already installed in the imaging device, information including an imaging area needed by the existing application, an imaging time indicating a time length when the imaging device images the imaging area, and a zoom magnification for capturing the imaging area;
    a generator that generates information indicating whether the newly operated application can be installed in the imaging device, based on an imaging area needed by the newly operated application of which the designation is received by the receiver, and the imaging area, the imaging time, and the zoom magnification corresponding to each of the one or more existing applications which is acquired by the interface; and
    an output that outputs information indicating whether the newly operated application can be installed on the imaging device, wherein
    the generator performs a first determination to determine whether the imaging device can include the imaging area needed by any one of the one or more existing applications, and the imaging area needed by a newly operated application in an imaging range determined by the zoom magnification, and if result of the first determination is affirmative, generates information indicating that the newly operated application can be installed on the imaging device.

11. A determination method of determining whether a new application can be installed on an imaging device that captures an imaging range determined based on a zoom magnification, the determination method comprising:
    receiving designation of an imaging area needed by an application newly operated on the imaging device;
    acquiring, for each of one or more existing applications already installed on the imaging device, information including an imaging area needed by the existing application, an imaging time indicating a time length when the imaging device captures the imaging area, and a zoom magnification for capturing the imaging area;
    generating information indicating whether the newly operated application can be installed on the imaging device, based on an imaging area needed by the newly operated application of which the designation is received in the receiving, the imaging area, the imaging time, and the zoom magnification corresponding to each of the one or more existing applications which is acquired in the acquiring; and outputting information indicating whether the newly operated application can be installed on the imaging device, wherein the generating performs a first determination to determine whether the imaging device can include the imaging area needed by any one of the one or more existing applications, and the imaging area needed by a newly operated application in an imaging range determined by the zoom magnification, and if result of the first determination is affirmative, generates information indicating that the newly operated application can be installed on the imaging device.

* * * * *